US011955854B2

(12) United States Patent
Koga et al.

(10) Patent No.: US 11,955,854 B2
(45) Date of Patent: Apr. 9, 2024

(54) ARMATURE AND MANUFACTURING METHOD OF ARMATURE

(71) Applicant: AISIN CORPORATION, Kariya (JP)

(72) Inventors: Kiyotaka Koga, Nishio (JP); Takahiro Kobuchi, Kariya (JP); Takashi Kato, Anjo (JP)

(73) Assignee: AISIN CORPORATION, Kariya (JP)

( * ) Notice: Subject to any disclaimer, the term of this patent is extended or adjusted under 35 U.S.C. 154(b) by 458 days.

(21) Appl. No.: 17/273,107

(22) PCT Filed: Nov. 6, 2019

(86) PCT No.: PCT/JP2019/043383
§ 371 (c)(1),
(2) Date: Mar. 3, 2021

(87) PCT Pub. No.: WO2020/095920
PCT Pub. Date: May 14, 2020

(65) Prior Publication Data
US 2021/0344243 A1   Nov. 4, 2021

(30) Foreign Application Priority Data

Nov. 9, 2018   (JP) ................... 2018-211083

(51) Int. Cl.
*H02K 3/12* (2006.01)
*H02K 3/48* (2006.01)
*H02K 15/00* (2006.01)

(52) U.S. Cl.
CPC ............... *H02K 3/12* (2013.01); *H02K 3/48* (2013.01); *H02K 15/0068* (2013.01)

(58) Field of Classification Search
CPC .......... H02K 3/12; H02K 3/48; H02K 15/0068
USPC ............................................. 310/195
See application file for complete search history.

(56) References Cited

U.S. PATENT DOCUMENTS

| | | | |
|---|---|---|---|
| 5,804,902 | A | 9/1998 | Hill |
| 10,250,093 | B2 | 4/2019 | Hattori |
| 2016/0261159 | A1* | 9/2016 | Tsuiki ............... H02K 15/0435 |
| 2017/0040859 | A1* | 2/2017 | Langlard ............. H02K 3/28 |
| 2017/0047808 | A1* | 2/2017 | Hino ................. H02K 3/12 |
| 2018/0054103 | A1* | 2/2018 | Hino ................ H02K 3/345 |

(Continued)

FOREIGN PATENT DOCUMENTS

| | | |
|---|---|---|
| JP | H11-168845 A | 6/1999 |
| JP | 2006-158044 A | 6/2006 |
| JP | 2015-023771 A | 2/2015 |

OTHER PUBLICATIONS

Jan. 21, 2020 Search Report issued in International Patent Application No. PCT/JP2019/043383.

(Continued)

*Primary Examiner* — Rashad H Johnson
(74) *Attorney, Agent, or Firm* — Oliff PLC

(57) ABSTRACT

In this stator armature, a first leg portion has a first surface side part that has a thickness in a radial direction smaller than a thickness of a first leg portion body portion in the radial direction, a second leg portion has a second surface side part that has a thickness in the radial direction smaller than a thickness of a second leg portion body portion in the radial direction, and in the radial direction, a thickness of a joint portion is equal to or more than a thickness of a part other than the joint portion.

10 Claims, 31 Drawing Sheets

(56) References Cited

U.S. PATENT DOCUMENTS

| | | | |
|---|---|---|---|
| 2020/0227987 A1* | 7/2020 | Yamaguchi | H02K 3/345 |
| 2021/0234439 A1* | 7/2021 | Koga | H02K 15/0031 |
| 2021/0273514 A1* | 9/2021 | Koga | H02K 3/12 |
| 2021/0336502 A1* | 10/2021 | Koshiba | H02K 3/345 |
| 2021/0359579 A1* | 11/2021 | Fukuda | H02K 3/50 |
| 2021/0391763 A1* | 12/2021 | Yamamoto | H02K 3/345 |
| 2022/0140686 A1* | 5/2022 | Hirai | H02K 3/522 |
| | | | 310/71 |
| 2022/0140770 A1* | 5/2022 | Okamura | H02K 3/50 |
| | | | 318/473 |
| 2022/0158515 A1* | 5/2022 | Funayama | H02K 3/12 |
| 2022/0294299 A1* | 9/2022 | Hisada | H02K 3/48 |
| 2022/0311298 A1* | 9/2022 | Han | H02K 3/12 |
| 2022/0311301 A1* | 9/2022 | Ishikawa | H02K 3/28 |
| 2022/0352796 A1* | 11/2022 | Uchiyama | H02K 15/0081 |
| 2022/0368189 A1* | 11/2022 | Takahashi | H02K 3/522 |
| 2022/0385132 A1* | 12/2022 | Takei | H02K 3/50 |
| 2022/0393523 A1* | 12/2022 | Watanabe | H02K 15/067 |
| 2022/0393524 A1* | 12/2022 | Watanabe | H02K 3/50 |
| 2022/0416605 A1* | 12/2022 | Hisada | H02K 3/50 |
| 2023/0108657 A1* | 4/2023 | Tsuiki | H02K 15/0421 |
| | | | 310/208 |
| 2023/0117799 A1* | 4/2023 | Ito | H02K 3/28 |
| | | | 310/208 |

OTHER PUBLICATIONS

Sep. 1, 2021 Extended Search Report issued in European Patent Application No. 19882911.1.
Dec. 1, 2022 Office Action issued in Japanese Patent Application No. 2020-556103.

* cited by examiner

ARMATURE AND MANUFACTURING METHOD OF ARMATURE

TECHNICAL FIELD

The present disclosure relates to an armature and a manufacturing method of the armature.

BACKGROUND ART

Conventionally, an armature including an armature core provided with a plurality of slots extending in an axial direction is known. Such an armature is disclosed, for example, in Japanese Unexamined Patent Application Publication No. 2015-23771 (JP 2015-23771 A).

JP 2015-23771 A discloses a rotary electric machine stator including a plurality of slots. The rotary electric machine stator includes a coil portion composed of a first segment conductor and a second segment conductor that are inserted into each of the plurality of slots and that are provided so as to face each other in the axial direction. Specifically, a first leg portion of the first segment conductor provided so as to extend in the axial direction and a second leg portion of the second segment conductor provided so as to extend in the axial direction are joined in the slot. Further, the first leg portion has a protruding portion protruding in the axial direction, and the second leg portion has a recessed portion recessed in the axial direction. The first segment conductor and the second segment conductor are relatively moved so as to become close to each other along the axial direction and thus, the protruding portion of the first leg portion and the recessed portion of the second leg portion are joined.

Although not described in JP 2015-23771 A, conventionally, there is known a rotary electric machine stator in which a tip end portion of a first leg portion of a plurality of first segment conductors and a tip end portion of a second leg portion of a plurality of second segment conductors are joined by being pressed in a radial direction. The tip end portion of the first leg portion is formed to have a smaller thickness in the radial direction than a root portion of the first leg portion. Similarly, the tip end portion of the second leg portion is formed to have a smaller radial thickness than the root portion of the second leg portion. In this rotary electric machine stator, the tip end portion of the first leg portion of the plurality of first segment conductors and the tip end portion of the second leg portion of the plurality of second segment conductors are disposed so as to be adjacent to each other in the radial direction. Then, the tip end portion of the first leg portion of the plurality of first segment conductors and the tip end portion of the second leg of the plurality of second segment conductors are pressed in the radial direction by a jig. As a result, the tip end portion of the first leg portion of the plurality of first segment conductors and the tip end portion of the second leg of the plurality of second segment conductors are joined.

RELATED ART DOCUMENTS

Patent Documents

Patent Document 1: Japanese Unexamined Patent Application Publication No. 2015-23771 (JP 2015-23771 A)

SUMMARY OF THE DISCLOSURE

Problem to be Solved by the Invention

Here, conventionally, in the rotary electric machine stator in which the tip end portion of the first leg portion of the plurality of first segment conductors and the tip end portion of the second leg of the plurality of second segment conductors are joined by being pressed in the radial direction, there is a case in which the shape (dimension) of the coils (first segment conductor, second segment conductor) is varied. In this case, when the tip end portion of the first leg portion of the plurality of first segment conductors and the tip end portion of the second leg portion of the plurality of second segment conductors are disposed so as to be adjacent to each other in the radial direction, the total thickness (radial thickness) of the tip end portion of the first leg portion and the tip end portion of the second leg portion is relatively small. Alternatively, there is a case in which the total thickness (joint portion) of the tip end portion of the first leg portion and the tip end portion of the second leg portion is smaller than the total thickness in the radial direction of parts other than the joint portion. In these cases, a jig may not be able to press the tip end portion of the first leg portion and the tip end portion of the second leg with a sufficient force. For example, when the jig is configured to move a certain distance along the radial direction, there is a case in which, since the total thickness of the tip end portion of the first leg portion and the tip end portion of the second leg portion (radial thickness) is small (that is, the tip end portion of the first leg portion and the tip end portion of the second leg are relatively far apart from the jig), a sufficient force is not applied to the tip end portion of the first leg portion and the tip end portion of the second leg portion, even if the jig moves a certain distance. As a result, there is a problem that the tip end portion of the first leg portion and the tip end portion of the second leg portion may not be sufficiently joined.

The present disclosure has been made to solve the above-mentioned problems, and one object of the present disclosure is to provide an armature in which it is possible to prevent the first segment conductor and the second segment conductor from being unable to be sufficiently joined.

Means for Solving the Problem

In order to achieve the above object, an armature in the first aspect of the present disclosure includes: an armature core provided with a plurality of slots extending in an axial direction; a plurality of first segment conductors disposed on one side of the armature core in the axial direction and including a first leg portion that extends to the other side of the armature core in the axial direction; a plurality of second segment conductors disposed on the other side of the armature core in the axial direction and including a second leg portion that extends to the one side of the armature core in the axial direction; and a coil portion including a joint portion in which at least a part of a first surface that is provided on a tip end portion side of each first leg portion of the plurality of first segment conductors and that is provided so as to extend along the axial direction, and at least a part of a second surface that is provided on a tip end portion side of each second leg portion of the plurality of second segment conductors and that is provided so as to extend along the axial direction are joined in one of the slots or on an outer side of one of the slots in the axial direction, in which the first leg portion has a first leg portion body portion and a first surface side part that is provided with the first surface and that has a thickness in a radial direction smaller than a thickness of the first leg portion body portion in the radial direction, the second leg portion has a second leg portion body portion and a second surface side part that is provided with the second surface and that has a thickness in the radial direction smaller than a thickness of the second leg portion body portion in the radial direction, and in the radial direction, a thickness of the joint portion is equal to or more than a thickness of a part other than the joint portion. The term "joint portion" has a broad meaning including not only a part joined with a bonding agent but also a part that is only in contact without a bonding agent.

In the armature of the first aspect of the disclosure, as described above, the thickness of the joint portion is equal to or more than the thickness of the part other than the joint portion, in the radial direction. As a result, since the thickness of the joint portion is equal to or more than the thickness of the part other than the joint portion (since the joint portion is not recessed more than the part other than the joint portion in the radial direction), the joint portion can be pressed with a sufficient force by the jig (or a spring member, etc.). As a result, it is possible to prevent the first segment conductor and the second segment conductor from being unable to be sufficiently joined. Further, in the case in which the radial thickness of the joint portion is smaller than the radial thickness of the part in which the first surface and the second surface are not provided, when the joint portion is pressed by the jig, the coil portion (the first segment conductor, the second segment conductor) is curved. Thus, with the configuration as described above, it is possible to prevent the coil portion from being curved even when the joint portion is pressed by the jig. Further, since the radial thickness of the first surface side part is smaller than the radial thickness of the first leg portion body portion, and the radial thickness of the second surface side part is smaller than the radial thickness of the second leg portion body portion, it is possible to suppress the radial thickness of the joint portion from being increased while securing the area of the joint surface.

An armature according to a second aspect of the disclosure includes: an armature core provided with a plurality of slots extending in an axial direction; a plurality of first segment conductors disposed on one side of the armature core in the axial direction and including a first leg portion that extends to the other side of the armature core in the axial direction; a plurality of second segment conductors disposed on the other side of the armature core in the axial direction and including a second leg portion that extends to the one side of the armature core in the axial direction; and a coil portion including a joint portion in which at least a part of a first surface that is provided on a tip end portion side of each first leg portion of the plurality of first segment conductors and that is provided so as to extend along the axial direction, and at least a part of a second surface that is provided on a tip end portion side of each second leg portion of the plurality of second segment conductors and that is provided so as to extend along the axial direction are joined in one of the slots or on an outer side of one of the slots in the axial direction, in which the first leg portion has a first leg portion body portion that has a thickness in a radial direction that is larger than a thickness in the radial direction of a first surface side part provided with the first surface, a minimum value of a dimensional variation range of a thickness of the first surface side part in the radial direction among the plurality of first segment conductors disposed in one of the slots is equal to or more than half of a maximum value of a dimensional variation range of a thickness of the first leg portion body portion among the plurality of first segment conductors disposed in one of the slots, the second leg portion has a second leg portion body portion that has a thickness in the radial direction that is larger than a thickness in the radial direction of a second surface side part provided with the second surface, and a minimum value of a dimensional variation range of a thickness of the second surface side part in the radial direction among the plurality of second segment conductors disposed in one of the slots is equal to or more than half of a maximum value of a dimensional variation range of a thickness of the second leg portion body portion among the plurality of second segment conductors disposed in one of the slots.

Further, in the armature according to a second aspect of the disclosure, as described above, the minimum value of the dimensional variation range of the radial thickness of the first surface side part of the plurality of first segment conductors disposed in one slot is equal to or more than half of the maximum value of the dimensional variation range of the thickness of the first leg portion body portion of the plurality of first segment conductors disposed in one slot. In addition, the minimum value of the dimensional variation range of the radial thickness of the second surface side part of the plurality of second segment conductors disposed in one slot is equal to or more than half of the maximum value of the dimensional variation range of the thickness of the second leg portion body portion of the plurality of second segment conductors disposed in one slot. As a result, even if the radial thickness of the first surface side part and the second surface side part (joint portion) is the minimum value, since the above radial thickness is larger than the radial thickness of the first leg portion body portion and the second leg portion body portion (the part in which the first surface and the second surface are not provided), the first surface side part and the second surface side part (joint portion) can be pressed by the jig (or the spring member, etc.). As a result, it is possible to provide an armature that is able to prevent the first segment conductor and the second segment conductor from being unable to be sufficiently joined. Further, in the case in which the radial thickness of the joint portion is smaller than the radial thickness of the part in which the first surface and the second surface are not provided, when the joint portion is pressed by the jig, the coil portion (the first segment conductor, the second segment conductor) is curved. Thus, with the configuration as described above, it is possible to provide an armature that is able to prevent the coil portion from being curved even when the joint portion is pressed by the jig.

A manufacturing method of an armature according to a third aspect of the disclosure is a manufacturing method of an armature core provided with a plurality of slots extending in an axial direction, the manufacturing method including: a step of preparing a plurality of first segment conductors disposed on one side of the armature core in the axial direction and including a first leg portion that extends to the other side of the armature core in the axial direction; a step of preparing a plurality of second segment conductors disposed on the other side of the armature core in the axial direction and including a second leg portion that extends to the one side of the armature core in the axial direction; a step of moving the plurality of first segment conductors from one side of the armature core to a side of the slot; a step of moving the plurality of second segment conductors from the other side of the armature core in the axial direction to the side of the slot; and a step of forming a joint portion by joining at least a part of a first surface that is provided on a tip end portion side of each first leg portion of the plurality of first segment conductors and that is provided so as to extend along the axial direction, and at least a part of a second surface that is provided on a tip end portion side of each second leg portion of the plurality of second segment conductors and that is provided so as to extend along the axial direction, in one of the slots or on an outer side of one of the slots in the axial direction, in which the step of preparing the first segment conductor is a step of preparing the first segment conductor in which the first leg portion has a first leg portion body portion and a first surface side part provided with the first surface and having a thickness in a radial direction smaller than a thickness in the radial direction of the first leg portion body portion, the step of preparing the second segment conductor is a step of preparing the second segment conductor in which the second leg portion has a second leg portion body portion and a second surface side part provided with the second surface and having a thickness in the radial direction smaller than a thickness in the radial direction of the second leg portion body portion, and in the step of preparing the first segment conductor and the step of preparing the second segment conductor, the first segment conductor and the second segment conductor are prepared so that a thickness of the joint portion is equal to or larger than a thickness of a part other than the joint portion, in the radial direction.

In the manufacturing method of the armature according to the third aspect of the disclosure, as described above, in the step of preparing the first segment conductor and the step of preparing the second segment conductor, the first segment conductor and the second segment conductor are prepared so that a thickness of the joint portion is equal to or larger than a thickness of a part other than the joint portion, in the radial direction. As a result, since the thickness of the joint portion is equal to or more than the thickness of the part other than the joint portion (since the joint portion is not recessed more than the part other than the joint portion in the radial direction), the joint portion can be pressed with a sufficient force by the jig (or a spring member, etc.). As a result, it is possible to provide a manufacturing method of an armature that is able to prevent the first segment conductor and the second segment conductor from being unable to be sufficiently joined. Further, in the case in which the radial thickness of the joint portion is smaller than the radial thickness of the part in which the first surface and the second surface are not provided, when the joint portion is pressed by the jig, the coil portion (the first segment conductor, the second segment conductor) is curved. Thus, with the configuration as described above, it is possible to provide a manufacturing method of an armature that is able to prevent the coil portion from being curved even when the joint portion is pressed by the jig. Further, the radial thickness of the first surface side part is smaller than the radial thickness of the first leg portion body portion, and the radial thickness of the second surface side part is smaller than the radial thickness of the second leg portion body portion. Thus, it is possible to provide a manufacturing method of an armature that is able to suppress the radial thickness of the joint portion from being increased while securing the area of the joint surface.

Effects of the Invention

With the present disclosure, as described above, it is possible to prevent the first segment conductor and the second segment conductor from being unable to be sufficiently joined.

BRIEF DESCRIPTION OF THE DRAWINGS

FIG. 7 is a perspective view showing a configuration of a first segment conductor according to the first embodiment.

FIG. 8 is a perspective view showing a configuration of a second segment conductor according to the first embodiment.

FIG. 27 is a cross-sectional view showing a configuration of a segment conductor according to the second embodiment.

FIG. 28 is a perspective view showing a configuration of a first segment conductor according to the second embodiment.

FIG. 29 is a perspective view showing a configuration of a second segment conductor according to the second embodiment.

FIG. 43 is a perspective view of a first segment conductor and a second segment conductor according to a third modification of the first embodiments.

MODES FOR CARRYING OUT THE DISCLOSURE

Hereinafter, the present embodiment of the present disclosure will be described with reference to the drawings.

Structure of Stator

The structure of a stator 100 according to the first embodiment will be described with reference to FIGS. 1 to 23. The stator 100 has an annular shape centered around a central axis C1. The stator 100 is an example of an "armature" in the claims.

Figure 1:
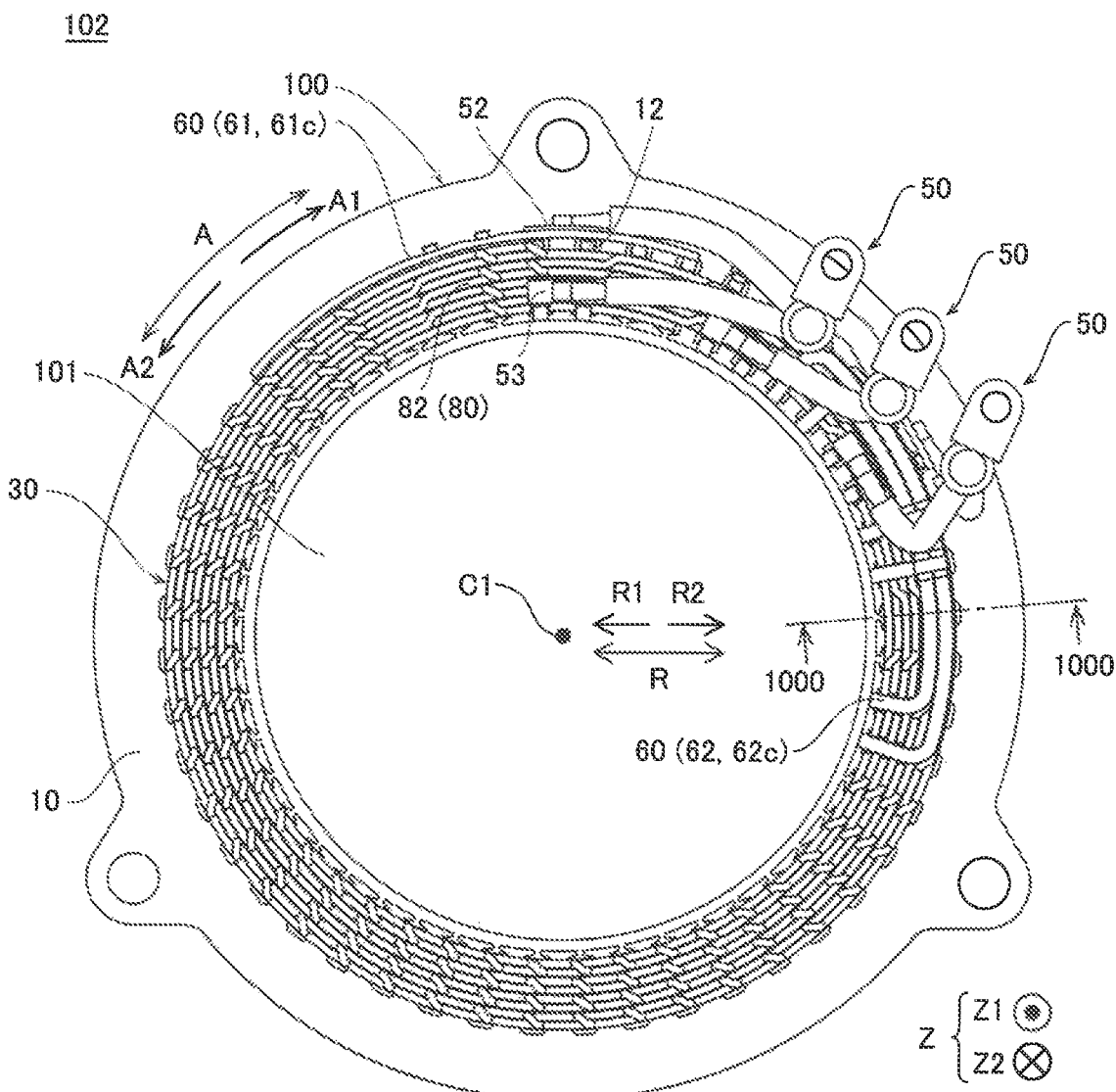
FIG. 1 is a plan view showing a configuration of a stator (rotary electric machine) according to a first embodiment.

In the specification of the application, an "axial direction (axial direction, axis direction)" means a direction (Z direction) along the central axis C1 of the stator 100 (a rotational axis of a rotor 101) as shown in FIG. 1. A "circumferential direction" means a circumferential direction (A1 direction, A2 direction) of the stator 100. A "radial direction" means a radial direction (R direction) of the stator 100. An "inner radial side" means a direction (R1 direction) toward the central axis C1 of the stator 100 along the radial direction. Further, an "outer radial side" means a direction (R2 direction) toward the outside of the stator 100 along the radial direction.

The stator 100 configures a part of a rotary electric machine 102 together with the rotor 101. The rotary electric machine 102 is configured as a motor, a generator, or a motor/generator, for example. As shown in FIG. 1, the stator 100 is disposed on the outer radial side of the rotor 101 in which a permanent magnet (not shown) is provided. That is, in the first embodiment, the stator 100 configures a part of the inner rotor type rotary electric machine 102.

Figure 2:
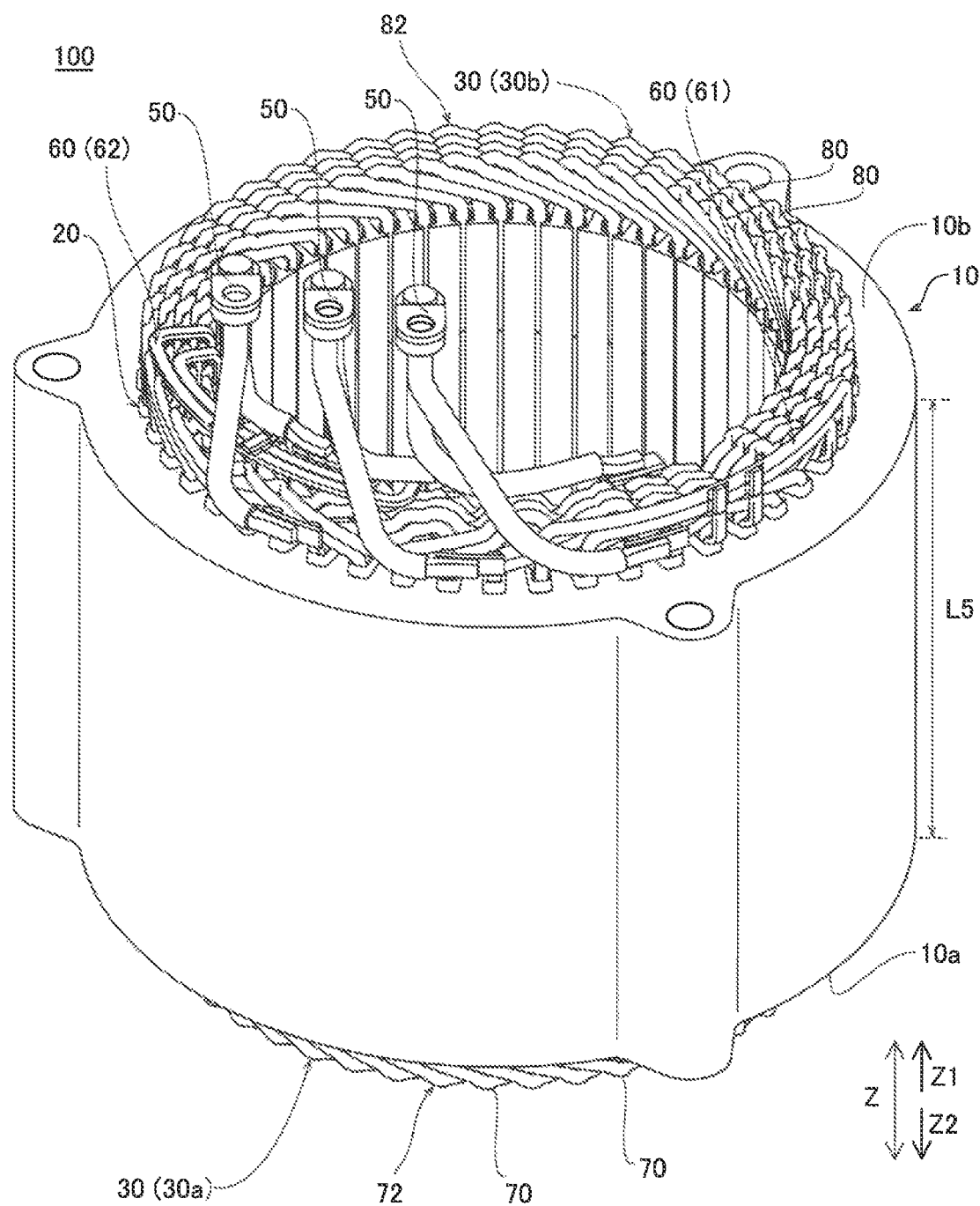
FIG. 2 is a perspective view showing the configuration of the stator according to the first embodiment.

As shown in FIG. 2, the stator 100 includes a stator core 10, a first insulating member 20, and a coil portion 30. The coil portion 30 includes a first coil assembly 30a (non-lead side coil) and a second coil assembly 30b (lead side coil). Further, the coil portion 30 is composed of a plurality of segment conductors 40 (see FIG. 4). In addition, in the first embodiment, the stator 100 includes a second insulating member 21 (see FIG. 4) that is provided separately from the first insulating member 20. The stator core 10 is an example of an "armature core" in the claims. The second insulating member 21 is an example of a "joint portion insulating member" in the claims.

Structure of Stator Core

Figure 3:
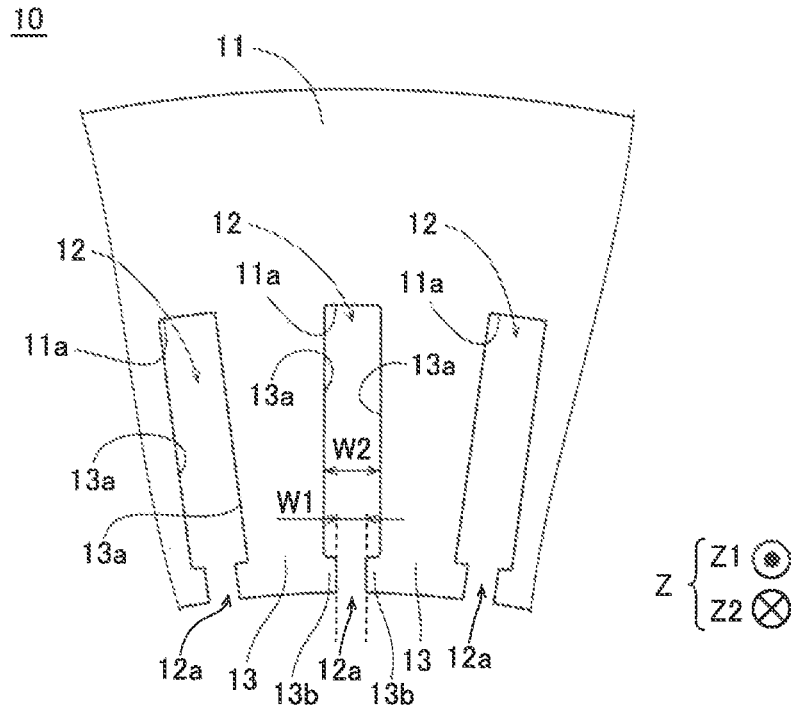
FIG. 3 is a plan view showing a configuration of a stator core according to the first embodiment.

The stator core 10 has a cylindrical shape with the central axis C1 (see FIG. 1) as the central axis. Further, the stator core 10 is formed, for example, by stacking a plurality of electromagnetic steel plates (for example, silicon steel plates) in the axial direction. As shown in FIG. 3, the stator core 10 is provided with a back yoke 11 having an annular shape when viewed in the axial direction, and a plurality of slots 12 that is provided on the inner radial side of the back yoke 11 and that extends in the axial direction. The stator core 10 is provided with a plurality of teeth 13 on both sides of each slot 12 in the circumferential direction.

Each slot 12 is a part surrounded by a wall portion 11a of the back yoke 11 provided on the outer radial side and circumferential side surfaces 13a of the two teeth 13. The slot 12 is provided with an opening portion 12a that opens to the inner radial side. The slot 12 opens on both sides in the axial direction. The teeth 13 are formed so as to protrude radially inward from the back yoke 11, and a protruding portion 13b configuring an opening portion 12a of the slot 12 is formed on a tip end portion on the inner radial side.

The opening portion 12a has an opening width W1 in the circumferential direction. Here, the opening width W1 corresponds to the distance between the tip end portions of the protruding portions 13b of the teeth 13. A width W2 of a part of the slot 12 in which the coil portion 30 is disposed is larger than the opening width W1. That is, the slot 12 is configured as a semi-open type slot. Here, the width W2 corresponds to the distance between the circumferential side surfaces 13a of the teeth 13 disposed on both sides of the slot 12 in the circumferential direction. The width W2 of the slot 12 is substantially constant in the radial direction.

Structure of Coil Portion

Figure 4:
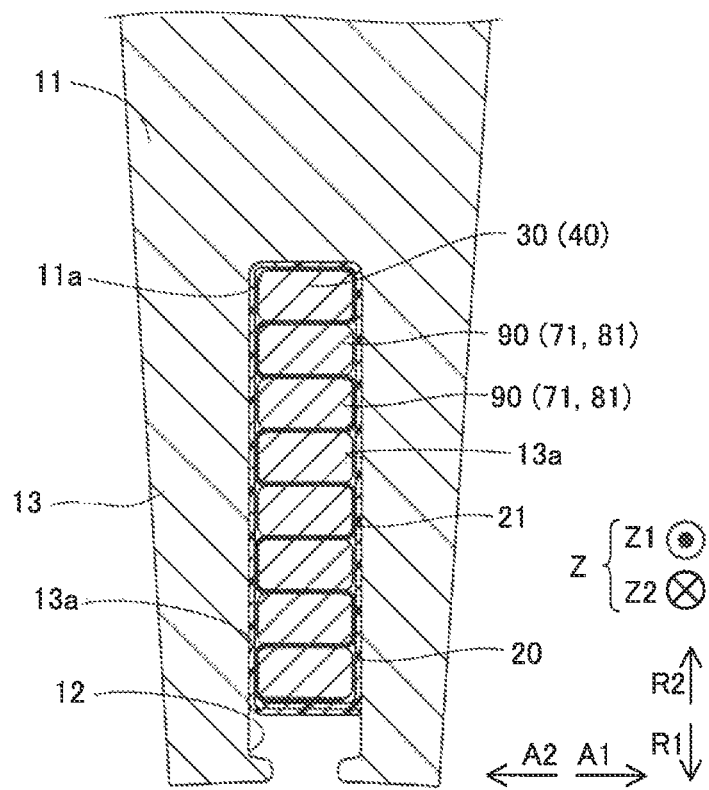
FIG. 4 is a sectional view showing a configuration of a first insulating member and a second insulating member according to the first embodiment.

As shown in FIG. 4, the coil portion 30 is configured of a flat conductor wire. For example, the coil portion 30 is made of copper or aluminum.

As shown in FIG. 2, the coil portion 30 is formed by the first coil assembly 30a provided on one axial side (arrow Z2 direction side) and the second coil assembly 30b provided on the other axial side (arrow Z1 direction side) being combined in the axial direction and joined. The first coil assembly 30a and the second coil assembly 30b are each formed in an annular shape centered around the same central axis C1 (see FIG. 1) as the stator core 10. As shown in FIG. 4, in the first embodiment, the coil portion 30 is formed by joining in a joint portion 90, a first leg portion 71 and a second leg portion 81, described below, of the segment conductors 40.

The coil portion 30 is configured as a wave winding coil, for example. Moreover, the coil portion 30 is configured as a coil of eight turns. That is, the coil portion 30 is configured such that eight segment conductors 40 are disposed in parallel in the slot 12 in the radial direction.

Configuration of Wiring Connection of Coil Portion

Figure 5:
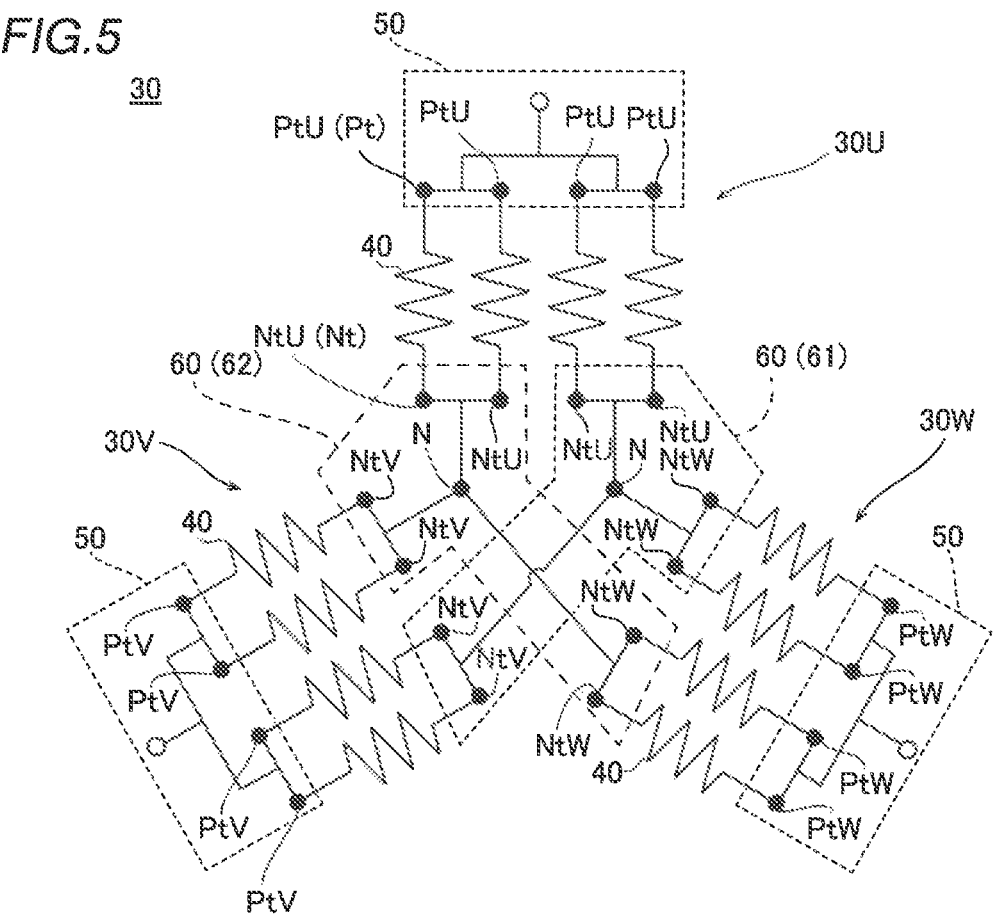
FIG. 5 is a circuit diagram showing a wiring configuration of a coil portion according to the first embodiment.

As shown in FIG. 5, the coil portion 30 is configured to generate magnetic flux by being supplied with three-phase alternating current power from a power supply unit (not shown). Specifically, the coil portions 30 are connected (wired) by three-phase Y-connection. That is, the coil portion 30 includes a U-phase coil portion 30U, a V-phase coil portion 30V, and a W-phase coil portion 30W. The coil portion 30 is provided with a plurality of (for example, two) neutral points N. Specifically, the coil portion 30 is connected in four parallel lines (star connection). That is, the U-phase coil portion 30U is provided with four neutral point connection end portions NtU and four power line connection end portions PtU. The V-phase coil portion 30V is provided with four neutral point connection end portions NtV and four power line connection end portions PtV. The W-phase coil portion 30W is provided with four neutral point connection end portions NtW and four power line connection end portions PtW. In the following description, when the U-phase, the V-phase, and the W-phase are not particularly distinguished for the neutral point connection end portion and the power line connection end portion, the neutral point connection end portion and the power line connection end portion are simply indicated as a "neutral point connection end portion Nt" and a "power line connection end portion Pt".

Configuration of Coil Assembly

As shown in FIG. 2, the first coil assembly 30a is configured of a plurality of first segment conductors 70 (hereinafter, referred to as "first conductors 70") serving as the segment conductors 40. It is preferable that the first coil assembly 30a be configured by combining only the first conductors 70.

The second coil assembly 30b includes a plurality of (for example, three) power segment conductors 50 (hereinafter, referred to as "power conductors 50") serving as the segment conductors 40, and a plurality of (for example, two) neutral-point segment conductors 60 (hereinafter referred to as "neutral-point conductors 60") serving as the segment conductors 40, and second segment conductors 80 (hereinafter, referred to as "second conductors 80") that are conductors (general segment conductors 40) different from the power conductors 50 and the neutral-point conductors 60 among the segment conductors 40 and that configure the coil portion 30. That is, all of the power conductors 50 and the neutral point conductors 60 provided in the stator 100 are provided in the second coil assembly 30b.

Configuration of Segment Conductor

Figure 6:
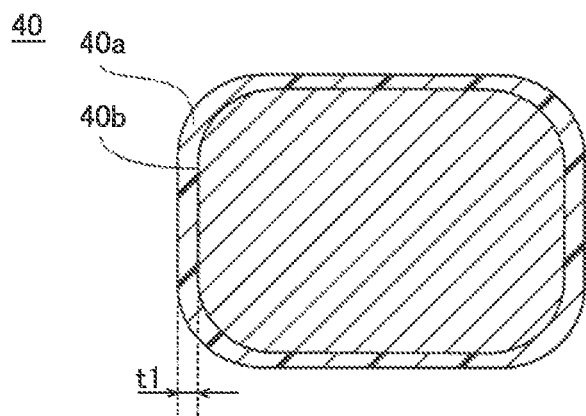
FIG. 6 is a cross-sectional view showing a configuration of a segment conductor according to the first embodiment.

As shown in FIG. 6, the segment conductor 40 is configured as a flat conductor wire having a substantially rectangular cross section. An insulating coating 40a having a thickness t1 is provided on a conductor surface 40b of the segment conductor 40. The thickness t1 of the insulating coating 40a is set, for example, to such an extent that interphase insulating performance (insulation between the first coil end portions 72 and insulation between the second coil end portions 82, see FIG. 2) can be ensured. Note that, in FIG. 6, the size relationship such as the thickness is highlighted for the sake of explanation, and the present disclosure is not limited to this example indicated in the drawing.

Structure of First Conductor and Second Conductor

As shown in FIGS. 7 and 8 the segment conductors 40 include the first conductors 70 disposed on one axial side (Z2 direction side) of the stator core 10 and the second conductors 80 that are disposed on the other axial side (Z1 direction side) of the stator core 10 and that face the first conductors 70 in the axial direction. That is, the coil portion 30 is formed by joining the first conductors 70 and the second conductors 80, which are divided into two in the axial direction. Here, the second conductors 80 are the segment conductors 40 other than the power conductors 50 and the neutral point conductors 60 among the segment conductors 40 that configure the second coil assembly 30b. In the first embodiment, each first conductor 70 includes the first leg portion 71 which extends in the axial direction and which has a length L1 in the axial direction. The first leg portion 71 extends to the other side (Z1 direction side) in the axial direction. Each second conductor 80 includes the second leg portion 81 that is disposed on the Z1 direction side of the first leg portion 71, that extends in the axial direction, and that has a length L2 that is greater than the length L1 in the axial direction. The second leg portion 81 extends to one side (Z2 direction side) in the axial direction.

Figure 7A:
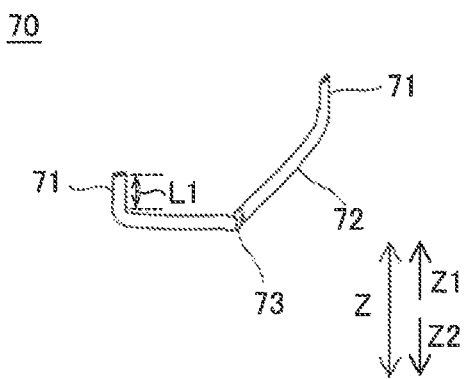
(FIG. 7A is a perspective view of the first segment conductor viewed from the outer radial side.
Figure 7B:
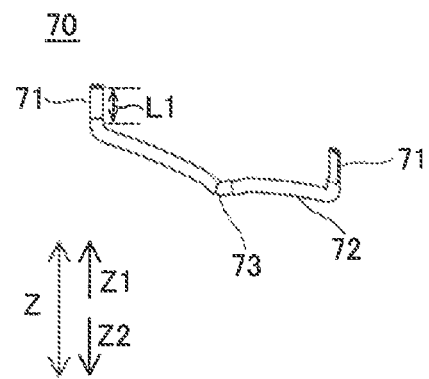
FIG. 7B is a perspective view of the first segment conductor viewed from the inner radial side.)

In the first embodiment, as shown in FIGS. 7A and 7B, the first conductors 70 are formed so as to have a U-shape (substantially U-shape) when viewed in the radial direction by connecting a pair of the first leg portions 71 in which the first leg portions 71 are disposed in the slots 12 different from each other. The coil pitch of the first conductors 70 is six. That is, the first leg portions 71 of the pair of first leg portions 71 are disposed at positions different in the circumferential direction by six slots 12. That is, five slots 12 are provided between the slot 12 in which one first leg portion 71 of the pair of first leg portions 71 is disposed and the slot 12 in which the other first leg portion 71 of the pair of first leg portions 71 is disposed. Specifically, each first conductor 70 includes the pair of the first leg portions 71 that are disposed in different slots 12 and that are each linearly formed along the axial direction, and a first coil end portion 72. The first leg portion 71 means a part disposed in the slot 12 from the axial position of the end face 10a (see FIG. 2) in the axial direction of the stator core 10, and the first coil end portion 72 means a part that is formed to be continuous with the first leg portion 71 and that is disposed on the outer axial side of the end face 10a of the stator core 10. The first coil end portion 72 has a bent shape that bends in the axial direction. Further, the first coil end portion 72 has a first crank part 73 formed in a crank shape in which the first crank part 73 is bent in a stepwise manner by the width of one segment conductor 40 in the radial direction when viewed in the axial direction. That is, the radial width of the first crank part 73 is twice the width of one segment conductor 40.

Further, the lengths L1 of the pair of first leg portions 71 in the axial direction are substantially equal to each other. The length L1 in the axial direction means the length of the part of the first conductor 70 that extends linearly in the axial direction within the slot 12. The length L1 in the axial direction is smaller than a length L3 of the stator core 10 in the axial direction (see FIG. 2). The length L3 of the stator core 10 in the axial direction means an axial distance (interval) between the end face 10a and the end face 10b in the axial direction.

Figure 8A:
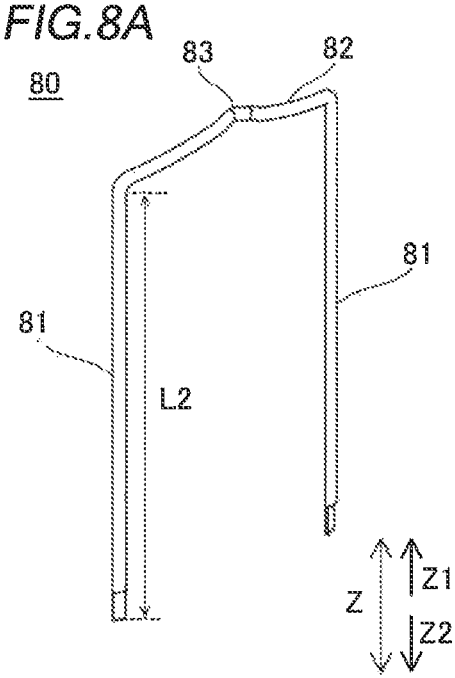
(FIG. 8A is a perspective view of the second segment conductor viewed from the outer radial side.
Figure 8B:
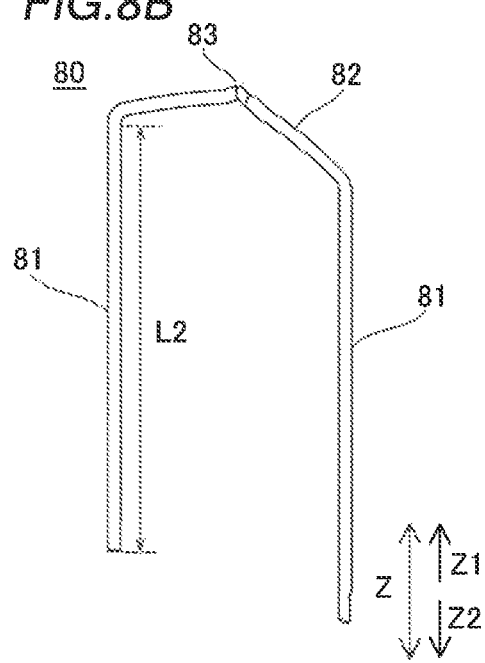
FIG. 8B is a perspective view of the second segment conductor viewed from the inner radial side.)

Similarly, as shown in FIGS. 8A and 8B, the second conductor 80 includes a pair of the second leg portions 81 disposed in the slot 12 and the second coil end portion 82. The second coil end portion 82 also has a second crank part 83. In the first embodiment, the second conductor 80 is formed to have a U-shape by connecting the pair of second leg portions 81, which is disposed in the different slots 12, to each other. The axial lengths L2 of the pair of second leg portions 81 of the second conductor 80 are substantially equal to each other. Further, the axial length L2 of the pair of second leg portions 81 of the second conductor 80 is larger than the axial length L1 of the pair of first leg portions 71 of the first conductor 70 (L2>L1). The axial length L2 means the length of the part of the second conductor 80 that extends linearly in the axial direction within the slot 12.

Configuration of Power Conductor

Figure 9:
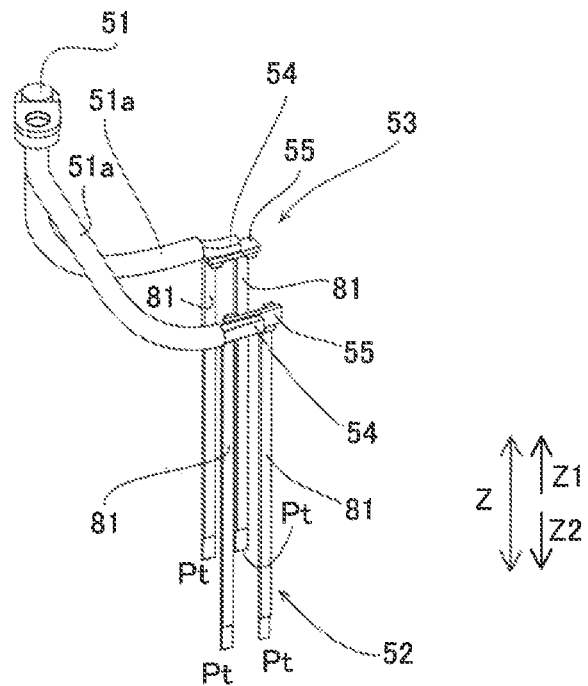
FIG. 9 is a figure showing a configuration of a power segment conductor according to the first embodiment.

As shown in FIG. 9, in the power conductor 50, a plurality (for example, four) of the power line connection end portions Pt of the same phase are electrically connected to each other, and a plurality of the connected power line connection end portions Pt and one power terminal member 51 are electrically connected. In the power conductor 50, the second leg portion 81 joined to one of the pair of first leg portions 71 (see FIG. 12) and the power terminal member 51 are joined. The power conductor 50 has a function of introducing electric power into the coil portion 30 from the power supply unit (not shown).

Specifically, the power conductor 50 includes an outer radial side power conductor 52 that is disposed on the outer radial side of the slot 12 (see FIG. 1) and that has the power line connection end portion Pt, and an inner radial side power conductor 53 that is disposed on the inner radial side and the outer axial side of the outer radial side power conductor 52 and that has the power line connection end portion Pt. In other words, the power conductor 50 is formed in a bifurcated shape.

The outer radial side power conductor 52 and the power terminal member 51 are electrically connected by a lead wire 54. The inner radial side power conductor 53 and the power terminal member 51 are electrically connected to each other by the lead wire 54. The outer radial side power conductor 52 and the inner radial side power conductor 53 are electrically connected via the power terminal member 51 and the lead wire 54. The lead wire 54 is formed of a stranded wire (conductor) and an insulating tube 51a is disposed on the outer circumference, for example.

The outer radial side power conductor 52 and the inner radial side power conductor 53 are each provided with the second leg portion 81 but are not provided with the first coil end portion 72 or the second coil end portion 82. Further, in the outer radial side power conductor 52 and the inner radial side power conductor 53, the lead wire 54 and the second leg portion 81 are joined via a conductor plate 55. For example, the joining is performed by brazing or welding (for example, any one of resistance welding, arc welding, laser welding, or high energy beam welding).

Structure of Neutral Point Conductor

As shown in FIG. 1, the neutral point conductor 60 includes an outer radial side neutral point conductor 61 and an inner radial side neutral point conductor 62. As shown in FIG. 5, the outer radial side neutral point conductor 61 and the inner radial side neutral point conductor 62 each include the neutral point N, and the neutral point connection end portion NtU of the U-phase coil portion 30U, the neutral point connection end portion NtV of the V-phase coil portion 30V, and the neutral point connection end portion NtW of the W-phase coil portion 30W are electrically connected.

Figure 10:
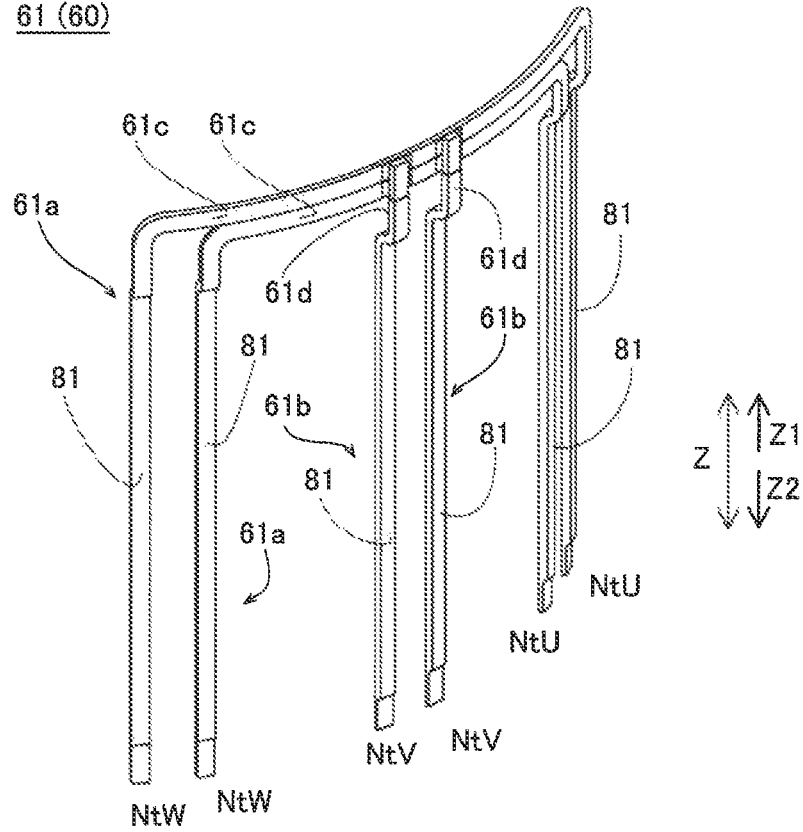
FIG. 10 is a figure showing a configuration of an outer radial side neutral point conductor according to the first embodiment.

As shown in FIG. 10, each outer radial side neutral point conductor 61 includes two U-phase W-phase neutral point segment conductors 61a and two V-phase neutral point segment conductors 61b. The U-phase W-phase neutral point segment conductors 61a include the U-phase second leg portions 81 connected to the first leg portions 71 of the first conductors 70 for the U-phase among the three-phase alternating current, the W-phase second leg portions 81 connected to the W-phase first leg portions 71, and two neutral point coil end portions 61c that each connect the U-phase second leg portion 81 and the W-phase second leg portion 81. The neutral point coil end portion 61c is formed to be continuous with the U-phase second leg portion 81 and is formed to be continuous with the W-phase second leg portion 81.

The U-phase W-phase neutral point segment conductor 61a is formed to have a substantially U-shape (substantially U-shape) when viewed from the inner radial side. The V-phase neutral point segment conductor 61b is formed in a substantially linear shape when viewed from the inner radial side.

As shown in FIG. 1, the neutral point coil end portion 61c is formed along the circumferential direction on the outer radial side of the second coil end portion 82 of the second conductor 80. The neutral point coil end portion 61c is formed in a substantially arc shape when viewed in the arrow Z2 direction. One of the two U-phase W-phase neutral point segment conductors 61a is disposed on the other outer axial side (arrow Z1 direction side).

As shown in FIG. 10, the V-phase neutral point segment conductor 61b includes a V-phase second leg portion 81 connected to the V-phase first conductor 70 and a neutral point coil end portion 61d. The neutral point coil end portion 61d is formed so as to protrude from the second leg portion 81 in the outer axial direction (in the arrow Z1 direction). The two neutral point coil end portions 61d are electrically joined to each other by being joined to both of the two neutral point coil end portions 61c.

Figure 11:
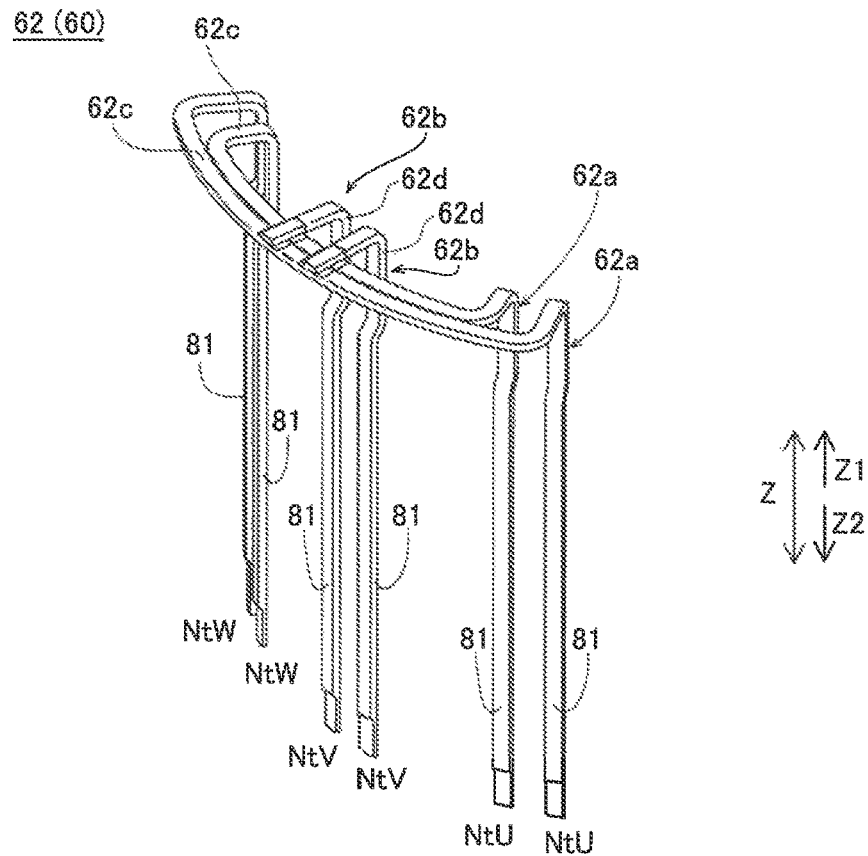
FIG. 11 is a figure showing a configuration of an inner radial side neutral point conductor according to the first embodiment.

As shown in FIG. 11, the inner radial side neutral point conductor 62 includes two U-phase W-phase neutral point segment conductors 62a and two V-phase neutral point segment conductors 62b. The U-phase W-phase neutral point segment conductors 62a include the U-phase second leg portions 81 connected to the first leg portions 71 of the first conductors 70 for the U-phase among the three-phase alternating current, the W-phase second leg portions 81 connected to the W-phase first conductor 70, and the neutral point coil end portions 62c that each connect the U-phase second leg portion 81 and the W-phase second leg portion 81. The neutral point coil end portions 62c are formed to be continuous with the U-phase second leg portions 81 and to be continuous with the W-phase second leg portion 81. As a result, the U-phase W-phase neutral point segment conductors 62a are formed in a substantially U-shape when viewed from the inner radial side. The V-phase neutral point segment conductors 62b are formed in a substantially linear shape when viewed from the inner radial side.

Figure 12:
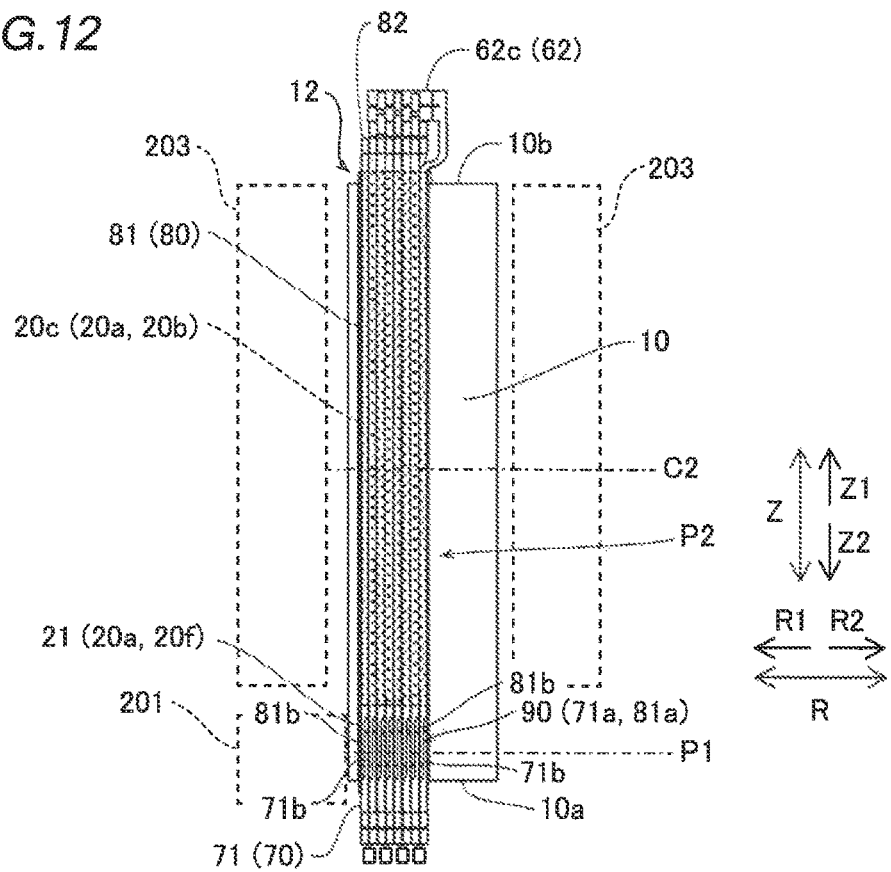
FIG. 12 is a sectional view taken along line 1000-1000 in FIG. 1.

As shown in FIG. 12, the neutral point coil end portion 62c is formed so as to protrude axially outward with respect to the second coil end portion 82 of the second conductor 80. The neutral-point coil end portion 62c is disposed close to the outer axial side of the second coil end portion 82 of the second conductor 80, and is formed along the circumferential direction when viewed in the axial direction. One of the two U-phase W-phase neutral point segment conductors 62a is disposed on outer radial side of the other U-phase W-phase neutral point segment conductor 62a.

The V-phase neutral point segment conductor 62b includes the V-phase second leg portion 81 connected to the first leg portion 71 of the V-phase first conductor 70, and a neutral point coil end portion 62d. The neutral point coil end portion 62d is formed so as to protrude from the second leg portion 81 to the outer axial side (arrow Z1 direction). The two neutral point coil end portions 62d are electrically joined by being joined to both of the two neutral point coil end portions 62c.

Structure of Joint Portion

Figure 13:
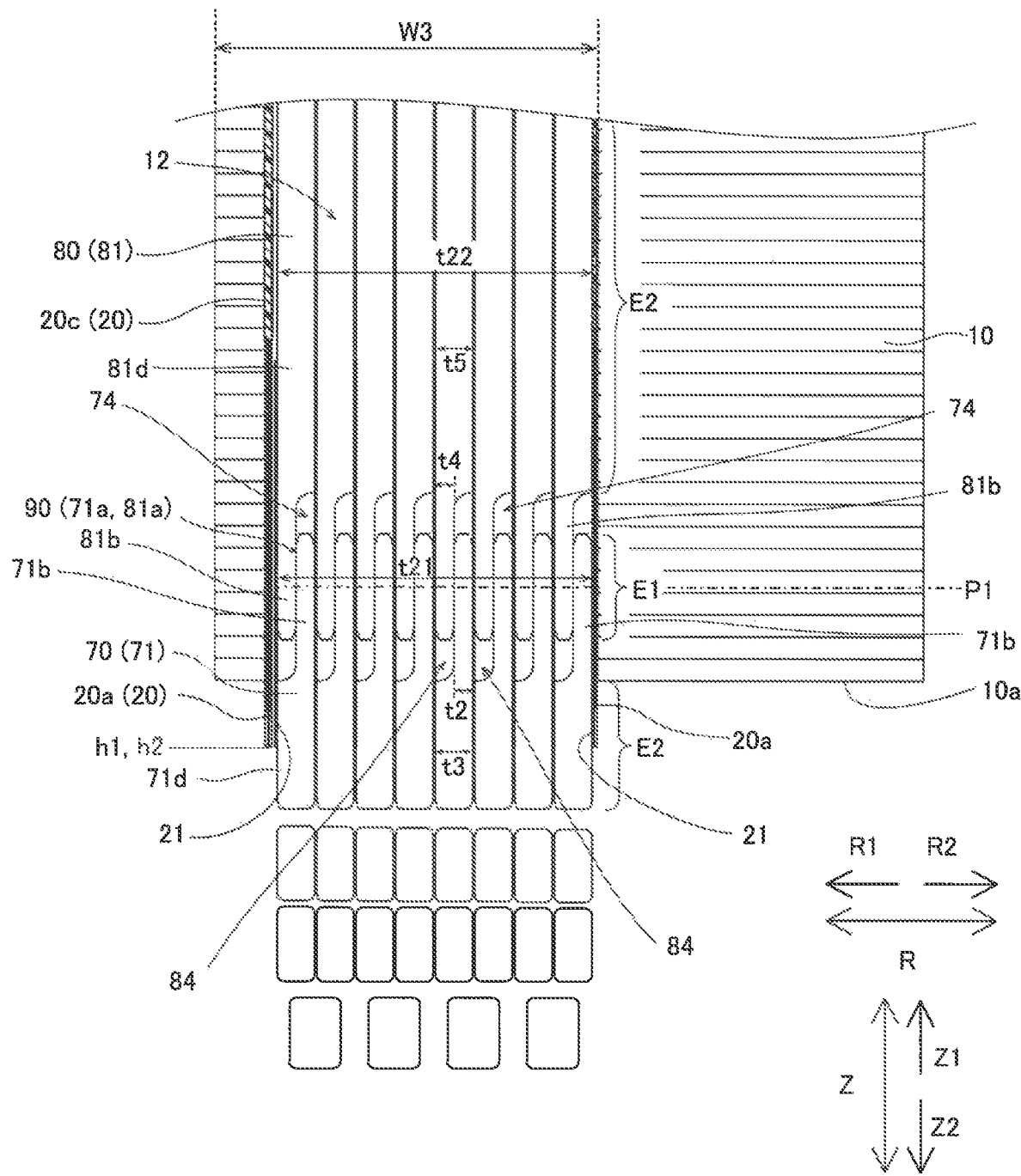
FIG. 13 is a partially enlarged view near the joint portion in FIG. 12.

As shown in FIGS. 12 and 13, the plurality of first leg portions 71 is provided in one slot 12 such that the first leg portions 71 are adjacent to each other in the radial direction of the stator core 10. In addition, the plurality of second leg portions 81 is provided in one slot 12 such that the second leg portions 81 are adjacent to each other in the radial direction of the stator core 10. The joint portion 90 is formed by joining a first surface 71a of the first leg portion 71 and a second surface 81a of the second leg portion 81, which are both described below.

Further, in one slot 12, the plurality of first conductors 70 (first leg portions 71) and the plurality of second conductors 80 (second leg portions 81) are joined. Specifically, in one slot 12, a plurality of first surface disposition portions 71b each provided with the first surface 71a, which is described below, of the first leg portion 71, and a plurality of second surface disposition portions 81b each provided with the second surface 81a, which is described below, of the second leg portion 81 are alternately arranged along the radial direction. That is, the joint portions 90, which are described below, of the first leg portions 71 and the second leg portions 81 are disposed adjacent to each other in the radial direction in one slot 12. The first surface disposition portion 71b and the second surface disposition portion 81b are examples of a "first surface side part" and a "second surface side part" of the claims, respectively.

Specifically, in the first embodiment, the joint portions 90 of the first conductor 70 and the second conductor 80 disposed in one slot 12 are configured so as to overlap with the joint portion 90 adjacent in the radial direction when viewed from the radial direction. Specifically, the plurality of (all) joint portions 90 disposed in one slot 12 are configured to overlap with each other when viewed in the radial direction. That is, all the joint portions 90 disposed in one slot 12 are disposed in a state in which the joint portions 90 are aligned along the horizontal direction. In other words, each position of the joint portions 90 in the axial direction in one slot 12 are substantially equal to each other. As will be described below, the joint portions 90 are parts in which the first surfaces 71a of the first leg portions 71 and the second surfaces 81a of the second leg portions 81 are joined (overlapped) when viewed from the radial direction.

Figure 14:
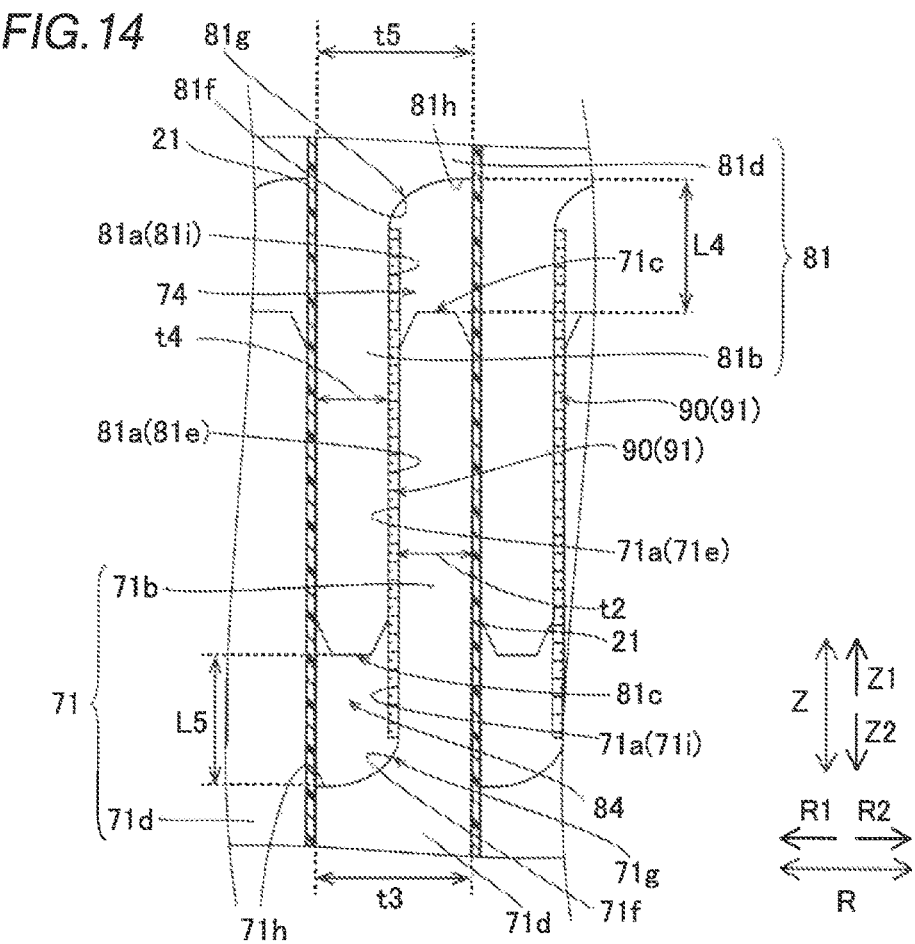
FIG. 14 is a partially enlarged view near the joint portion in FIG. 13.

Further, as shown in FIG. 14, each of the tip end portion 71c of the first leg portion 71 and tip end portion 81c of the second leg portion 81 has a tapered shape. Specifically, when viewed from the circumferential direction (A direction), each of the tip end portion 71c of the first leg portion 71 and the tip end portion 81c of the second leg portion 81 has a tapered shape.

The first surface 71a provided so as to extend in the axial direction is provided on the tip end portion 71c side of each of the first leg portions 71 of the plurality of first conductors 70. Further, the second surface 81a provided so as to extend in the axial direction is provided on the tip end portion 81c side of each of the second leg portions 81 of the plurality of second conductors 80. Specifically, in the first embodiment, each of the first surface 71a and the second surface 81a is provided so as to extend parallel to the axial direction. Further, the first leg portion 71 and the second leg portion 81 include the first surface disposition portion 71b provided with the first surface 71a and the second surface disposition portion 81b provided with the second surface 81a, respectively.

The first leg portion 71 has a first leg portion body portion 71d that is provided to be continuous with the first surface disposition portion 71b on which the first surface 71a is provided. The first leg portion body portion 71d is provided on the opposite side (Z2 direction side) of the first surface disposition portion 71b from the tip end portion 71c. Further, the second leg portion 81 has a second leg portion body portion 81d that is provided to be continuous with the second surface disposition portion 81b on which the second surface 81a is provided. The second leg portion body portion 81d is provided on the opposite side (Z1 direction side) of the second surface disposition portion 81b from the tip end portion 81c.

Figure 15:
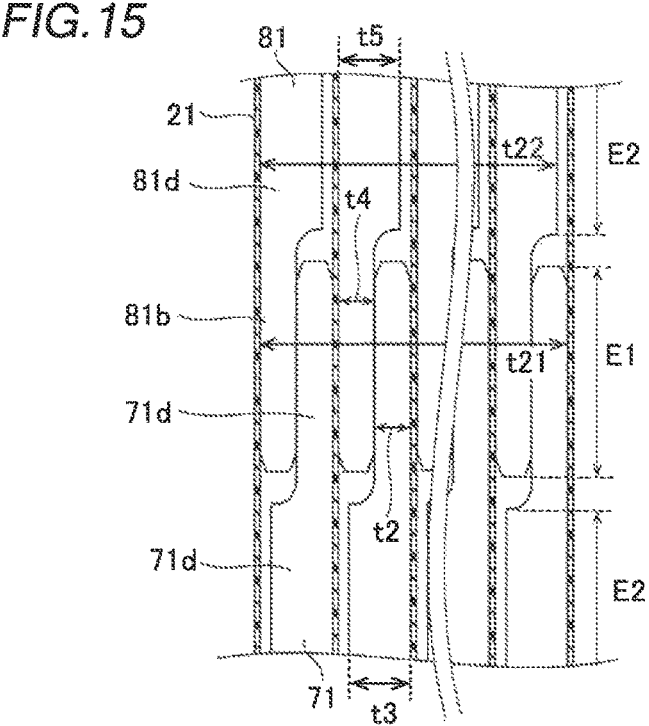
FIG. 15 is a partially enlarged view of the vicinity of the joint portion (an example in which the thickness of the joint portion is larger than the thickness of the part in which the first surface and the second surface are not provided).

Here, in the first embodiment, as shown in FIG. 14, a radial thickness t2 of the first surface disposition portion 71b is smaller than a radial thickness t3 of the first leg portion body portion 71d. Further, a radial thickness t4 of the second surface disposition portion 81b is smaller than a radial thickness t5 of the second leg portion body portion 81d. Then, as shown in FIG. 15, in the radial direction, a thickness (t2+t4) of the joint portion 90 is equal to or more than the thickness (t3 or t5) of a part E2 other than the joint portion 90. A total thickness t21 of the joint portion 90 is also equal to or more than a total thickness t22 of the part E2 other than the joint portion 90.

Here, in the first embodiment, as shown in FIG. 13, a minimum value $t2_{min}$ of a dimensional variation range of the radial thickness t2 of the first surface disposition portion 71b among the plurality of first conductors 70 disposed in one slot 12 is equal to or more than half of a maximum value $t3_{max}$, of a dimensional variation range of the thickness t3 of the first leg portion body portion 71d among the plurality of first conductors 70 disposed in one slot 12. Specifically, there are cases in which the thickness t2 of the first surface disposition portion 71b and the thickness t3 of the first leg portion body portion 71d of the first conductor 70 are varied (dimensional variation) due to variations in the shape of the first conductor 70 and manufacturing variations when the first surface disposition portion 71b is machined. Then, the first conductor 70 is manufactured (machined) so that the minimum value $t2_{min}$ of the dimensional variation range of the radial thickness t2 of the first surface disposition portion 71b (when the thickness t2 is the smallest within the range of the dimensional variation) is equal to or more than half of the maximum value $t3_{max}$ of the dimensional variation range of the thickness t3 of the first leg portion body portion 71d (when the thickness t3 is the largest within the range of the dimensional variation). Similarly, the minimum value $t4_{min}$ of the dimensional variation range of the radial thickness t4 of the second surface disposition portion 81b among the plurality of second conductors 80 disposed in one slot 12 is equal to or more than half of the maximum value $t5_{max}$ of the dimensional variation range of the thickness t5 of the second leg portion body portion 81d among the plurality of second conductors 80 disposed in one slot 12. The thickness t2 and the thickness t4 are substantially equal, and the thickness t3 and the thickness t5 are substantially equal.

With the configuration as described above, in the first embodiment, in the plurality of first conductors 70 and the plurality of second conductors 80 disposed in one slot 12, the minimum value $t21_{min}$ of the dimensional variation range of the total radial thickness t21 of the joint portion 90 (part E1) is equal to or more than the maximum value $t22_{max}$ of the dimensional variation range of the total radial thickness t22 of the part E2 in which the first surface 71a and the second surface 81a are not provided. Here, the joint portion 90 (part E1) is a part in which the first surface 71a and the second surface 81a are joined to each other (the part in which the first surface 71a and the second surface 81a overlap each other when viewed from the radial direction). Further, the part E2 in which the first surface 71a and the second surface 81a are not provided is the part in which a plurality of the first leg portion body portions 71d are stacked in the radial direction and a part in which a plurality of the second leg portion body portions 81d are stacked in the radial direction. That is, in the joint portion 90 (part E1), a plurality of the first surface disposition portions 71b ($t2_{min} \geq t3_{max}/2$) and a plurality of the second surface disposition portions 81b ($t4_{min} \geq t5_{max}/2$) are stacked alternately along the radial direction (for example, eight of each and 16 in total). Further, in the part E2, the plurality of the first leg portion body portions 71d (t3) or the plurality of second leg portion body portions 81d (t5) (for example, eight) are stacked along the radial direction. As a result, the relationship of $t21_{min}$ (=8×$t2_{min}$+8×t4min)≥$t22_{max}$ (=8×$t3_{max}$ or 8×t5max) is established.

In addition, in FIG. 13, the state of $t21_{min}$=$t22_{max}$ is shown. That is, the state of $t2_{min}$=$t3_{max}$×½ and $t4_{min}$=$t5_{max}$×½ is shown. In contrast, in FIG. 15, the state of $t21_{min}$>$t22_{max}$ is shown. That is, the state of $t2_{min}$>$t3_{max}$×½ and $t4_{min}$>$t5_{max}$×½ is shown.

Further, in the first embodiment, as shown in FIG. 14, provided is a conductive adhesive 91 that adheres the first surface 71a and the second surface 81a in the joint portion 90 and that makes the first leg portion 71 and the second leg portion 81 conductive. In addition, in FIG. 13 and FIG. 15, the conductive adhesive 91 is omitted. The detailed configuration of the conductive adhesive 91 will be described later. In the plurality of first conductors 70 and the plurality of second conductors 80 disposed in one slot 12, the minimum value $t21_{min}$ of the dimensional variation range of the total radial thickness t21 of the joint portion 90 (part E1) including the conductive adhesive 91 is equal to or more than the maximum value $t22_{max}$ of the dimensional variation range of the total radial thickness t22 of the part E2 in which the first surface 71a and the second surface 81a are not provided. Here, as described below, the conductive adhesive 91 contains a member (resin member) that volatilizes when heated, and the volume of the conductive adhesive 91 is decreased by heating the volatilizing member. Thus, the thickness of the conductive adhesive 91 is about the thickness of silver particles described later, which remain as a result of volatilization of the volatilizing member. Therefore, even when the thickness of the conductive adhesive 91 is taken into consideration, the relationship of $t21_{min} \geq t22_{max}$ is maintained.

Further, in the first embodiment, as shown in FIGS. 13 to 15, provided is a sheet-shaped second insulating member 21 that insulates the joint portions 90 adjacent to each other in the radial direction, among the joint portions 90. The detailed configuration of the second insulating member 21 will be described later. Further, the second insulating member 21 is disposed between the joint portions 90, between the first leg portion body portions 71d, and between the second leg portion body portions 81d. That is, the second insulating member 21 is disposed so as to extend from the first leg portion body portion 71d to the second leg portion body portion 81d. In the plurality of first conductors 70 and the plurality of second conductors 80 disposed in one slot 12, the minimum value $t21_{min}$ of the dimensional variation range of the total radial thickness t21 of the joint portion 90 (part E1) including the second insulating member 21 is equal to or more than the maximum value $t22_{max}$ of the dimensional variation range of the total radial thickness t22 of the part E2 including the second insulating member 21. That is, since the second insulating member 21 is disposed so as to extend across from the first leg portion body portion 71d to the second leg portion body portion 81d, the thickness of the second insulating member 21 is included in each of the thickness $t21_{min}$ and the thickness t22max. In contrast, even when the thickness of the second insulating member 21 is taken into consideration, the relationship of $t21_{min} \geq t22_{max}$ is maintained.

Further, in the first embodiment, as shown in FIG. 13, in the plurality of first conductors 70 and the plurality of second conductors 80 disposed in one slot 12, the maximum value $t21_{max}$ of the dimensional variation range of the total radial thickness t21 of the joint portions 90 (part E1) is equal to or less than the radial width W3 of the slot 12. That is, the first conductor 70 and the second conductor 80 do not protrude toward the inner radial side (R1 direction side) of the slot 12.

Further, the coil portion 30 (see FIG. 2) includes the joint portion 90 in which the first surface 71a and the second surface 81a are joined in one slot 12. That is, the joint portion 90 is located between the end face 10a (see FIG. 2) and the end face 10b (see FIG. 2) of the stator core 10 in the axial direction.

As shown in FIG. 14, the first surface 71a and the second surface 81a are joined to each other in the radial direction (R direction) at the joint portion 90. Specifically, a surface part 71e on the tip end portion 71c side of the first surface 71a and a surface part 81e on the tip end portion 81c side of the second surface 81a are joined in the radial direction. In other words, the first surface 71a and the second surface 81a are joined in a state of being displaced in the axial direction.

The first surface 71a (surface part 71e) and the second surface 81a (surface part 81e) are provided so as to extend parallel to the axial direction and to face each other in the radial direction. That is, each of the first surface 71a (surface part 71e) and the second surface 81a (surface part 81e) extends so as to be orthogonal to the radial direction. Further, the first surface 71a (surface part 71e) faces the inner radial side (R1 direction side), and the second surface 81a (surface part 81e) faces the outer radial side.

Between the first conductor 70 and the second conductor 80, which face each other in the axial direction, a first clearance portion 74 that extends in the axial direction is provided between the tip end portion 71c of the first leg portion 71 and the second leg portion 81. Further, between the first conductor 70 and the second conductor 80, which face each other in the axial direction, a second clearance portion 84 that extends in the axial direction is provided between the tip end portion 81c of the second leg portion 81 and the first leg portion 71. Specifically, when viewed from the circumferential direction (A direction), the first clearance portion 74 is surrounded by the first leg portion 71 and the second leg portion 81 that are joined to each other, and the second insulating member 21 adjacent on the inner radial side (R1 direction side). When viewed from the circumferential direction (A direction), the second clearance portion 84 is surrounded by the first leg portion 71 and the second leg portion 81 that are joined to each other, and the second insulating member 21 adjacent on the outer radial side (R2 direction side). The details of the configuration of the second insulating member 21 will be described below.

Further, each of the first clearance portion 74 and the second clearance portion 84 is provided for each set of the first leg portion 71 and the second leg portion 81 that are joined to each other. That is, a plurality of each of the first clearance portion 74 and the second clearance portion 84 is provided side by side in the radial direction (eight in the first embodiment, see FIG. 13). Specifically, when viewed from the radial direction, the plurality of first clearance portions 74 overlaps with each other, and the plurality of second clearance portions 84 overlaps with each other.

A length L4 of the first clearance portion 74 in the axial direction is substantially equal to a length L5 of the second clearance portion 84 in the axial direction. The length L4 of the first clearance portion 74 means the distance in the axial direction between the tip end portion 71c of the first leg portion 71 and the second leg portion 81. Further, the length L5 of the second clearance portion 84 means the distance in the axial direction between the tip end portion 81c of the second leg portion 81 and the first leg portion 71.

Both the axial length L4 of the first clearance portion 74 and the axial length L5 of the second clearance portion 84 are larger than the thickness t2 of the first surface disposition portion 71b provided with the first surface 71a of the first leg portion 71 and the thickness t4 of the second surface disposition portion 81b provided with the second surface 81a of the second leg portion 81, in the radial direction. The length L4 of the first clearance portion 74 and the length L5 of the second clearance portion 84 are each set to a length that can sufficiently absorb dimensional variations that occur in the manufacture of the first conductor 70 and the second conductor 80, and the assembly variation that occurs when the first conductor 70 and the second conductor 80 are assembled.

Further, between the first surface disposition portion 71b provided with the first surface 71a of the first leg portion 71 and the first leg portion body portion 71d, the first step portion 71g including a corner portion inner surface 71f that faces the second clearance portion 84 and that has a round shape is provided. Further, between the second surface disposition portion 81b provided with the second surface 81a of the second leg portion 81 and the second leg portion body portion 81d, the second step portion 81g including a corner portion inner surface 81f that faces the first clearance portion 74 and that has a round shape is provided. Specifically, the corner portion inner surface 71f and the corner portion inner surface 81f have an arc shape with a curvature radius smaller than the thickness t2 of the first surface disposition portion 71b in the radial direction and the thickness t4 of the second surface disposition portion 81b in the radial direction, respectively. In this case, the first leg portion 71 and the second leg portion 81 are provided with a flat surface 71h and a flat surface 81h that are provided to be continuous with the corner portion inner surface 71f and the corner portion inner surface 81f, respectively. Each of the flat surface 71h and the flat surface 81h is provided so as to extend orthogonal to the axial direction.

Further, as shown in FIG. 13, each of the first clearance portion 74 and the second clearance portion 84 is disposed in the slot 12. Specifically, the entirety of each of the first clearance portion 74 and the second clearance portion 84 is disposed in the slot 12.

Further, since the length L1 of the pair of first leg portions 71 (see FIG. 7) and the length L2 of the pair of second leg portions 81 (see FIG. 8) are different from each other, by joining the first surface 71a of the first leg portion 71 and the second surface 81a of the second leg portion 81, each of the first clearance portion 74 and the second clearance portion 84 (joint portion 90) is provided on the end face 10a side of the axial center C2 in the axial direction (see FIG. 12). As a result, each of the first clearance portion 74 and the second clearance portion 84 is provided closer to the end face 10a of the stator core 10 than the axial center C2 of the stator core 10. Specifically, the edge portion of the second clearance portion 84 on one side (Z2 direction side) in the axial direction is provided at a position substantially the same as the end face 10a of the stator core 10 in the axial direction. Further, the edge portion of the second clearance portion 84 on one side (Z2 direction side) in the axial direction may be provided within a range of substantially insulating creepage distance from the end face 10a in the Z1 direction or the Z2 direction.

Further, the stator 100 includes a conductive adhesive 91 that adheres the first surface 71a and the second surface 81a at the joint portion 90 and that makes the first leg portion 71 and the second leg portion 81 conductive. The conductive adhesive 91 is a paste joining material (silver nanopaste) that contains, as conductive particles, metal particles obtained by miniaturizing silver to a nanometer level, in a solvent. Further, the conductive adhesive 91 is configured to be melted by heat.

Further, the conductive adhesive 91 contains a member (resin member) that volatilizes when heated, and has a function of bringing the first surface 71a and the second surface 81a close to each other when the volatilizing member is heated and the volume of the conductive adhesive 91 is decreased. Further, in order to join the first surface 71a and the second surface 81a, the first conductor 70 and the second conductor 80 are assembled in a state in which the conductive adhesive 91 is applied in advance to a part corresponding to at least one of the joint portion 90 of the first surface 71a and the second surface 81a (at least one of the surface part 71e and the surface part 81e). In FIG. 14, the thickness of the conductive adhesive 91 is emphasized for the sake of explanation, and the present disclosure is not limited to this example indicated in the drawing.

The conductive adhesive 91 is applied to a surface part 71i, which faces the second clearance portion 84 when viewed from the radial direction, of the first surface 71a, and a surface part 81i, which faces the first clearance portion 74 when viewed from the radial direction, of the second surface 81a, in addition to at least one of the surface part 71e and the surface part 81e. Specifically, the conductive adhesive 91 is applied to the entirety of each of the surface part 71i and the surface part 81i. That is, each of the first surface 71a and the second surface 81a is entirely covered with the conductive adhesive 91 when viewed from the radial direction. The conductive adhesive 91 is not applied to each of the corner portion inner surface 71f and the corner portion inner surface 81f.

Configuration of First Insulating Member

Figure 16:
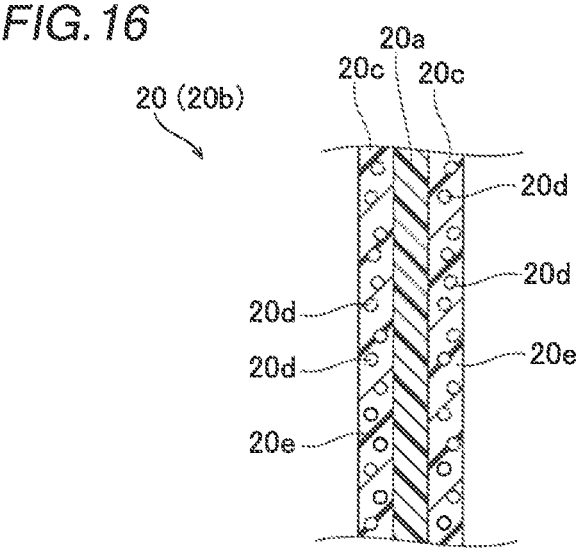
FIG. 16 is a sectional view schematically showing a configuration of the first insulating member according to the first embodiment.
Figure 17:
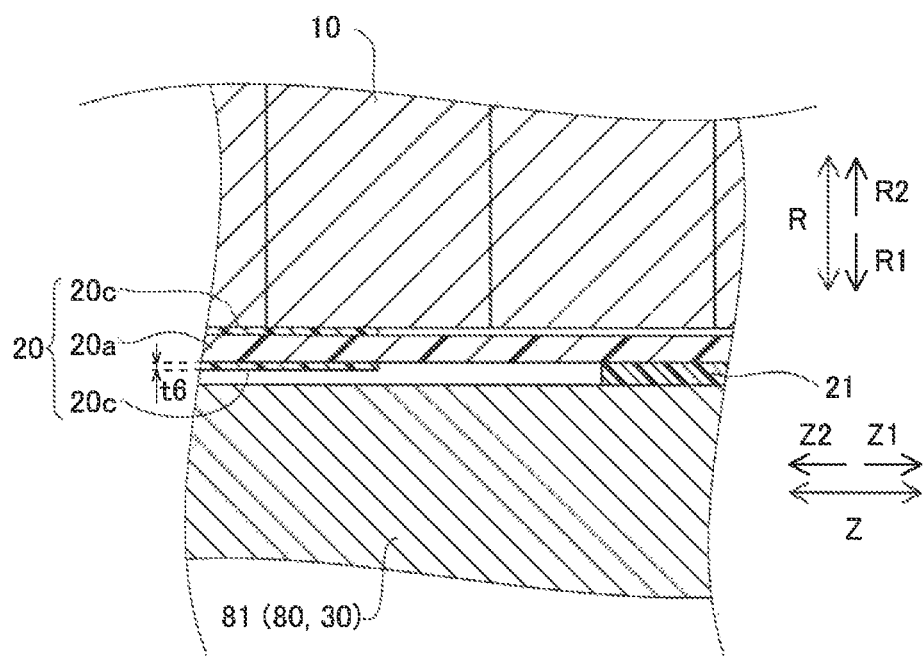
FIG. 17 is a sectional view showing the configuration of the first insulating member and the second insulating member including a fixing layer before foaming according to the first embodiment.
Figure 18:
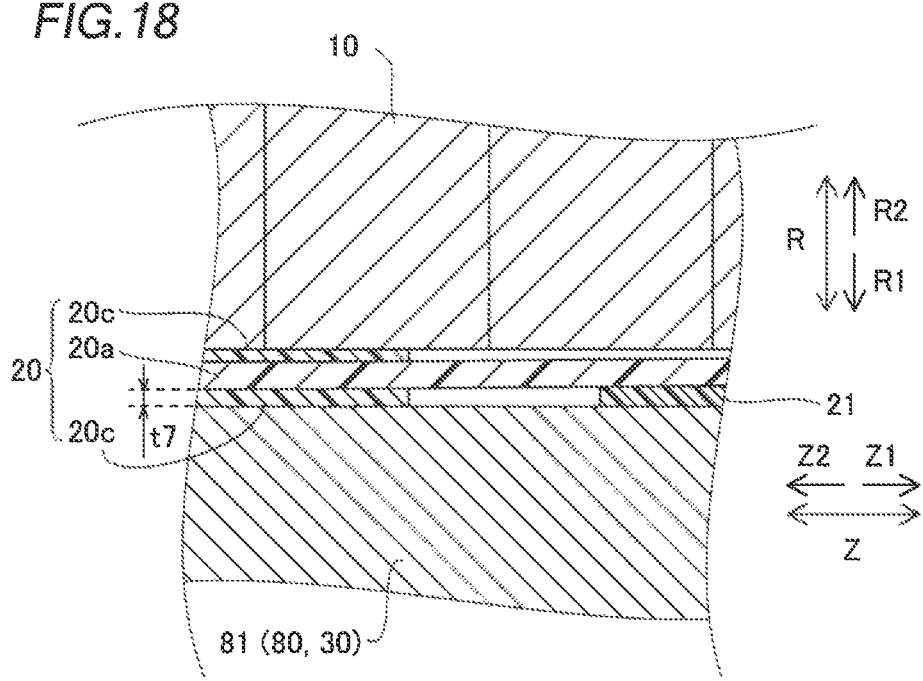
FIG. 18 is a sectional view showing the configuration of the first insulating member and the second insulating member including a fixing layer after foaming according to the first embodiment.

As shown in FIG. 4, the first insulating member 20 is disposed between the wall portion 11a and the teeth 13 and the first leg portion 71 and the second leg portion 81 (segment conductor 40). As shown in FIG. 16, the first insulating member 20 has a three-layer configuration. Specifically, as shown in FIG. 12, the first insulating member 20 includes, in the slot 12: an insulating layer 20a that is provided between the wall portion 11a of the back yoke 11 and the circumferential side surface 13a of the teeth 13 (see FIG. 4), and the first leg portion 71 and the second leg portion 81, and that insulates the wall portion 11a and the circumferential side surface 13a from the first leg portion 71 and the second leg portion 81; and a fixing layer 20c that is provided so as to overlap with a part 20b at a position (region) (P2) different from the position P1 in the axial direction corresponding to the joint portion 90 among the insulating layer 20a and that fixes the stator core 10 and the second leg portion 81. The fixing layer 20c is preferably configured as an adhesive layer containing an adhesive. In addition, the position P2 includes, in the axial direction, the entire region inside the slot 12 of the part excluding the axial position P1, and a part near the end face 10b of the stator core 10 (including the part outside the slot 12 in the axial direction) for example.

And the first insulating member 20 is disposed so as to integrally cover the surroundings of the second leg portions 81 disposed in parallel in the radial direction when viewed in the arrow Z2 direction. In other words, both sides in the circumferential direction and both sides in the radial direction of the second leg portions 81 disposed in parallel in the radial direction are covered by the first insulating member 20. In this way, the first insulating member 20 can ensure the insulation between the joint portion 90 and the stator core 10.

The insulating layer 20a is configured of a polyphenylene sulfide resin (PPS), for example. The insulating layer 20a may be formed in a non-woven fabric form such as aramid paper. In addition, as shown in FIG. 12, the insulating layer 20a is provided across from the end face 10a on one axial side of the stator core 10 to the end face 10b on the other axial side. That is, the insulating layer 20a is disposed so as to cover the wall portion 11a and the circumferential side surface 13a in each slot. In addition, to "cover" does not only mean to cover all parts of the wall portion 11a and the circumferential side surface 13a, but means a broad concept including a case in which the inner radial side part (distal end gap part) of the circumferential side surface 13a is exposed, as shown in FIG. 4.

As shown in FIG. 16, the fixing layer 20c includes a foaming agent 20d (expanding agent) that foams due to heat. Specifically, the fixing layer 20c is formed, for example, by mixing a plurality of capsule bodies serving as the foaming agent 20d with a thermosetting resin 20e. The foaming agent 20d is configured to expand the volume of the capsule body when heated to a foaming temperature T1 or higher. The thickness of the fixing layer 20c increases from the thickness t6 (see FIG. 17) to the thickness t7 (see FIG. 18) by being heated in the manufacturing process of the stator 100, for example. As a result, the fixing layer 20c fills the space between the second leg portion 81 and the wall portion 11a and the circumferential side surface 13a by the foaming agent 20d foaming (expanding) when heated.

Further, the thermosetting resin 20e is configured to be cured by being heated to a curing temperature T2 or higher which is higher than the foaming temperature T1. The thermosetting resin 20e forming the fixing layer 20c is, for example, an epoxy resin. The fixing layer 20c is configured such that when the fixing layer 20c is heated, the thermosetting resin 20e is cured such that the second leg portion 81 and the wall portion 11a and the circumferential side surface 13a are bonded and fixed.

As shown in FIG. 12, the fixing layer 20c containing the foaming agent 20d in the foamed state fills a space between at least a part of the second leg portion 81, and the wall portion 11a and the circumferential side surface 13a that configure the slot 12, at the position P2 different from the position P1 in the axial direction corresponding to the joint portion 90. Specifically, the fixing layer 20c is provided so as to overlap with the part 20b of the insulating layer 20a on the other axial side (Z1 direction side) of the position P1 in the axial direction corresponding to the joint portion 90. In other words, the fixing layer 20c is provided so as to overlap with the part 20b of the insulating layer 20a on the other axial side of the vicinity of the end face 10a on the one axial side (Z2 direction side). Further, the fixing layer 20c is provided in the slot 12 so as to overlap with the part 20b of the insulating layer 20a that is disposed between the second leg portion 81 and the stator core 10. For example, as shown in FIG. 15, the fixing layer 20c is provided so as to overlap with and sandwich the insulating layer 20a in the part 20b of the insulating layer 20a at a position different from the axial position corresponding to the joint portion 90.

Figure 19:
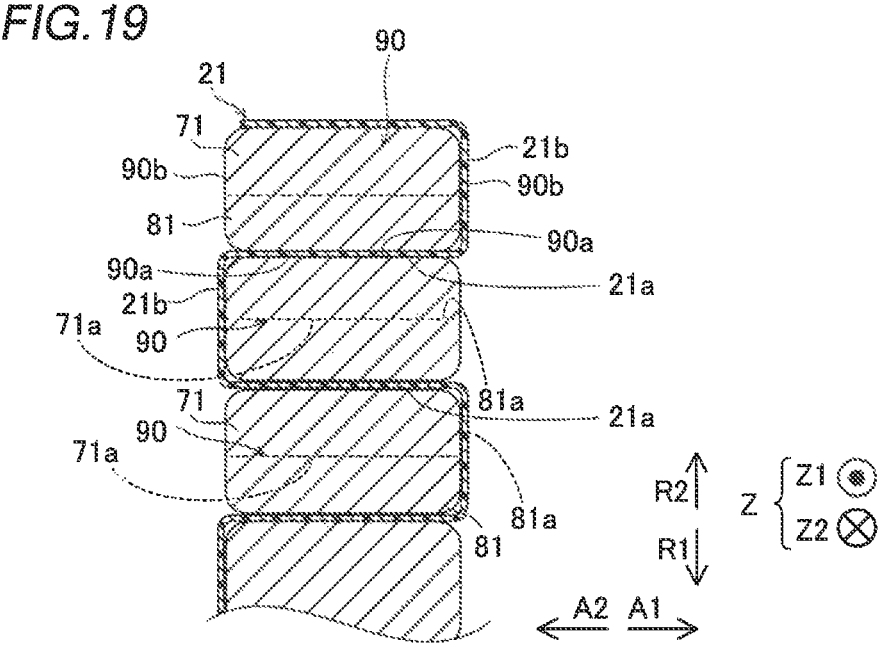
FIG. 19 is a sectional view showing the configuration of the second insulating member according to the first embodiment.

As shown in FIG. 13, the first insulating member 20 provided between the slot 12 and the coil portion 30 and the second insulating member 21 provided separately from the first insulating member 20 are provided. As shown in FIG. 19, the joint portions 90 adjacent in the radial direction, among the joint portions 90 each in which the first surface 71a of the first leg portion 71 of the first conductor 70 and the second surface 81a of the second leg portion 81 of the second conductor 80 are joined between the coils adjacent in the radial direction in one slot 12, are insulated by the second insulating member 21 that has a sheet shape and that is provided separately from the first insulating member 20. The term "coils" means a linear part of the coil portion 30 that is disposed in the slot 12 after the first conductor 70 and the second conductor 80 are joined. Thus, a plurality of coils is disposed in one slot 12. The second insulating member 21 is an example of a "joint portion insulating member" in the claims.

As shown in FIG. 19, the second insulating member 21 is formed by folding one sheet-shaped insulating member such as a Nomex. The second insulating member 21 includes: a facing surface insulating part 21a that covers facing surfaces 90a of the joint portions 90 that are adjacent in the radial direction; and a circumferential surface insulating part 21b that is continuous from both end portions of the facing surface insulating part 21a in the circumferential direction and that covers one of the circumferential surfaces 90b of the joint portion 90 that are adjacent in the radial direction for at least the insulation distance. The facing surface 90a of the joint portion 90 means an outer radial surface and an inner radial surface, which face each other, of the joint portions 90 that are radially adjacent to each other. The insulation distance means a distance (creepage distance) that is a length along the circumferential surface insulating part 21b in the radial direction and that is sufficient for insulating the joint portions 90, which are adjacent to each other, from each other.

Figure 20:
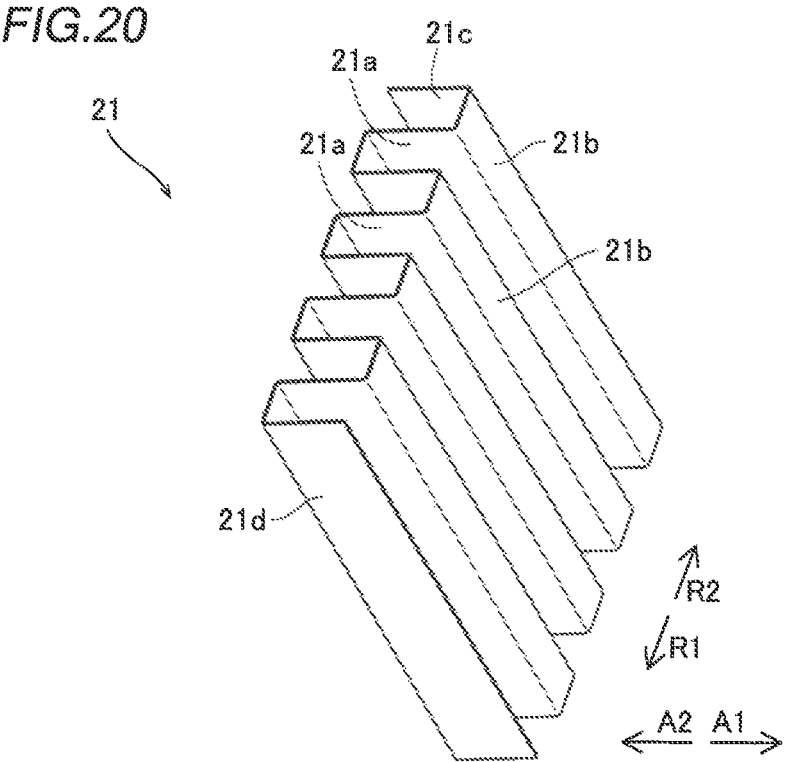
FIG. 20 is a perspective view showing the configuration of the second insulating member according to the first embodiment.

As shown in FIG. 20, the second insulating member 21 includes a part 21c that covers an outer radial side of the joint portion 90 disposed on the outermost radial side, and a part 21d that covers the inner radial side of the joint portion 90 disposed on the innermost radial side.

Further, in the second insulating member 21, the facing surface insulating parts 21a that are adjacent in the radial direction are connected to each other by the circumferential surface insulating part 21b in one or the other circumferential direction. Specifically, the facing surface insulating part 21a on the outer radial side among the pair of facing surface insulating parts 21a disposed adjacent to each other in the radial direction, the circumferential surface insulating part 21b provided on one side in the circumferential direction, the facing surface insulating part 21a on the inner radial side among the pair of facing surface insulating parts 21a, and the circumferential surface insulating part 21b provided on the other side in the circumferential direction are formed to be continuous. That is, the circumferential surface 90b on the A1 direction side of the joint portion 90 and the circumferential surface 90b on the A2 direction side of the joint portion 90 are alternately covered by the circumferential surface insulating part 21b. In other words, the second insulating member 21 is configured so as not to continuously cover the circumferential surfaces 90b of the plurality of joint portions 90 disposed adjacent to each other in the radial direction.

Thus, the second insulating member 21 has a meandering shape (bellows shape) when viewed from the axial direction. Further, since one second insulating member 21 insulates the joint portions 90 that are adjacent to each other in the radial direction and that are disposed in one slot 12, all the joint portions in the slot 12 are insulated from each other. This makes it possible to reduce the number of steps for disposing the second insulating member 21 as compared to the case in which the plurality of joint portions 90 disposed in one slot 12 is individually covered by the insulating member.

Further, as shown in FIG. 20, the second insulating member 21 is configured to be expandable/contractible along the radial direction. The second insulating member 21 is made of a flexible sheet-shaped insulating member, and is configured to not continuously cover the circumferential surfaces 90b of the plurality of joint portions 90 disposed adjacent to each other in the radial direction. Thus, even when the first leg portion 71 and the second leg portion 81 are pressed in the radial direction or the axial direction when the first leg portion 71 and the second leg portion 81 are joined, the second insulating member 21 can be deformed with the movement of the first leg portion 71 and the second leg portion 81.

As shown in FIG. 13, the second insulating member 21 is provided to extend in the axial direction so as to cover both the first clearance portion 74 and the second clearance portion 84 when viewed from the radial direction. Specifically, the second insulating member 21 is disposed so that an edge portion on one axial side (Z2 direction side) protrudes outward (toward the Z2 direction side) from the end face 10a of the stator core 10 in the axial direction. Further, in the second insulating member 21, the edge portion on the other axial side (Z1 direction side) is provided on the other axial side (Z1 direction side) of the edge portion on the other axial side (Z1 direction side) of the first clearance portion 74 in the slot 12.

Further, as shown in FIG. 13, the first insulating member 20 is also disposed together with the second insulating member 21 so as to protrude outward (toward the Z2 direction side) from the end face 10a of the stator core 10 in the axial direction. A height position h1 of the part of the second insulating member 21 protruding outward from the end face 10a of the stator core 10 and a height position h2 of the part of the first insulating member 20 protruding outward from the end face 10a of the stator core 10 are substantially equal. The protrusion amount of the first insulating member 20 and the second insulating member 21 from the end face 10a of the stator core 10 is adjusted to a degree in which the first insulating member 20 and the second insulating member 21 are not bent by coming into contact with the first coil end portion 72 of the first segment conductor 70.

Figure 21:
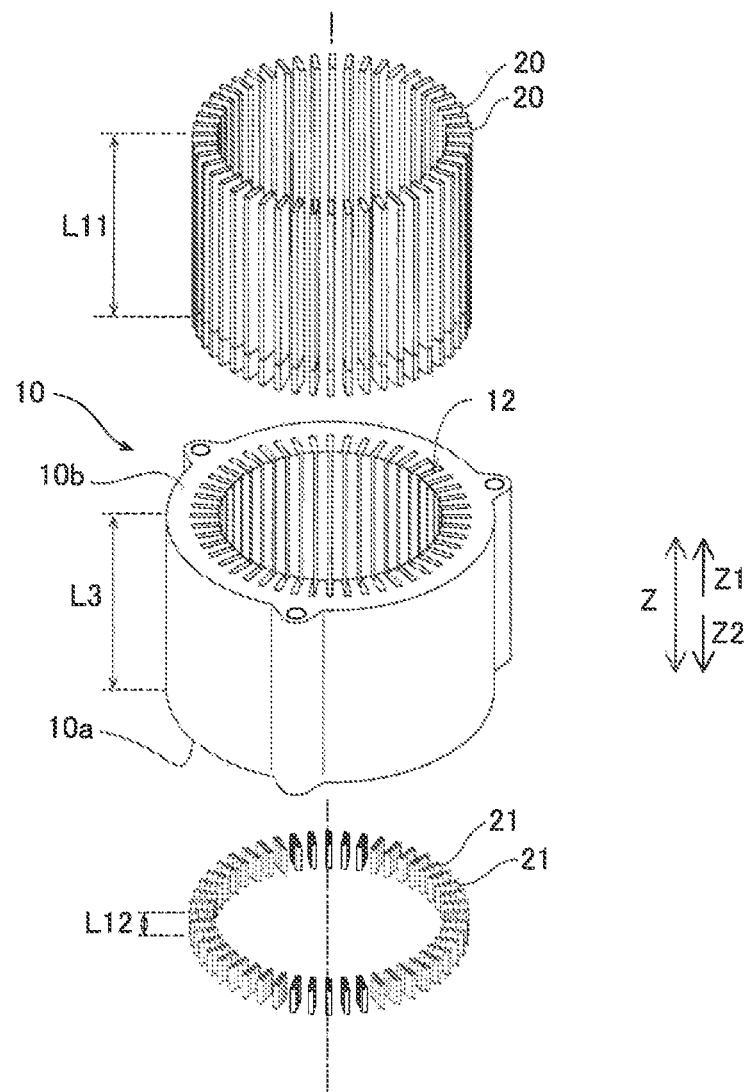
FIG. 21 is an exploded perspective view in which the stator core, the first insulating member, and the second insulating member according to the first embodiment are disassembled.

Further, as shown in FIG. 21, a length L12 of the second insulating member 21 is smaller than a length L11 of the first insulating member 20 in the axial direction. Specifically, the length L11 of the first insulating member 20 is larger than the length L3 of the stator core 10 in the axial direction. The length L12 of the second insulating member 21 is smaller than the length L3 of the stator core 10. The second insulating member 21 is provided so as to cover the joint portion 90 and extend from the joint portion 90 toward the Z1 direction side and the Z2 direction side. The length L12 of the second insulating member 21 is adjusted based on the magnitude of the voltage applied to the coil portion 30 (based on the required creepage distance). In FIG. 21, illustration of the first conductor 70 and the second conductor 80 is omitted for simplification.

Figure 22:
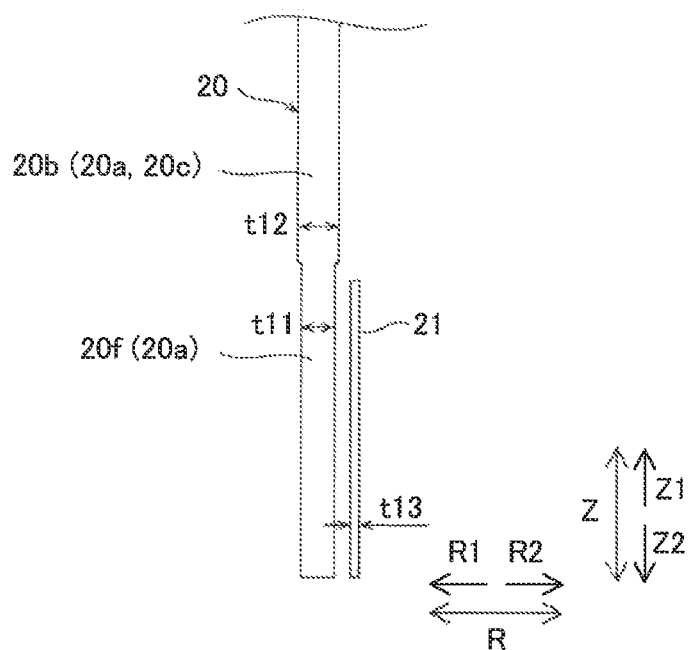
FIG. 22 is a figure showing the thickness of the first insulating member and the thickness of the second insulating member according to the first embodiment.

Further, since the length L12 of the second insulating member 21 is smaller than the length L11 of the first insulating member 20, as shown in FIG. 22, the first insulating member 20 has a part 20f that overlaps with the second insulating member 21 and the part 20b that does not overlap with the second insulating member 21 when viewed in the radial direction. Specifically, the first insulating member 20 overlaps with the second insulating member 21 in the vicinity of the end portion (end face 10a) in the axial direction in the slot 12. A thickness t11 of the part 20f of the first insulating member 20 that overlaps with the second insulating member 21 is smaller than a thickness t12 of the part 20b of the first insulating member 20 that does not overlap with the second insulating member 21.

A thickness t13 of the second insulating member 21 is smaller than the thickness tn. Further, the thickness t12 is obtained by adding the thickness t11 to the thickness t7 of two sheets (t7×2) of the fixing layer 20c.

Further, the second insulating member 21 is disposed on one axial side (Z2 direction side) with respect to the fixing layer 20c of the first insulating member 20 and between the joint portions 90 in the radial direction, and is configured to insulate the joint portions 90 from each other. Specifically, the fixing layer 20c is provided so as to overlap with the part 20b of the insulating layer 20a that does not overlap with the second insulating member 21 in the radial direction. Further, the insulating layer 20a is disposed in the part 20f that overlaps with the second insulating member 21 when viewed in the radial direction.

Stator Manufacturing Device

Figure 23:
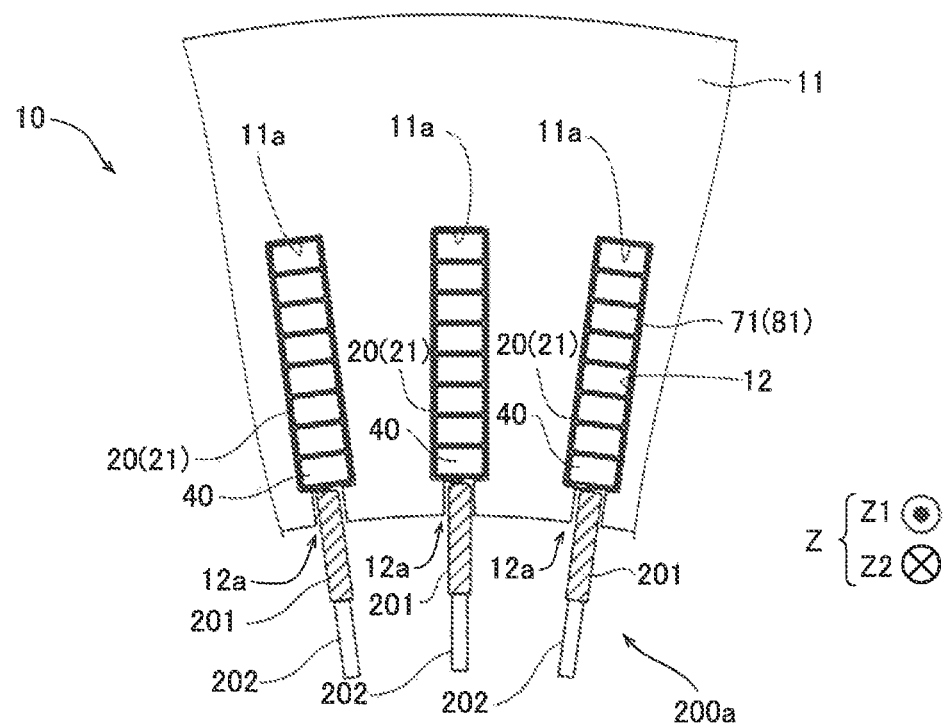
FIG. 23 is a diagram showing a stator manufacturing device according to the first embodiment.

Next, with reference to FIG. 23, the manufacturing device 200a of the stator 100 will be described. The manufacturing device 200a of the stator 100 includes a pressing jig 201. The pressing jig 201 is configured to press the first leg portion 71 of the first conductor 70 and the second leg portion 81 of the second conductor 80, which are disposed in the plurality of slots 12, independently in the radial direction for each of the plurality of slots 12. Specifically, the pressing jig 201 is disposed for each of the plurality of slots 12 and is configured to be movable in the radial direction. Further, a plurality of pressing jigs 201 (the same number as the number of slots 12) is provided so as to correspond to the plurality of slots 12, and every one of the plurality of pressing jigs 201 is configured to be independently movable in the radial direction.

Further, the manufacturing device 200a of the stator 100 includes a moving mechanism portion 202 that moves the pressing jig 201 independently for each of the plurality of slots 12. The moving mechanism portion 202 is provided for each of the plurality of pressing jigs 201, and is configured so that the amount of movement in the radial direction can be adjusted for each of the plurality of pressing jigs 201. The moving mechanism portion 202 includes an actuator, for example.

Then, the pressing jig 201 presses the joint portion 90 of the first leg portion 71 of the first conductor 70 and the second leg portion 81 of the second conductor 80 disposed in each of the plurality of slots 12. Here, since the relationship of $t21_{min} \geq t22_{max}$ is established, the joint portion 90 is not disposed in a state in which the joint portion 90 is recessed radially outward (toward the R2 direction side) than the first leg portion body portion 71d and the second leg portion body portion 81d. As a result, the pressing force of the pressing jig 201 is sufficiently transmitted to the joint portion 90.

Further, as shown in FIG. 12, the manufacturing device 200a of the stator 100 includes an adhesive layer heating portion 203. The adhesive layer heating portion 203 is disposed on at least one (preferably both) of the inner radial side or the outer radial side of the stator core 10, and is configured to be capable of performing induction heating (IH). The adhesive layer heating portion 203 is configured to heat the fixing layer 20c of the first insulating member 20 to a temperature higher than the foaming temperature T1 and higher than the curing temperature T2 (from room temperature). The adhesive layer heating portion 203 can heat the fixing layer 20c at a desired temperature rising rate (relatively high temperature rising rate) as compared to a general heating furnace, by using induction heating. Further, the joint portion 90 is heated by being disposed in the heating furnace while being pressed by the pressing jig 201.

Stator Manufacturing Method

Next, a manufacturing method of the stator 100 will be described.

Figure 24:
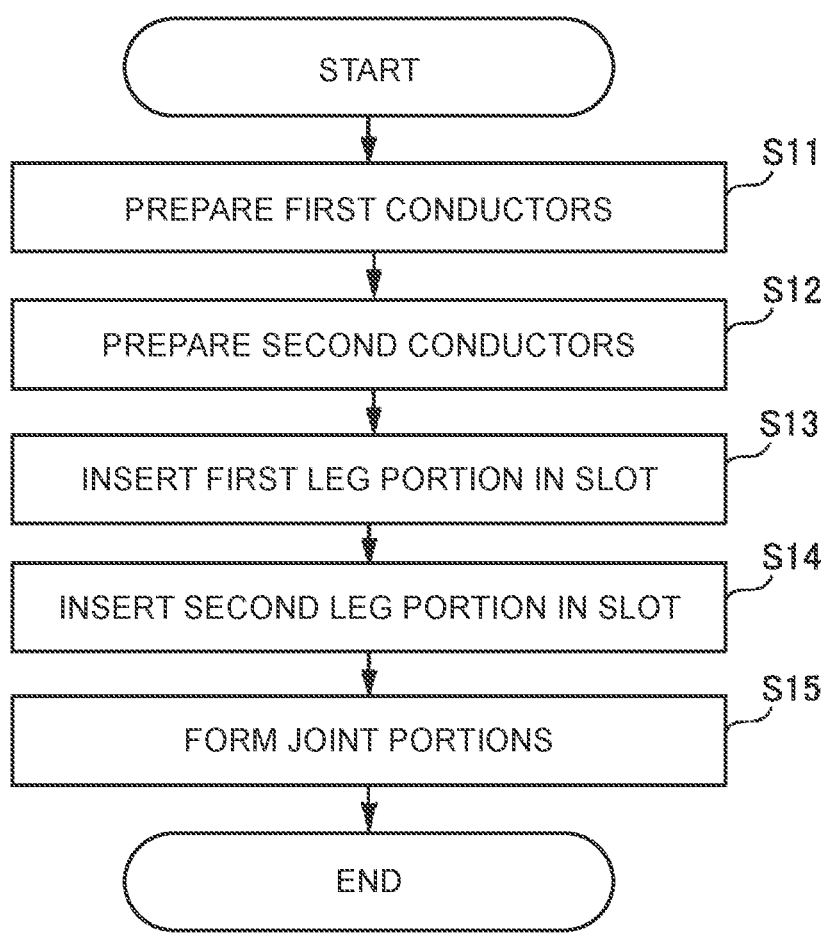
FIG. 24 is a flowchart showing a manufacturing method of the stator according to the first embodiment.

As shown in FIG. 24, in step S11, the plurality of first conductors 70 including the first leg portions 71 that are disposed on one axial side of the stator core 10 and that extend to the other axial side is prepared. The first conductors 70 are prepared in which the first leg portions 71 are provided with the first leg portion body portion 71d and the first surface disposition portion 71b that is provided with the first surface 71a and that has the radial thickness t2 smaller than that of the first leg portion body portion 71d.

In step S12, the plurality of second conductors 80 including the second leg portions 81 that are disposed on the other axial side of the stator core 10 and that extend to the one axial side is prepared. The second conductors 80 are prepared in which the second leg portions 81 are provided with the second leg portion body portion 81d and the second surface disposition portion 81b that is provided with the second surface 81a and that has the radial thickness t4 smaller than that of the second leg portion body portion 81d. In the step of preparing the first conductors 70 in step S11 and the step of preparing the second conductors 80 in step S12, the first conductors 70 and the second conductors 80 are prepared so that the thickness of the joint portions 90 becomes equal to or larger than the radial thickness of the part E2 other than the joint portions 90.

In step S13, the plurality of first conductors 70 is moved from one side of the stator core 10 to the slot 12 side (is inserted into the slot 12). The first insulating member 20 is disposed in the slot 12 in advance before the first conductors 70 are inserted into the slot 12. Further, the second insulating member 21 is disposed in the slot 12 in advance, or is inserted into the slot 12 together with the first conductors 70.

In step S14, the plurality of second conductors 80 is moved from the other axial side of the stator core 10 to the slot 12 side (is inserted into the slot 12).

In step S15, at least a part of the first surface 71a of the first leg portion 71 of each of the plurality of first conductors 70 and at least a part of the second surface 81a of the second leg portions 81 of the plurality of second conductors 80 are joined in the one slot 12 to form the joint portions 90. Specifically, the pressing jig 201 presses the first leg portion 71 of the first conductor 70 and the second leg portion 81 of the second conductor 80, which is disposed in the plurality of slots 12, independently in the radial direction for each of the plurality of slots 12. As a result, the joint portions 90 are formed. Here, in the first embodiment, in the step of forming the joint portions 90, the joint portions 90 are formed so that the thickness of the joint portions 90 (total thickness t21) is equal to or more than the thickness of the parts E2 other than the joint portions 90 (total thickness t22) in the radial direction (see FIGS. 14 and 15). The conductive adhesive 91 is heated by a heating device (not shown) while the first leg portion 71 and the second leg portion 81 are pressed by the pressing jig 201 and thus, at least a part of the first surface 71a and at least a part of the second surface 81a are joined and each joint portion 90 is formed.

Second Embodiment

Next, a stator 200 according to a second embodiment will be described with reference to FIG. 4 and FIGS. 25 to 34. In the stator 200 of the second embodiment, insulating members (121, 122) that are integrally formed are provided, unlike the stator 100 of the first embodiment that has the first insulating member 20 and the second insulating member 21 that are provided separately from each other. The same configurations as those in the first embodiment described above are indicated by the same reference numerals as those in the first embodiment and are shown in the drawings, and the description thereof will be omitted.

Structure of Stator

The structure of the stator 200 according to the second embodiment will be described with reference to FIG. 4 and FIGS. 25 to 34. The stator 200 is an example of the "armature" in the claims.

Figure 25:
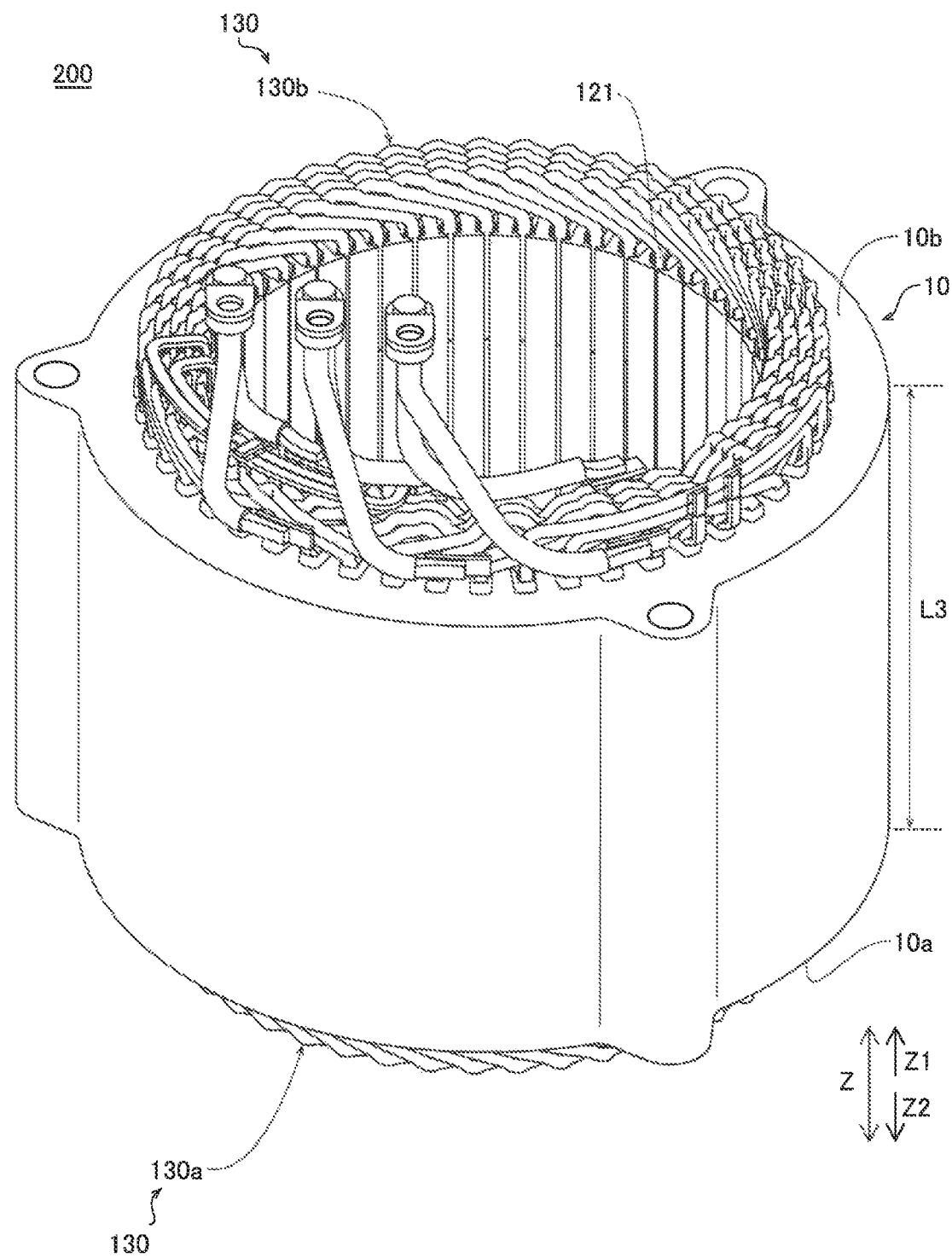
FIG. 25 is a perspective view showing the configuration of a stator according to a second embodiment.

As shown in FIG. 25, the stator 200 includes a sheet-shaped insulating member 121 and a coil portion 130. The coil portion 130 also includes a first coil assembly 130a (non-lead side coil) and a second coil assembly 130b (lead side coil). Further, the coil portion 130 is composed of a plurality of segment conductors 140 (see FIGS. 27A and 27B).

Figure 26:
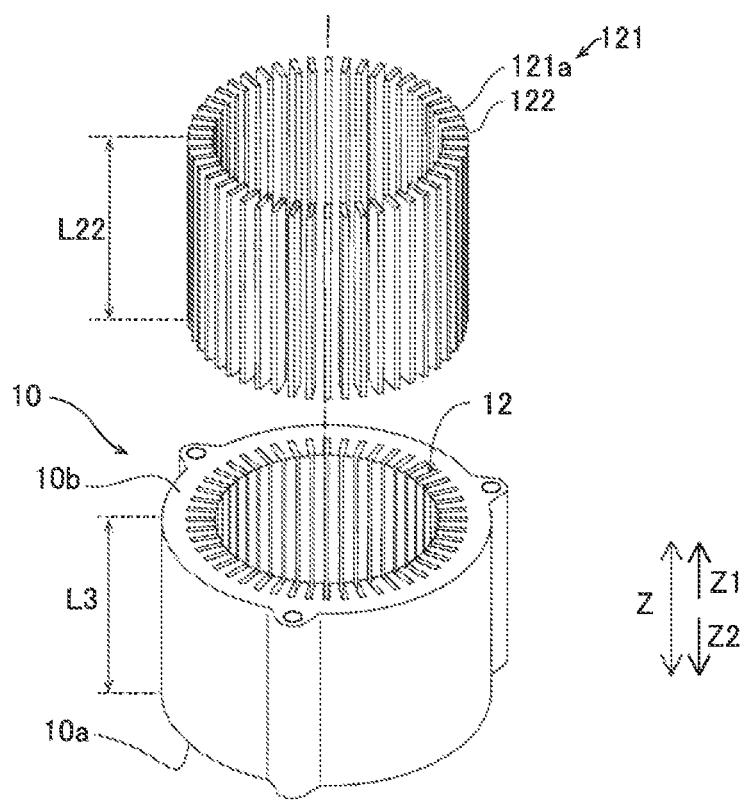
FIG. 26 is an exploded perspective view of the stator according to the second embodiment.

In addition, as shown in FIG. 26, in the axial direction, the insulating member 121 (contact portion insulating part 121c described below) and the core leg portion insulating part 122 described below each have the same length L22. The length L22 is larger than the length L3 of the stator core 10 in the axial direction. In FIG. 26, illustration of the first conductor 70 and the second conductor 80 is omitted for simplification. In addition, in FIG. 26, each shape of the insulating member 121 and the core leg portion insulating part 122 are schematically illustrated.

Configuration of Segment Conductor

Figure 27A:
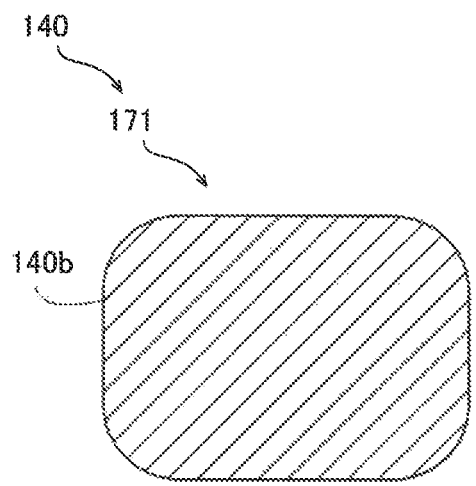
(FIG. 27A is a cross-sectional view of a leg portion.
Figure 27B:
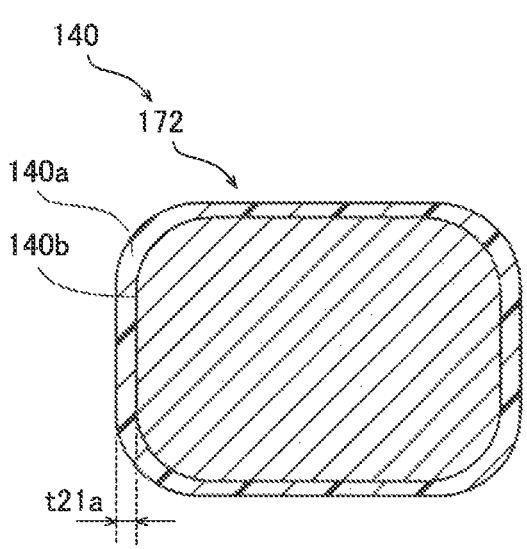
FIG. 27B is a cross-sectional view of a coil end portion.)

As shown in FIGS. 27A and 27B, the segment conductor 140 is configured as a flat conductor wire having a substantially rectangular cross section. In the segment conductor 140, a first leg portion 171 (second leg portion 181), which will be described below, is not covered with the insulating coating and a conductor surface 140b is exposed (see FIG. 27A). In contrast, in the segment conductor 140, an insulating coating 140a (see FIG. 27B) having a thickness t21a is provided on the conductor surface 140b of a first coil end portion 172 (second coil end portion 182) described below. For example, the thickness t21a of the insulating coating 140a is set to ensure an interphase insulating performance (insulation between the first coil end portions 172 and insulation between the second coil end portions 182 (see FIGS. 28A and 28B, and FIGS. 29A and 29B)). In FIGS. 27A and 27B, for the sake of explanation, the magnitude relationship such as the thickness is emphasized. However, the present disclosure is not limited to this illustrated example. In FIGS. 27A and 27B, only the first conductor 170 described below is shown. However, the second conductor 180 is similar, illustration thereof is omitted.

Structure of First Conductor and Second Conductor

Figure 28A:
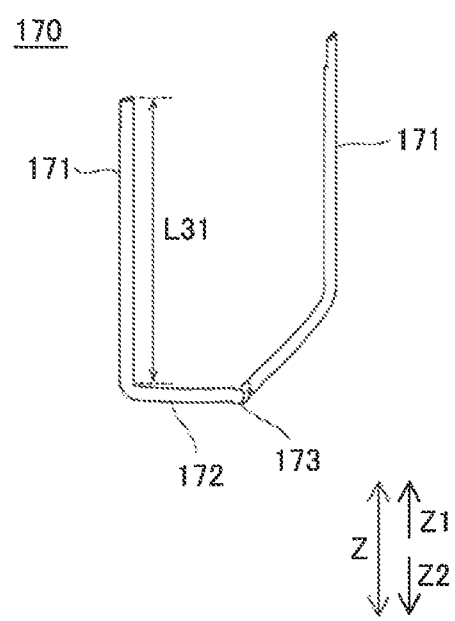
(FIG. 28A is a perspective view of the first segment conductor viewed from the outer radial side.

As shown in FIGS. 28A(B) and 29A(B), the plurality of segment conductors 140 includes a plurality of first conductors 170 disposed on one axial side (Z2 direction side) of the stator core 10 and a plurality of second conductors 180 disposed on the other axial side (Z1 direction side) of the stator core 10. The first conductor 170 and the second conductor 180 are disposed facing each other in the axial direction. The first conductor 170 also includes the first leg portion 171 having a length L31 in the axial direction. The first leg portion 171 extends to the other side (Z1 direction side) in the axial direction. The second conductor 180 also includes the second leg portion 181 having a length L32 in the axial direction. The second leg portion 181 extends to one side (Z2 direction side) in the axial direction. The length L31 of the first leg portion 171 and the length L32 of the second leg portion 181 are substantially the same. Further, each of the first leg portion 171 and the second leg portion 181 is inserted in the slot 12. The first conductor 170 and the second conductor 180 are examples of the "first segment conductor" and the "second segment conductor" in the claims, respectively.

Figure 28B:
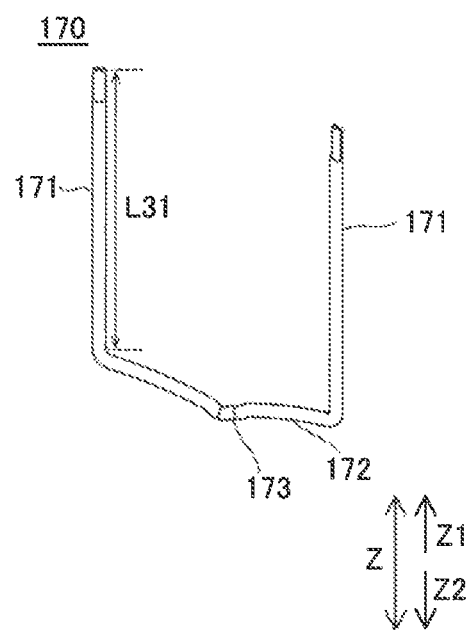
FIG. 28B is a perspective view of the first segment conductor viewed from the inner radial side.)

As shown in FIGS. 28A and 28B, the plurality of first conductors 170 is formed to have a U-shape (substantially U-shape) when viewed in the radial direction by connecting a pair of the first leg portions 171, which are disposed in different slots 12, to each other. The coil pitch of the first conductor 170 is six. That is, the first leg portions 171 are disposed at positions different in the circumferential direction by six slots 12. That is, five slots 12 are provided between the slot 12 in which one first leg portion 171 of the pair of first leg portions 171 is disposed and the slot 12 in which the other first leg portion 171 is disposed. Specifically, the first conductor 170 includes the pair of first leg portions 171, which are each disposed in different slots 12 and which are linearly formed along the axial direction, and the first coil end portion 172. The first leg portion 171 means a part disposed in the slot 12 from the axial position of the end face 10a (see FIG. 2) in the axial direction of the stator core 10, and the first coil end portion 172 means a part that is formed to be continuous with the first leg portion 171 and that is disposed on the outer axial side of the end face 10a of the stator core 10. The first coil end portion 172 has a bent shape that bends in the axial direction. Further, the first coil end portion 172 has a first crank part 173 formed in a crank shape that is bent in a stepwise shape for a width of one segment conductor 140 in the radial direction when viewed in the axial direction. That is, the radial width of the first crank part 173 is twice the width of one segment conductor 140.

Further, the axial lengths L31 of the pair of first leg portions 171 are substantially equal to each other. The axial length L31 means the length of the part of the first conductor 170 that extends linearly in the axial direction within the slot 12. The axial length L31 is smaller than the axial direction length L3 (see FIG. 26) of the stator core 10 (slot 12).

Figure 29A:
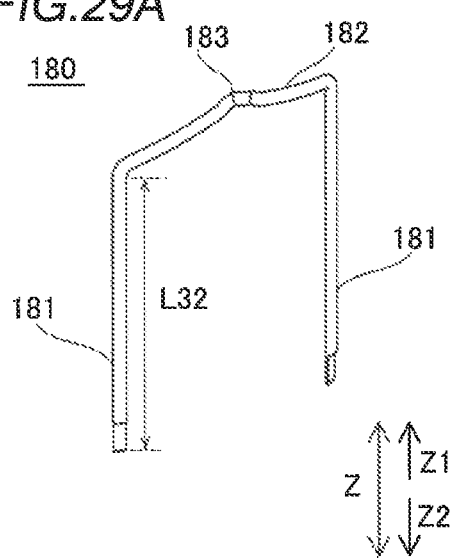
(FIG. 29A is a perspective view of the second segment conductor viewed from the outer radial side.
Figure 29B:
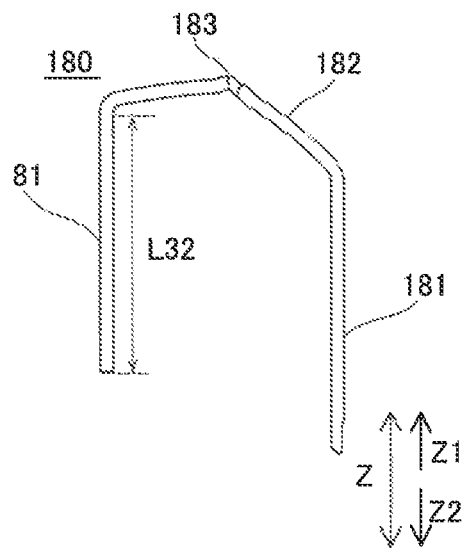
FIG. 29B is a perspective view of the second segment conductor viewed from the inner radial side.)

Similarly, as shown in FIGS. 29A and 29B, the second conductor 180 includes a pair of the second leg portions 181 disposed in the slot 12 and the second coil end portion 182. Also, the second coil end portion 182 has a second crank part 183. The second conductor 180 is formed to have a U-shape by connecting the pair of second leg portions 181, which are disposed in different slots 12, to each other. The axial lengths L32 of the pair of second leg portions 181 of the second conductor 180 are substantially equal to each other. The axial length L32 means the length of the part of the second conductor 180 that extends linearly in the axial direction within the slot 12.

Figure 30:
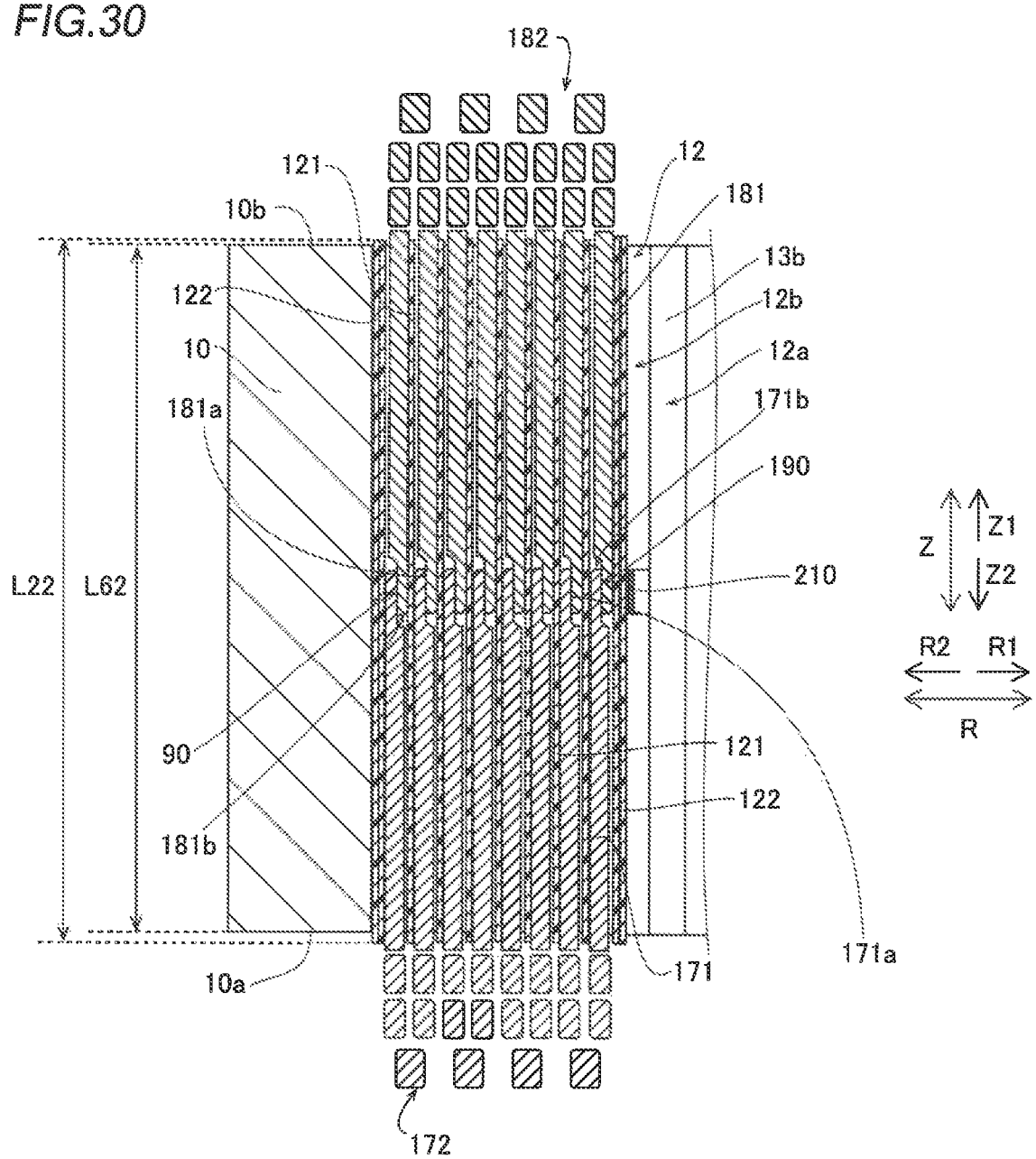
FIG. 30 is a cross-sectional view along the radial direction of the inside of a slot according to the second embodiment.

As shown in FIG. 30, the plurality of first leg portions 171 are provided in each of the plurality of slots 12 so that the first leg portions 171 are adjacent to each other in the radial direction of the stator core 10. In addition, the plurality of second leg portions 181 are provided in each of the plurality of slots 12 so that the second leg portions 181 are adjacent to each other in the radial direction of the stator core 10.

Further, in one slot 12, a plurality of first surfaces 171a provided on the first leg portions 171 and the second surfaces 181a provided on the second leg portions 181 are alternately arranged along the radial direction. Each first surface 171a is provided on a tip end portion 171b side of the first leg portion 171. Each second surface 181a is provided on a tip end portion 181b side of the second leg portion 181. The first surface 171a and the second surface 181a are provided so as to be in contact with each other as described below, and the first surface 171a and the second surface 181a that are in contact with each other are disposed so as to face each other in the radial direction.

Further, the stator 200 includes a spring member 210 that is provided in each of the plurality of slots 12 so as to be sandwiched between the coil portion 130 and the opening portion 12a (protruding portion 13b) of the slot 12. That is, the spring member 210 is provided in a distal end clearance 12b provided on the inner radial side of the slot 12.

The spring member 210 is configured to press the coil portion 130 from the inner radial side of the coil portion 130 in the radial direction such that the first surface 171a of the first leg portion 171 of the first conductor 170 and the second surface 181a of the second leg portion 181 of the second conductor 180 are in contact with each other. A contact portion 190 is formed by contact between the first surface 171a of the first leg portion 171 and the second surface 181a of the second leg portion 181. The contact portion 190 is an example of a "joint portion" in the claims.

The first surface 171a and the second surface 181a are in contact with each other by being pressed by the spring member 210 without a bonding agent being interposed between the first surface 171a and the second surface 181a. That is, the first surface 171a and the second surface 181a are not joined, and the contact state between the first surface 171a and the second surface 181a is maintained by the pressing force of the spring member 210.

In addition, a plurality of sets (eight in the second embodiment) of the first surface 171a and the second surface 181a that are in contact with each other are provided in one slot 12. That is, a plurality of the contact portions 190 is provided in one slot 12. The contact portions 190 are disposed adjacent to each other in the radial direction within one slot 12.

Specifically, the plurality of contact portions 190 is disposed so that the contact portions 190 overlap with each other when viewed in the radial direction. That is, all the contact portions 190 disposed in one slot 12 are disposed in a line along a horizontal direction. In other words, each position of the joint portions 190 in the axial direction in one slot 12 are substantially equal to each other.

Further, each of the plurality of contact portions 190 is disposed in the central portion of the stator core 10 in the axial direction, in the slot 12. The spring member 210 is also disposed in the central portion of the stator core 10 in the axial direction. Specifically, the spring member 210 is provided so as to overlap with each of the plurality of contact portions 190 when viewed in the radial direction.

Further, each of the first surface 171a and the second surface 181a is plated. That is, the plated surfaces (the first surface 171a and the second surface 181a) are in contact with each other.

In the plating process, metals such as nickel (Ni), silver (Ag), gold (Au), and tin (Su) are used. The plating process may be performed using a plurality of metals (for example, Ni and Ag) among the above metals.

Figure 31:
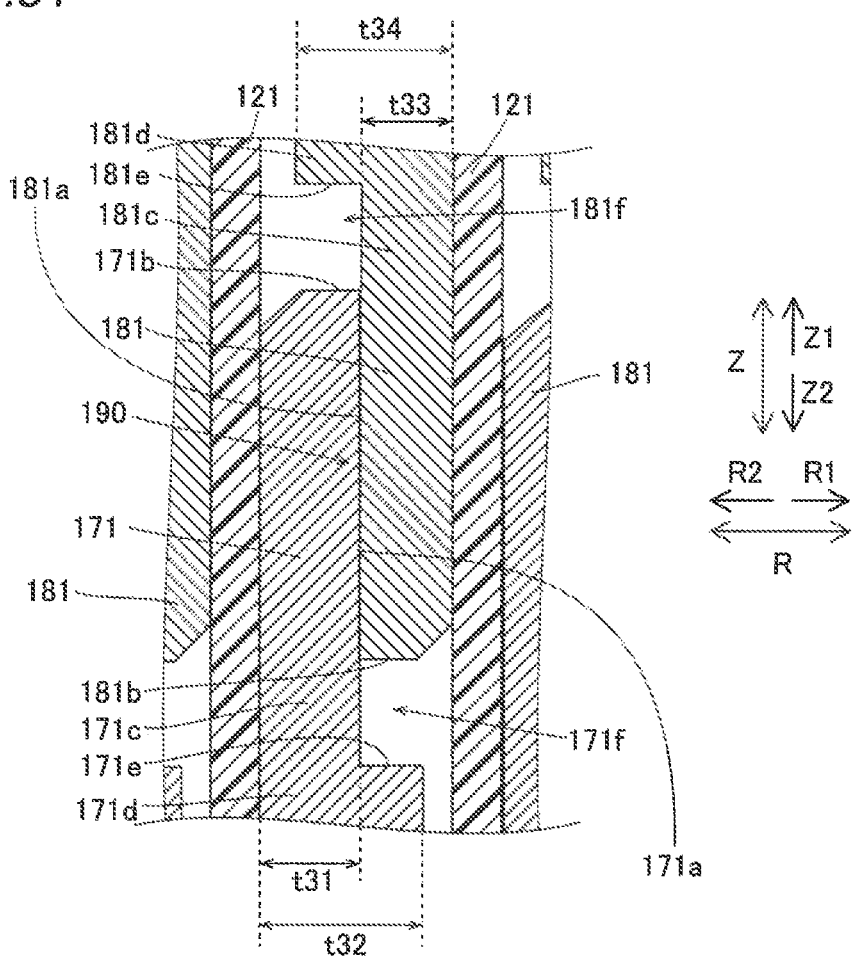
FIG. 31 is a partially enlarged view near a contact portion in FIG. 30.

As shown in FIG. 31, the first leg portion 171 includes a first surface forming portion 171c in which the first surface 171a is formed. The first surface forming portion 171c (first surface 171a) is provided so as to extend along the axial direction. In addition, the first leg portion 171 includes a first leg portion body portion 171d that is provided on one side (Z2 direction side) in the axial direction of the first surface forming portion 171c so as to be continuous from the first surface forming portion 171c. The first surface forming portion 171c has a radial thickness t31. The first leg portion body portion 171d has a radial thickness t32. The radial thickness t32 of the first leg portion body portion 171d is greater than the radial thickness t31 of the first surface forming portion 171c.

Further, the first leg portion 171 includes a first step portion 171e provided between the first surface forming portion 171c and the first leg portion body portion 171d. A clearance portion 171f is provided between the first step portion 171e and the tip end portion 181b of the second leg portion 181.

The second leg portion 181 includes a second surface forming portion 181c in which the second surface 181a is formed. The second surface forming portion 181c (second surface 181a) is provided so as to extend along the axial direction. In addition, the second leg portion 181 includes a second leg portion body portion 181d that is provided on the other side (Z1 direction side) in the axial direction of the second surface forming portion 181c so as to be continuous from the second surface forming portion 181c. The second surface forming portion 181c has a radial thickness t33. The second leg portion body portion 181d has a radial thickness t34. The radial thickness t34 of the second leg portion body portion 181d is greater than the radial thickness t33 of the second surface forming portion 181c.

The second leg portion 181 includes a second step portion 181e provided between the second surface forming portion 181c and the second leg portion body portion 181d. A clearance portion 181f is provided between the second step portion 181e and the tip end portion 171b of the first leg portion 171.

The radial thickness t31 of the first surface forming portion 171c and the radial thickness t33 of the second surface forming portion 181c are substantially equal. The radial thickness t32 of the first leg portion body portion 171d and the radial thickness t34 of the second leg portion body portion 181d are substantially equal. In FIG. 31, in order to highlight the insulating member 121, the insulating member 121 is illustrated so as to have a thickness greater than the actual thickness. Further, the radial thickness (t31+t33) of the contact portion 190 is larger than the thickness (t32 or t34) of the part other than the contact portion 190.

Figure 32:
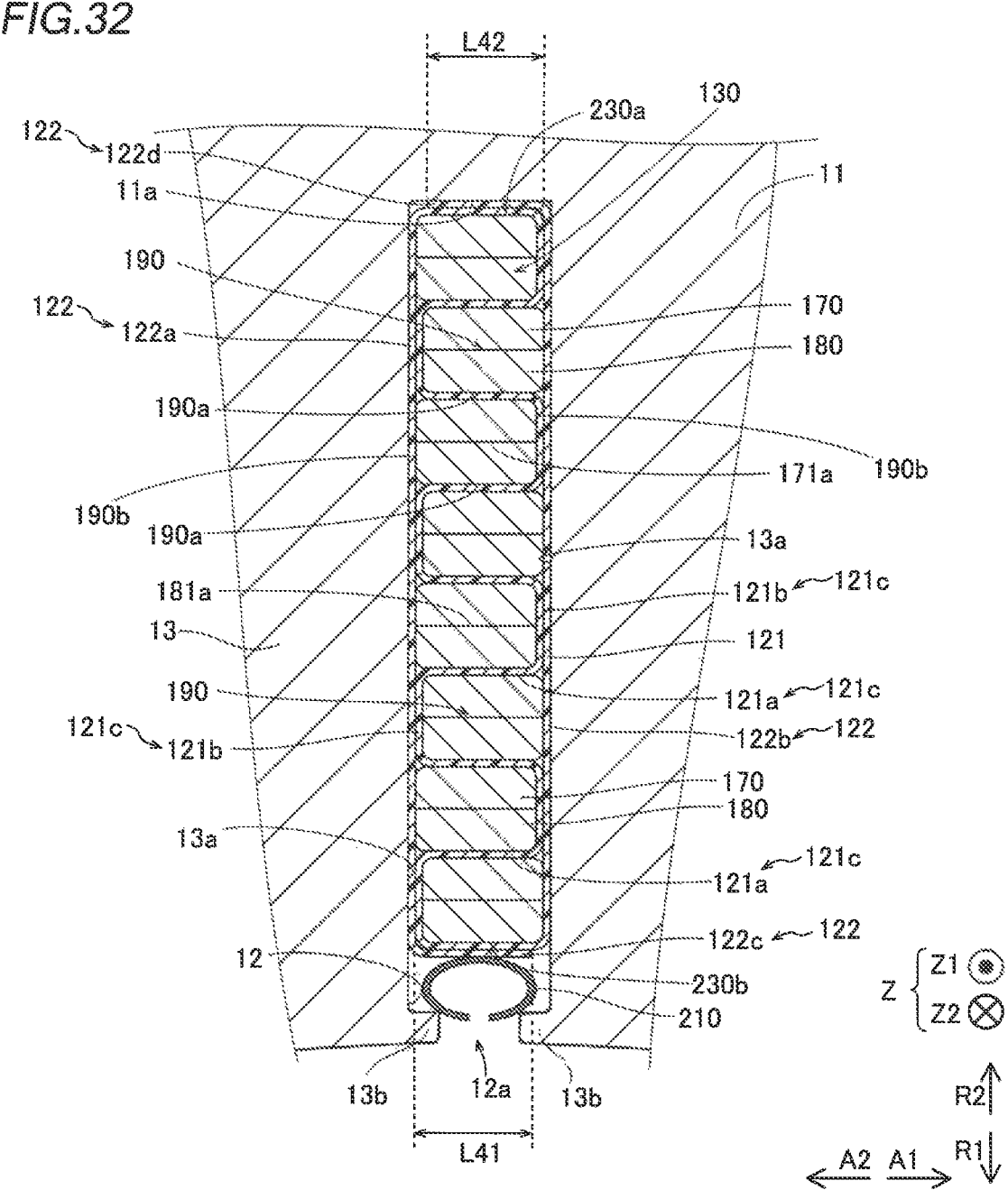
FIG. 32 is a sectional drawing showing a configuration of an insulating member according to the second embodiment.

As shown in FIG. 32, between the coils adjacent to each other in the radial direction in one slot 12, the sheet-shaped insulating member 121 is provided so as to insulate the contact portions 190 from each other. Here, in each contact portion 190, the first leg portion 171 in which the conductor surface 140b is exposed and the second leg portion 181 in which the conductor surface 140b (see FIGS. 27A and 27B) is exposed are in contact without a bonding agent being interposed therebetween. Specifically, the insulating member 121 is provided between each of the plurality of (eight in the second embodiment) coils (a set of the first leg portion 171 and the second leg portion 181 that are in contact with each other) disposed in the radial direction in the slot 12.

Specifically, the insulating member 121 is formed by folding one sheet-shaped insulating member such as a Nomex. The insulating member 121 includes: facing surface insulating parts 121a that cover facing surfaces 190a of the contact portions 190 that are adjacent in the radial direction; and a circumferential surface insulating part 121b that is continuous from both end portions of the facing surface insulating part 121a in the circumferential direction and that covers one of the circumferential surfaces 190b of the contact portions 190 that are adjacent in the radial direction for at least the insulation distance. The facing surfaces 190a of the contact portions 190 mean an outer radial surface and an inner radial surface of the contact portions 190, which face each other in the radial direction. Further, the insulation distance is a length along the radial direction of the circumferential surface insulating part 121*b* and means a distance (creepage distance) sufficient for insulating the contact portions 190 adjacent to each other in the radial direction. The circumferential surfaces 190*b* mean surfaces of the contact portions 190 that intersect with the circumferential direction. In other words, the circumferential surfaces 190*b* mean surfaces extending in the radial direction and the axial direction.

In addition, the insulating member 121 includes the contact portion insulating parts 121*c* that are formed such that the following are continuous: the facing surface insulating part 121*a* on the outer radial side among a pair of the facing surface insulating parts 121*a* disposed adjacent to each other in the radial direction; the circumferential surface insulating part 121*b* provided on one side in the circumferential direction; the facing surface insulating part 121*a* on the inner radial side among the pair of the facing surface insulating parts 121*a*; and the circumferential surface insulating part 121*b* provided on the other side in the circumferential direction.

Further, the stator 200 includes a core leg portion insulating part 122 that is provided between the slot 12 and the coil portion 130 and that is integrally formed with the contact portion insulating part 121*c*. That is, the core leg portion insulating part 122 has a sheet shape similar to the contact portion insulating part 121*c* and is made of the same material as the contact portion insulating part 121*c*. Further, the contact portion insulating part 121*c* and the core leg portion insulating part 122 have the same thickness (not shown). The contact portion insulating part 121*c* and the core leg portion insulating part 122 have the same length L22 (see FIG. 30) in the axial direction.

Specifically, the core leg portion insulating part 122 has the one side insulating part 122*a* that is continuous with the facing surface insulating part 121*a* on the outermost radial side and that is provided, on one side of the slot 12 in the circumferential direction (left side in FIG. 32), between the slot 12 (circumferential side surface 13*a*) and the coil portion 130 (circumferential surface 190*b*). Further, the core leg portion insulating part 122 has the other side insulating part 122*b* that is continuous with the facing surface insulating part 121*a* on the innermost radial side and that is provided, on the other side of the slot 12 in the circumferential direction (right side in FIG. 32), between the slot 12 (circumferential side surface 13*a*) and the coil portion 130 (circumferential surface 190*b*).

More specifically, in the one side insulating part 122*a* (other side insulating part 122*b*), the following parts are alternated along the radial direction: the part the is sandwiched between the circumferential side surface 13*a* of the slot 12 and the circumferential surface 190*b* of the coil portion 130; and the part sandwiched between the circumferential side surface 13*a* of the slot 12 and the circumferential surface insulating part 121*b* that covers the circumferential surface 190*b* of the coil portion 130.

Further, in the second embodiment, the one side insulating part 122*a* extends from an outer radial side end portion 230*a* of the coil portion 130 in the slot 12 to an inner radial side end portion 230*b* (so as to extend over the end portion 230*b*). The other side insulating part 122*b* extends from the inner radial side end portion 230*b* of the coil portion 130 in the slot 12 to the outer radial side end portion 230*a* (so as to extend over the end portion 230*a*). That is, the coil portion 130 in the slot 12 is provided so as to be surrounded by the facing surface insulating part 121*a* on the outermost radial side, the facing surface insulating part 121*a* on the innermost radial side, the one side insulating part 122*a*, and the other side insulating part 122*b*.

The core leg portion insulating part 122 includes an inner radial side insulating part 122*c* that is continuous with the one side insulating part 122*a* and that is provided so as to cover the facing surface insulating part 121*a* on the innermost radial side from the inner radial side. Further, the core leg portion insulating part 122 has an outer radial side insulating part 122*d* that is continuous with the other side insulating part 122*b* and that is provided so as to cover the facing surface insulating part 121*a* on the outermost radial side from the outer radial side.

Specifically, the inner radial side insulating part 122*c* is provided so as to be sandwiched between the facing surface insulating part 121*a* on the innermost radial side and the spring member 210. That is, the coil portion 130 and the spring member 210 are insulated from each other by the facing surface insulating part 121*a* on the innermost radial side and the inner radial side insulating part 122*c*. The outer radial side insulating part 122*d* is provided so as to be sandwiched between the facing surface insulating part 121*a* on the outermost radial side and the wall portion 11*a* of the slot 12. That is, the coil portion 130 and the wall portion 11*a* (stator core 10) of the slot 12 are insulated from each other by the facing surface insulating part 121*a* on the outermost radial side and the outer radial side insulating part 122*d*.

Further, the inner radial side insulating part 122*c* has a length L41 in the circumferential direction. Further, the outer radial side insulating part 122*d* has a length L42 in the circumferential direction. Each of the length L41 of the inner radial side insulating part 122*c* and the length L42 of the outer radial side insulating part 122*d* is greater than half the width W2 of the slot 12 (see FIG. 4), for example.

As shown in FIG. 30, the length L22 of each of the contact portion insulating part 121*c* (see FIG. 32) and the core leg portion insulating part (see FIG. 32) in the axial direction is greater than a length L62 of the slot 12 in the axial direction. The length L62 of the slot 12 in the axial direction is equal to the length L3 of the stator core 10 in the axial direction (see FIG. 25). In addition, each of the contact portion insulating part 121*c* and the core leg portion insulating part 122 is disposed such that edge portions on both sides in the axial direction protrude outward from the end faces (10*a*, 10*b*) of the stator core 10 in the axial direction. As a result, each of the contact portion insulating part 121*c* and the core leg portion insulating part 122 is provided across the entire slot 12, in the axial direction.

Figure 33:
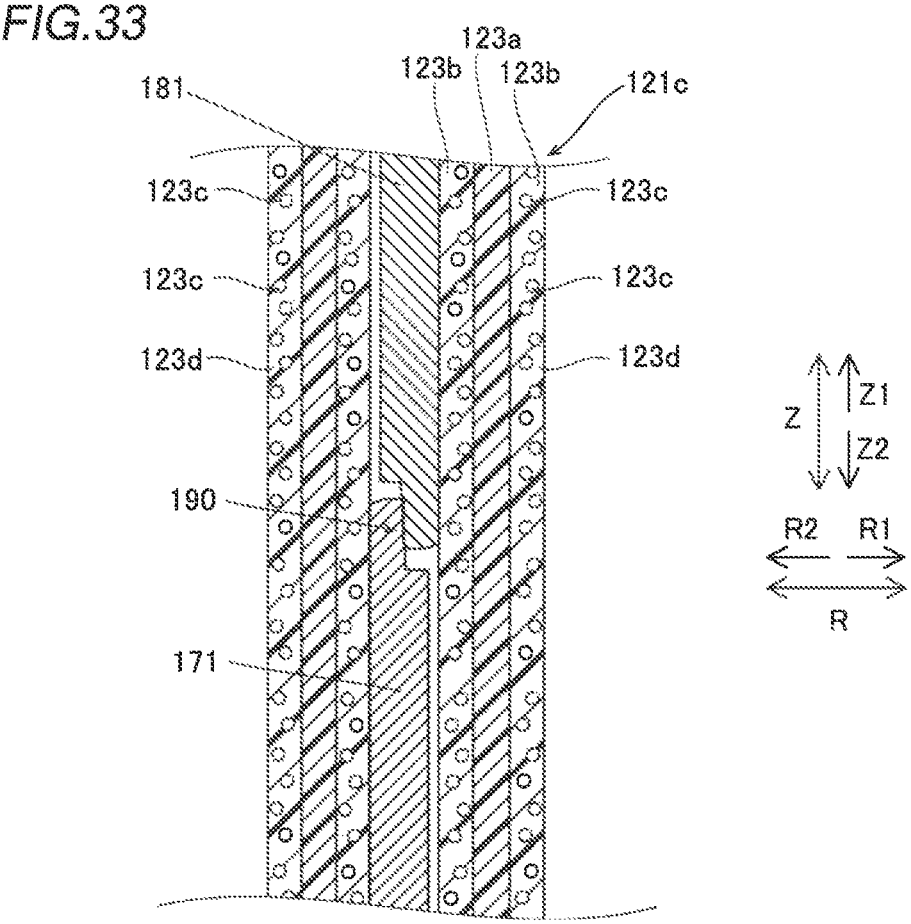
FIG. 33 is a sectional drawing showing a configuration of an insulating layer and a fixing layer of the contact portion insulating part according to the second embodiment.

Further, as shown in FIG. 33, the contact portion insulating part 121*c* includes an insulating layer 123*a* and a fixing layer 123*b* that includes a foaming agent 123*c* that foams due to heat. The foaming agent 123*c* foams and expands so as to fix a coil (a pair of the first leg portion 171 and the second leg portion 181 that are in contact with each other) in at least the axial direction with respect to a coil adjacent in the radial direction. The fixing layer 123*b* is provided on both surfaces of the insulating layer 123*a*. When the fixing layer 123*b* is heated, a thermosetting resin 123*d* is cured. As a result, the fixing layer 123*b* of the contact portion insulating part 121*c* bonds the adjacent coils to each other to fix the coils. In FIG. 33, the illustration of the stator core 10 and the like is omitted for simplification.

Figure 34:
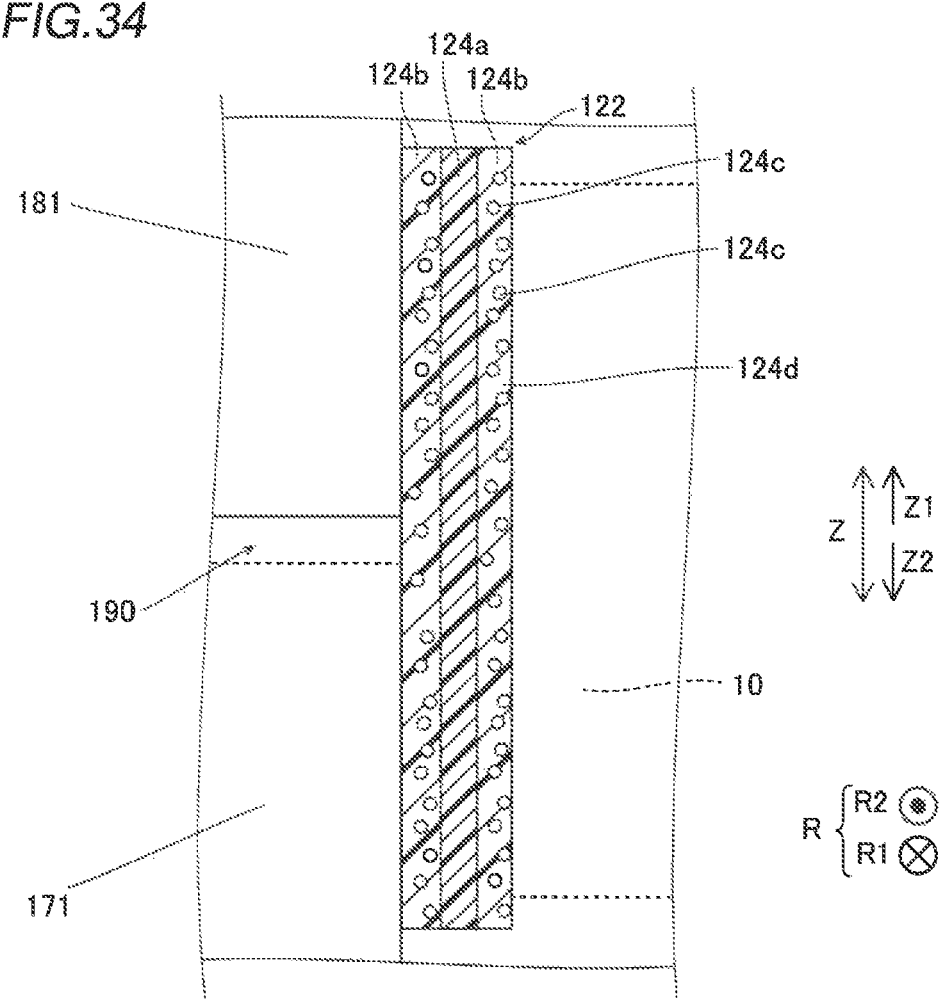
FIG. 34 is a sectional drawing showing a configuration of an insulating layer and a fixing layer of a core leg portion insulating part according to the second embodiment.

As shown in FIG. 34, the core leg portion insulating part 122 includes an insulating layer 124*a* and a fixing layer 124*b* that includes a foaming agent 124*c* that foams due to heat. The foaming agent 124*c* foams and expands so as to fix each of the first leg portion 171 and the second leg portion 181 in at least the axial direction with respect to the stator core 10. The fixing layer 124b of the core leg portion insulating part 122 is configured to bond and fix each of the first leg portion 171 and the second leg portion 181 to the stator core 10. Thus, it is not necessary to use a varnish or the like to fix each of the first leg portion 171 and the second leg portion 181. Further, in FIGS. 33 and 34, the insulating member 121 and the core leg portion insulating part 122 are illustrated to have a thickness larger than the actual thickness so as to highlight the insulating member 121 and the core leg portion insulating part 122. Since the insulating layer 123a (124a) and the fixing layer 123b (124b) have the same configurations (materials) as the insulating layer 20a and the fixing layer 20c of the first embodiment, detailed description thereof will be omitted.

The fixing layer 124b (fixing layer 123b) is provided so as to overlap with the entire surface of the insulating layer 124a (insulating layer 123a). Specifically, the fixing layer 124b (fixing layer 123b) is provided so as to overlap with the insulating layer 124a (insulating layer 123a) at a position in the axial direction corresponding to the contact portion 190 and a position in the axial direction corresponding to a part of the leg portion (171, 181) other than the contact portion 190.

Stator Manufacturing Process

Next, with reference to FIG. 35, a manufacturing process of the stator 200 will be described.

Figure 35:
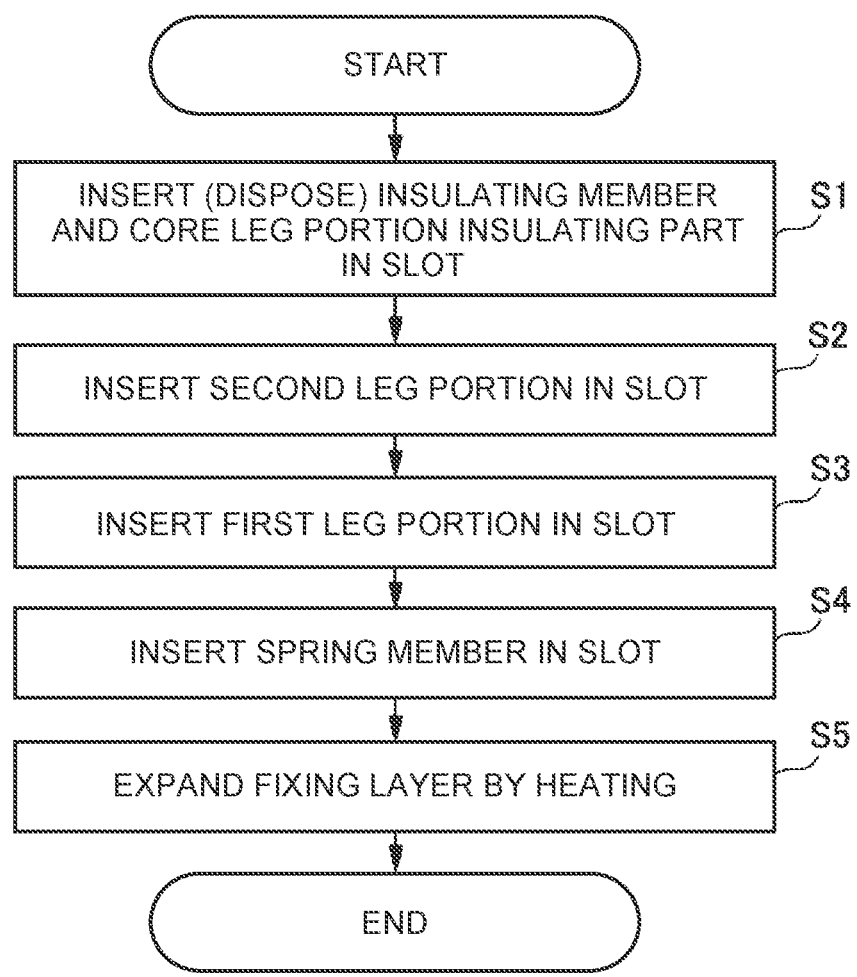
FIG. 35 is a flowchart showing a manufacturing method of the stator according to the second embodiment.

As shown in FIG. 35, first, in step S1, the insulating member 121 (contact portion insulating part 121c) and the core leg portion insulating part 122 are integrally inserted (disposed) in the slot 12.

Next, in step S2, the second leg portion 181 (see FIG. 30) of the second conductor 180 is inserted in the slot 12 from the other side (Z1 direction side) in the axial direction.

Next, in step S3, the first leg portion 171 (see FIG. 30) of the first conductor 170 is inserted in the slot 12 from one side (Z2 direction side) in the axial direction. At this time, the first leg portion 171 is disposed such that the first surface 171a of the first leg portion 171 and the second surface 181a of the second leg portion 181 face each other.

Next, in step S4, the spring member 210 (see FIG. 30) is inserted in the slot 12 from the inner radial side through the opening portion 12a of the slot 12.

Then, in step S5, the stator core 10 is heated and the fixing layer 123b is heated and thus, the foaming agent 123c is foamed and the fixing layer 123b is expanded. In this way, the coil portion 130 is fixed to the slot 12 at least in the axial direction.

The other configurations of the second embodiment are the same as those of the first embodiment described above.

Third Embodiment

Next, a stator 300 according to the third embodiment will be described with reference to FIGS. 36 to 40. In the stator 300 of the third embodiment, unlike the second embodiment in which the fixing layer 123b is provided on the entire surface of the insulating layer 123a, a fixing layer 223b is partially provided on an insulating layer 223a. The same components as those in the second embodiment are indicated in the drawings by the same reference numerals as those in the second embodiment and description thereof is omitted.

Structure of Stator

The structure of the stator 300 according to the third embodiment will be described with reference to FIGS. 36 to 40. The stator 300 is an example of the "armature" in the claims.

Figure 36:
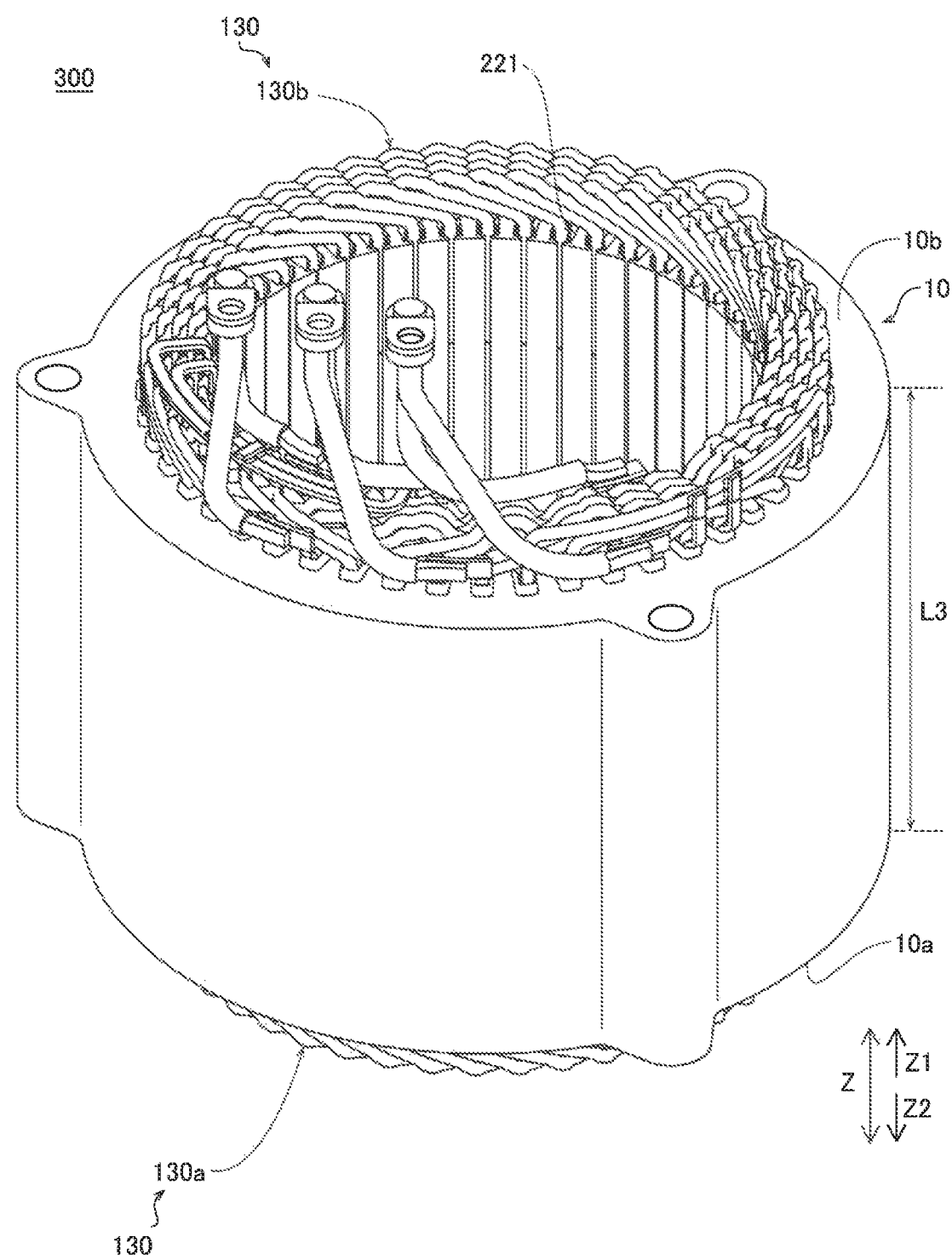
FIG. 36 is a perspective view showing a configuration of a stator according to a third embodiment.
Figure 37:
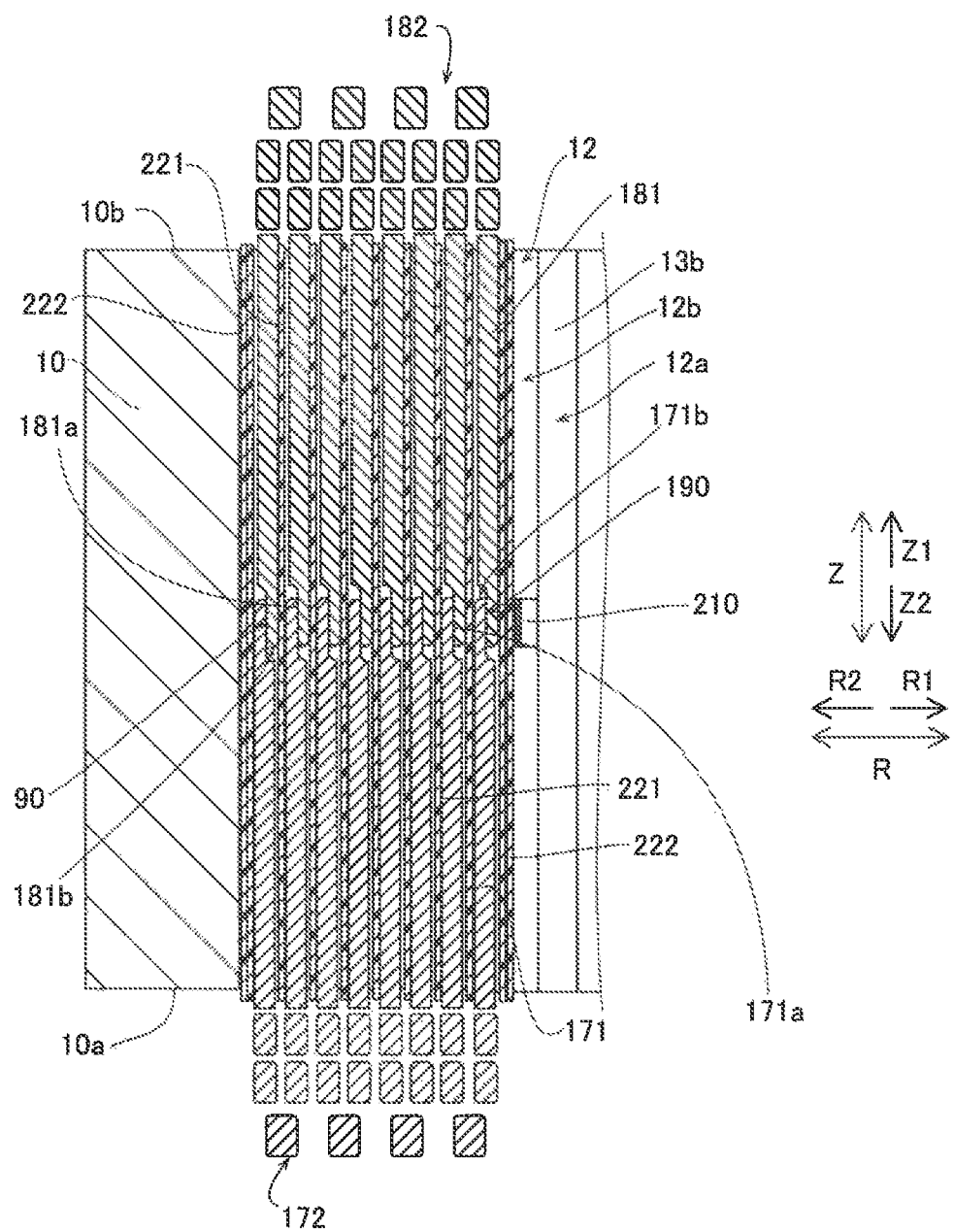
FIG. 37 is a cross-sectional view along the radial direction of the inside of a slot according to the third embodiment.

As shown in FIGS. 36 and 37, the stator 300 includes a sheet-shaped insulating member 221 and the coil portion 130.

Figure 38:
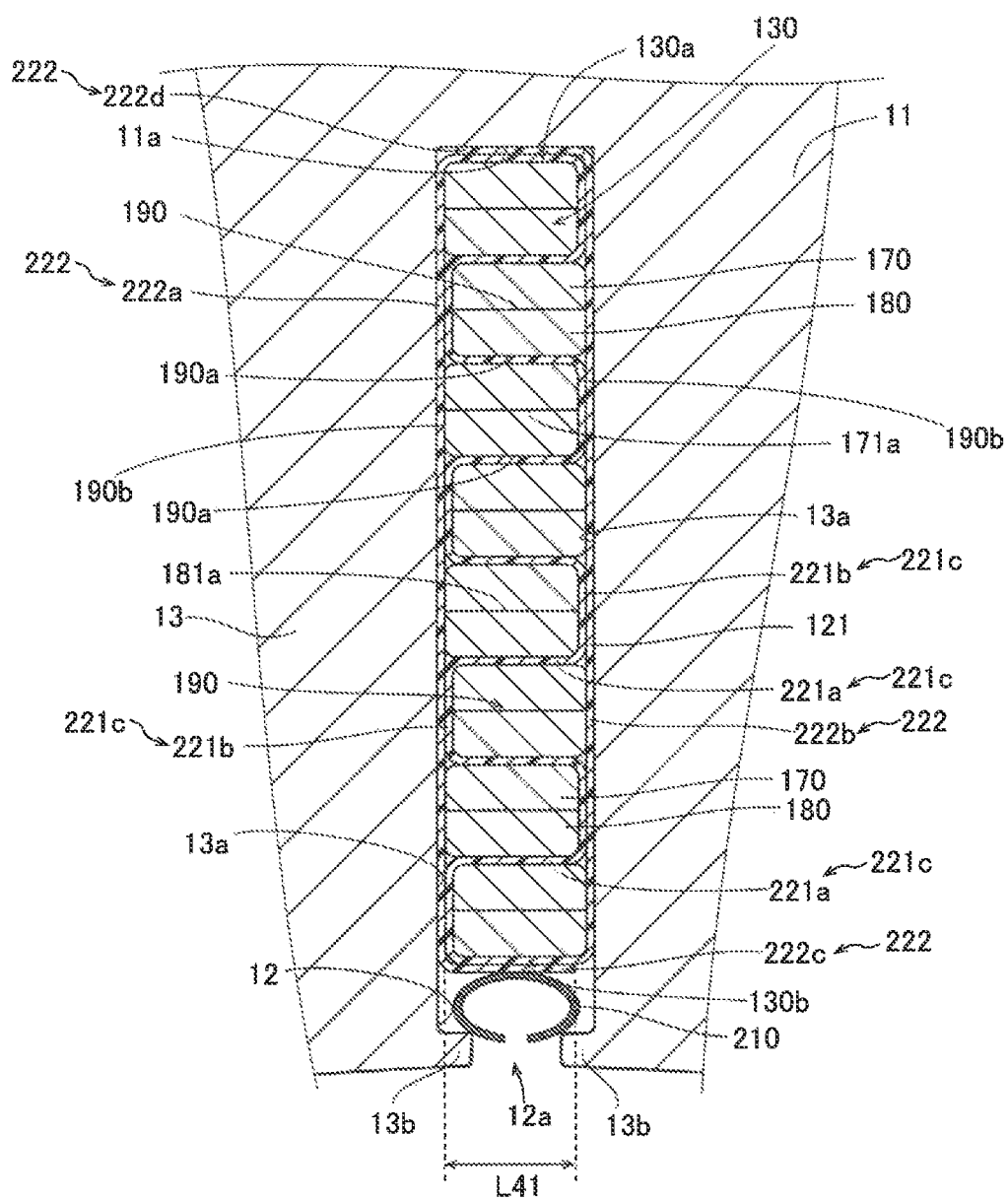
FIG. 38 is a sectional drawing showing a configuration of an insulating member according to the third embodiment.

As shown in FIG. 38, the insulating member 221 includes contact portion insulating parts 221c that are formed so that the following are continuous: a facing surface insulating part 221a on the outer radial side among a pair of the facing surface insulating parts 221a disposed adjacent to each other in the radial direction; a circumferential surface insulating part 221b provided on one side in the circumferential direction; the facing surface insulating part 221a on the inner radial side among the pair of the facing surface insulating parts 221a; and the circumferential surface insulating part 221b provided on the other side in the circumferential direction.

Further, the stator 300 includes a core leg portion insulating part 222 that is provided between the slot 12 and the coil portion 130 and that is integrally formed with the contact portion insulating part 221c.

Specifically, the core leg portion insulating part 222 has the one side insulating part 222a that is continuous with the facing surface insulating part 221a on the outermost radial side and that is provided, on one side of the slot 12 in the circumferential direction (left side in FIG. 38), between the slot 12 (circumferential side surface 13a) and the coil portion 130 (circumferential surface 190b). Further, the core leg portion insulating part 222 has the other side insulating part 222b that is continuous with the facing surface insulating part 221a on the innermost radial side and that is provided, on the other side of the slot 12 in the circumferential direction (right side in FIG. 38), between the slot 12 (circumferential side surface 13a) and the coil portion 130 (circumferential surface 190b).

The core leg portion insulating part 222 includes an inner radial side insulating part 222c that is continuous with the one side insulating part 222a and that is provided so as to cover the facing surface insulating part 221a on the innermost radial side from the inner radial side. Further, the core leg portion insulating part 222 has an outer radial side insulating part 222d that is continuous with the other side insulating part 222b and that is provided so as to cover the facing surface insulating part 221a on the outermost radial side from the outer radial side.

Figure 39:
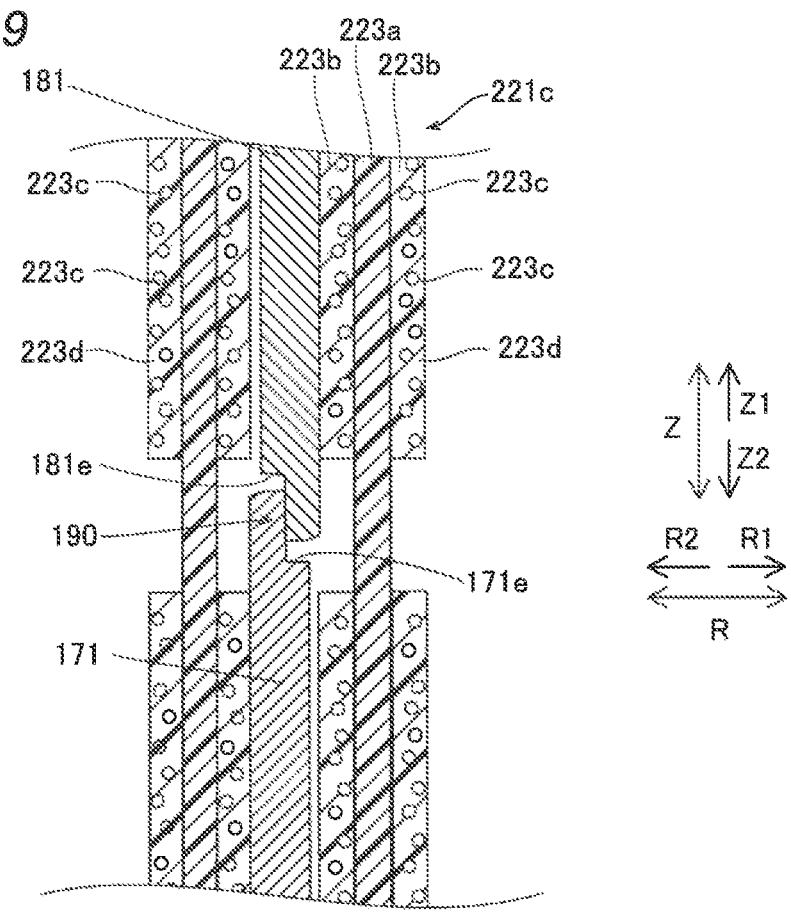
FIG. 39 is a sectional drawing showing a configuration of an insulating layer and a fixing layer of a contact portion insulating part according to the third embodiment.

Further, as shown in FIG. 39, the contact portion insulating part 221c includes the insulating layer 223a and the fixing layer 223b that includes a foaming agent 223c that foams due to heat. The foaming agent 223c foams and expands so as to fix a coil to a coil adjacent the radial direction. The fixing layer 223b is provided on both surfaces of the insulating layer 223a. When the fixing layer 223b is heated, a thermosetting resin 223d is cured. As a result, the fixing layer 223b of the contact portion insulating part 221c bonds and fixes the coils adjacent to each other. In FIG. 39, illustration of the stator core 10 and the like is omitted for simplification.

Figure 40:
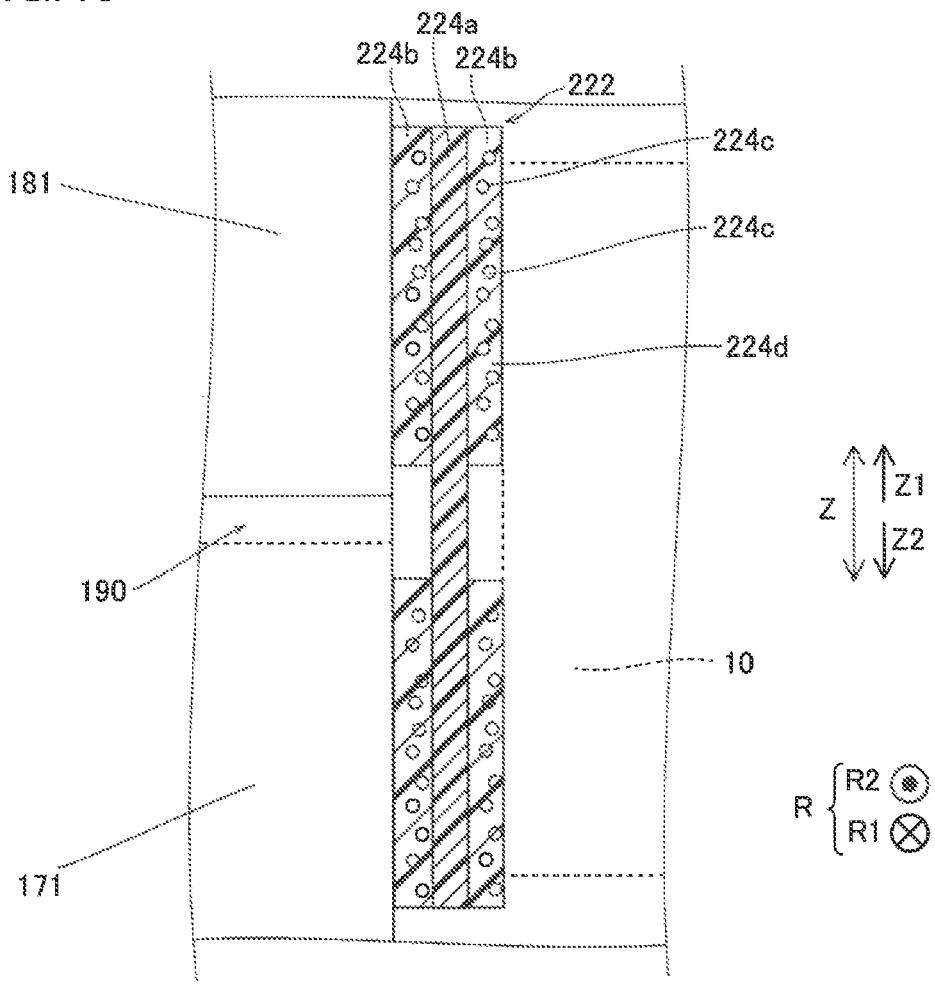
FIG. 40 is a sectional drawing showing a configuration of an insulating layer and a fixing layer of a core leg portion insulating part according to the third embodiment.

As shown in FIG. 40, the core leg portion insulating part 222 includes an insulating layer 224a and a fixing layer 224b that includes a foaming agent 224c that foams due to heat. The foaming agent 224c foams and expands so as to fix each of the first leg portion 171 and the second leg portion 181 in at least the axial direction with respect to the stator core 10.

The fixing layer 224b of the core leg portion insulating part 222 is configured to bond and fix each of the first leg portion 171 and the second leg portion 181 to the stator core 10. In FIGS. 39 and 40, the insulating member 221 and the core leg portion insulating part 222 are illustrated to have a thickness larger than the actual thickness so as to highlight the insulating member 221 and the core leg portion insulating part 222.

Here, in the third embodiment, the fixing layer 224b (fixing layer 223b) is provided so as to overlap with a part of the insulating layer 224a (insulating layer 223a) at a position different from a position in the axial direction corresponding to the contact portion 190. In other words, in the core leg portion insulating part 222 (contact portion insulating part 221c), only the insulating layer 224a (insulating layer 223a) is provided at the position in the axial direction corresponding to the contact portion 190. Specifically, the fixing layer 224b (fixing layer 223b) is provided so as to be separated into two parts, which are a part on the one side (Z2 direction side) in the axial direction with respect to the first step portion 171e (see FIG. 39) and a part on the other side (Z1 direction side) in the axial direction with respect to the second step portion 181e (see FIG. 39).

The rest of the configuration of the third embodiment is similar to that of the second embodiment.

Effects of First to Third Embodiments

In the first to third embodiments, the following effects can be obtained.

In the first to third embodiments, as described above, the thickness of the joint portion (90, 190) is equal to or more than the thickness of the part (E2) other than the joint portion (90, 190) in the radial direction. As a result, since the thickness of the joint portion (90, 190) is equal to or more than the thickness of the part (E2) other than the joint portion (90, 190) (since the joint portion (90, 190) is not recessed more than the part (E2) other than the joint portion (90, 190) in the radial direction), the joint portion can be pressed with a sufficient force by the jig (201), the spring member (210), or the like. As a result, it is possible to prevent the first segment conductor (70) and the second segment conductor (80) from being unable to be sufficiently joined. When the radial thickness of the joint portion (90, 190) is smaller than the radial thickness of the part (E2), the coil portion (30, 130) (the first segment conductor (70, 170) and the second segment conductor (80, 180)) become curved when the joint portion (90, 190) is pressed by the jig (201) or the spring member (210), etc. Thus, with the configuration as described above, it is possible to prevent the coil portion (30, 130) from being curved even when the joint portion (90, 190) is pressed by the jig (201) or the spring member (210), etc. Further, since the radial thickness of the first surface side part (71b, 171c) is smaller than the radial thickness of the first leg portion body portion (71d, 171d), and the radial thickness of the second surface side part (81b, 181c) is smaller than the radial thickness of the second leg portion body portion (81d, 181d), it is possible to suppress the radial thickness of the joint portion (90, 190) from being increased while securing the area of the joint surface.

In the first embodiment, as described above, in the plurality of first segment conductors (70) and the plurality of second segment conductors (80) disposed in one slot (12), the minimum value (t21min) of the dimensional variation range of the total radial thickness (t21) of the joint portion (90) (E1) is equal to or more than the maximum value (t22max) of the dimensional variation range of the total radial thickness (t22) of the part (E2). With this configuration, even if the total radial thickness (t21) of the joint portion (90) is the minimum value (t21min), since the total radial thickness (t21) is larger than the total radial thickness (t22) of the part (E2), the joint portion (90) can be pressed with a sufficient force by the jig (201).

In the first embodiment, as described above, in the plurality of first segment conductors (70) and the plurality of second segment conductors (80) disposed in one slot (12), the minimum value (t21min) of the dimensional variation range of the total radial thickness (t21) of the joint portion (90) (E1) is equal to or more than the maximum value (t22max) of the dimensional variation range of the total radial thickness (t22) of the part (E2). With this configuration, even if the total radial thickness (t21) of the joint portion (90) is the minimum value (t21min), since the total radial thickness (t21) is larger than the total radial thickness (t22) of the part (E2), the joint portion (90) can be pressed with a sufficient force by the jig (201). As a result, it is possible to prevent the first segment conductor (70) and the second segment conductor (80) from being unable to be sufficiently joined resulting from the dimension variation of the segment conductors (40).

Further, in the first embodiment, as described above, the minimum value (t2min) of the dimensional variation range of the radial thickness (t2) of the first surface side part (71b, 171c) of the plurality of first segment conductors (70) disposed in one slot (12) is equal to or more than half of the maximum value (t3max) of the dimensional variation range of the thickness (t3) of the first leg portion body portion (71d, 171d) of the plurality of first segment conductors (70) disposed in one slot (12). In addition, the minimum value (t4min) of the dimensional variation range of the radial thickness (t4) of the second surface side part (81b, 181c) of the plurality of second segment conductors (80) disposed in one slot (12) is equal to or more than half of the maximum value (t5max) of the dimensional variation range of the thickness (t5) of the second leg portion body portion (81d, 181d) of the plurality of second segment conductors (80) disposed in one slot (12). With this configuration, even if the radial thickness (t2, t4) of the first surface side part (71b, 171c) and the second surface side part (81d, 181d) (joint portion (90)) is the minimum value (t2min, t4min), the radial thickness (t2, t4) becomes larger than the radial thickness (t3, t5) of the first leg portion body portion (71d, 171d) and the second leg portion body portion (81d, 181d) (part (E2)). Thus, the first surface side part (71b, 171c) and the second surface side part (81d, 181d) (joint portion (90)) can be pressed by the jig (201) with a sufficient force.

In the first embodiment, as described above, in the plurality of first segment conductors (70) and the plurality of second segment conductors (80) disposed in one slot (12), the minimum value (t21min) of the dimensional variation range of the total radial thickness (t21) of the joint portion (90) including the conductive adhesive (91) is equal to or more than the maximum value (t22max) of the dimensional variation range of the total radial thickness (t22) of the part (E2). With this configuration, even if the conductive adhesive (91) is provided between the first surface (71a) and the second surface (81a), the joint portion (90) can be pressed by the jig (201) with a sufficient force.

In the first embodiment, as described above, in the plurality of first segment conductors (70) and the plurality of second segment conductors (80) disposed in one slot (12), the minimum value (t21min) of the dimensional variation range of the total radial thickness (t21) of the joint portion (90) including the joint portion insulating member (21) is equal to or more than the maximum value (t22max) of the dimensional variation range of the total radial thickness (t22) of the part (E2) including the joint portion insulating member (21). With this configuration, even if the joint portion insulating member (21) is provided between the joint portions (90) and also on the part (E2), the joint portion (90) can be pressed by the jig (201) with a sufficient force.

In the first embodiment, as described above, in the plurality of first segment conductors (70) and the plurality of second segment conductors (80) disposed in one slot (12), the minimum value (t21min) of the dimensional variation range of the total radial thickness (t21) of the joint portion (90) is equal to or less than the radial width (W3) of the slot (12). With this configuration, it is possible to prevent the joint portion (90) from protruding from the slot (12).

Further, in the first to third embodiments, as described above, the joint portions (90, 190) of the plurality of first segment conductors (70, 170) and the plurality of second segment conductors (80, 180) disposed in one slot (12) are disposed so as to overlap each other when viewed from the radial direction. With this configuration, different from the case in which the plurality of joint portions (90, 190) is disposed so as not to overlap each other when viewed from the radial direction, the plurality of joint portions (90, 190) can be pressed all at once by the jig (201) having a relatively small length in the axial direction or the spring member (210).

Further, in the first to third embodiments, as described above, each of the first segment conductor (70, 170) and the second segment conductor (80, 180) has a U-shape including the pair of first leg portions (71, 171) and the pair of second leg portions (81, 181), respectively. With such a configuration, the lengths (L1, L31) of the pair of first leg portions (71, 171) of the first segment conductor (70, 170) are substantially the same as each other and the lengths (L2, L32) of the pair of second leg portions (81, 181) of the second segment conductor (80, 180) are substantially the same as each other. As a result, since the positions of the plurality of joint portions (90, 190) in the axial direction can be made substantially the same, all of the plurality of joint portions (90, 190) disposed in one slot (12) can be disposed so as to overlap each other when viewed from the radial direction.

Further, in the first to third embodiments, as described above, each of the first surface (71a, 171a) and the second surface (81a, 181a) are provided so as to extend in parallel to the axial direction and to be joined so as to face each other in the radial direction, and the first surface (71a, 171a) and the second surface (81a, 181a) are joined to each other in the radial direction. Here, in the case in which the first surface (71a, 171a) and the second surface (81a, 181a) intersect with respect to the axial direction (in the case in which the first surface (71a, 171a) and the second surface (81a, 181a) are inclined surfaces), when the first surface (71a, 171a) and the second surface (81a, 181a) are pressed from the radial direction by the jig (201) or the spring member (210), the first leg portion (71, 171) and the second leg portion (81, 181) move in the axial direction so as to be separated from each other, with the first surface (71a, 171a) and the second surface (81a, 181a) (inclined surface) serving as sliding surfaces. Thus, with the configuration as described above, when the first surface (71a, 171a) and the second surface (81a, 181a) are pressed from the radial direction by the jig (201), it is possible to prevent the first leg portion (71, 171) and the second leg portion (81, 181) from being moved in the axial direction.

Modifications

It should be considered that the embodiments presently disclosed are exemplifications in all points and are not restrictive. The scope of the present disclosure is shown by the scope of the claims and not by the above description of the embodiments, and further includes the meanings equivalent to the scope of the claims and all changes (modifications) within the scope.

For example, in the first embodiment described above, an example is shown in which each of the first surface 71a and the second surface 81a extends parallel to the axial direction. However, the present disclosure is not limited to this. For example, each of the first surface 71a and the second surface 81a may be tilted by a predetermined angle (for example, 5 degrees or less) with respect to the axial direction.

Further, in the first embodiment as described above, an example is shown in which the second insulating member 21 is disposed so as to extend across from the first leg portion body portion 71d to the second leg portion body portion 81d. However, the present disclosure is not limited to this. For example, the second insulating member 21 may not disposed between the first leg portion body portion 71d and the second leg portion body portion 81d, and may be disposed between the joint portions 90 (between the first surface disposition portion 71b and the second surface disposition portion 81b).

Further, in the first embodiment described above, an example is shown in which all the joint portions 90 disposed in one slot are disposed so as to overlap with each other when viewed in the radial direction. However, the present disclosure is not limited to this. For example, in one slot 12, while the adjacent joint portions 90 may partially overlap, the non-adjacent joint portions 90 may not overlap. That is, the plurality of joint portions 90 disposed in one slot 12 may be disposed so as to be gradually shifted in the axial direction from the inner radial side to the outer radial side.

Figure 41:
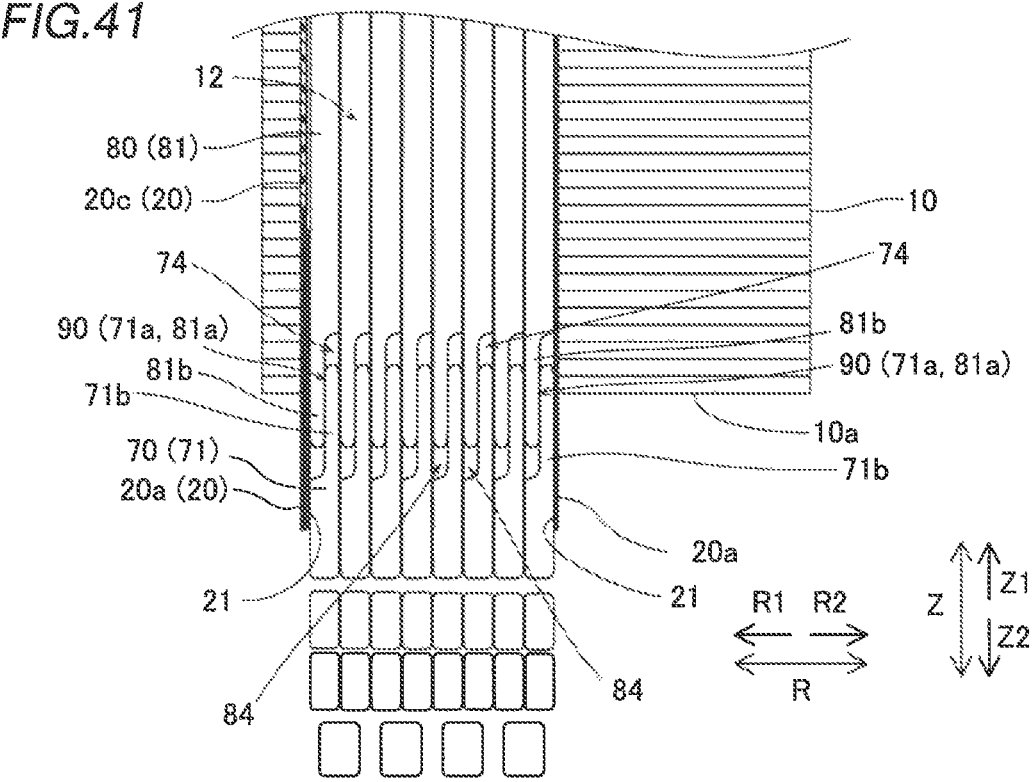
FIG. 41 is a sectional view near a joint portion according to a first modification of the first embodiment.
Figure 42:
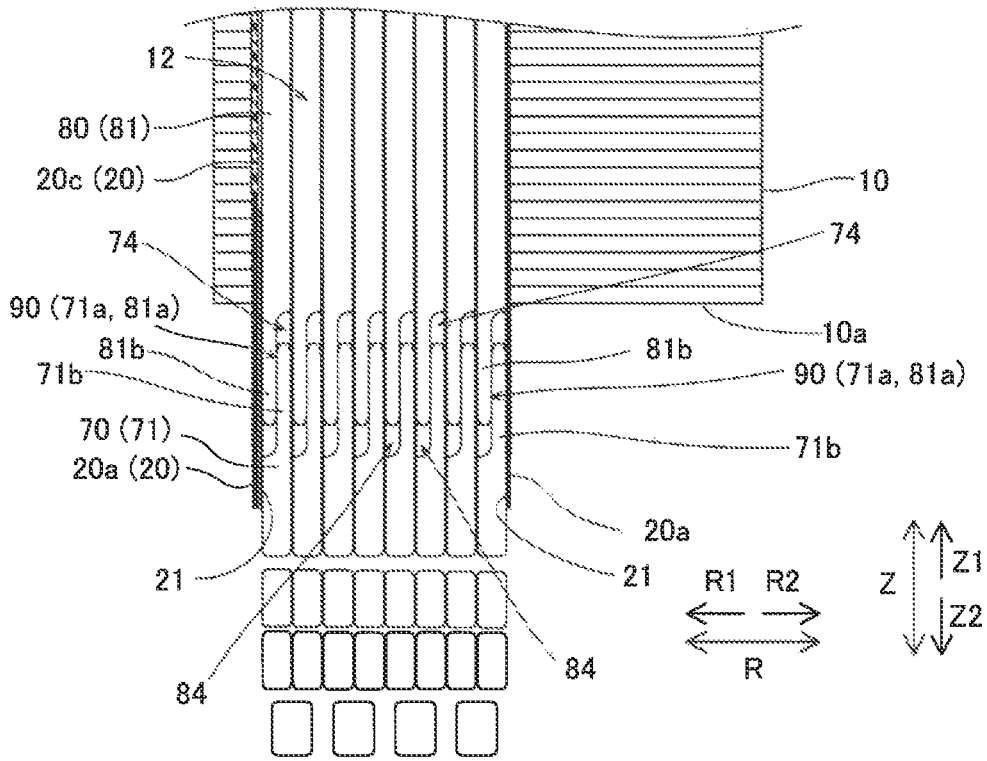
FIG. 42 is a sectional view near a joint portion according to a second modification of the first embodiment.

Further, in the first embodiment described above, an example is shown in which each of the first clearance portion 74 and the second clearance portion 84 is disposed in the slot 12. However, the present disclosure is not limited to this. For example, a part of the first clearance portion 74 and the second clearance portion 84 (for example, only the second clearance portion 84) may be disposed outside the slot 12 (see FIG. 41), or the entirety of both the first clearance portion 74 and the second clearance portion 84 and the second clearance portion 84 may be disposed outside the slot 12 (see FIG. 42).

Figure 43A:
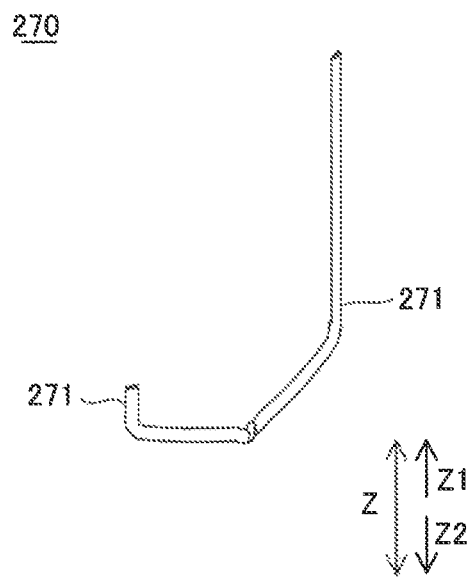
(FIG. 43A is a perspective view of the first segment conductor viewed from the outer radial side.
Figure 43B:
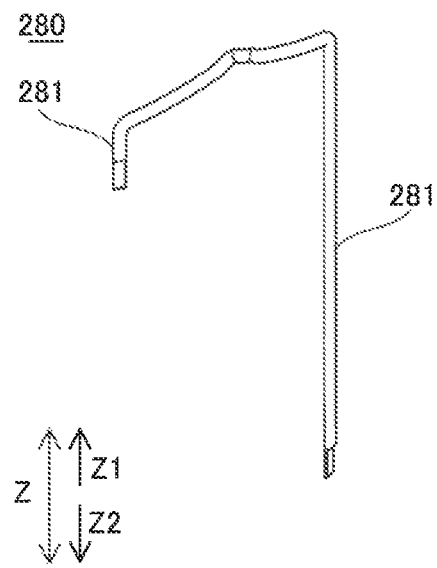
FIG. 43B is a perspective view of the second segment conductor viewed from the outer radial side.)

Further, in the first embodiment described above, an example is shown in which each of the first clearance portion 74 and the second clearance portion 84 is disposed in the vicinity of the end face 10a (one side end face). However, the present disclosure is not limited to this. For example, each of the first clearance portion 74 and the second clearance portion 84 may be disposed in the vicinity of the end face 10a (one side end face) and the end face 10b (other side end face). In this case, as shown in FIG. 43, a pair of first leg portions 271 of a first segment conductor 270 is configured so that the first leg portions 271 have different lengths from each other (see FIG. 43A), and a pair of second leg portions 281 of a second segment conductor 280 is configured so that the second leg portions 281 have different lengths from each other (see FIG. 43B). That is, each of the first segment conductor 270 and the second segment conductor 280 has a J-shape (substantially J-shape).

Further, in the first embodiment described above, an example is shown in which the length of the second leg portion 81 is longer than the length of the first leg portion 71. However, the present disclosure is not limited to this. For example, the length of the second leg portion 81 may be shorter than the length of the first leg portion 71.

Further, in the first embodiment described above, an example is shown in which the second conductor 80 having a long leg portion is a conductor on the lead side, and the first conductor 70 having a short leg portion is the conductor on the non-lead side. However, the present disclosure is not limited to this. For example, the second conductor 80 having a long leg portion may be the conductor on the non-lead side, and the first conductor 70 having a short leg portion may be the conductor on the lead side.

Further, in the first embodiment described above, an example is shown in which the first insulating member 20 and the second insulating member 21 (joint portion insulating member) have a sheet shape. However, the present disclosure is not limited to this. It is possible to apply the present disclosure to a stator having the first insulating member 20 and the second insulating member 21 that do not have a sheet shape.

Figure 44:
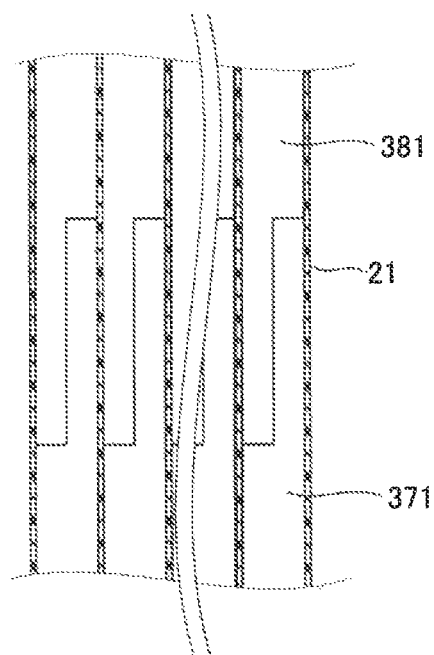
FIG. 44 is a sectional view near a joint portion according to a fourth modification of the first embodiment.

Further, in the first embodiment described above, an example is shown in which the first clearance portion 74 is provided between the tip end portion 71c of the first leg portion 71 and the second leg portion 81, and the second clearance portion 84 is provided between the tip end portion 81c of the second leg portion 81 and the first leg portion 71. However, the present disclosure is not limited to this. As in a fourth modification shown in FIG. 44, the present disclosure can be applied to a case in which a clearance portion is not provided between a tip end portion of a first leg portion 371 and a second leg portion 381, and between a tip end portion of the second leg portion 381 and the first leg portion 371.

Further, in the first embodiment, an example is shown in which the minimum value $t2_{min}$ of the dimensional variation range of the radial thickness t2 of the first surface disposition portion 71b is equal to or more than half of the maximum value $t3_{max}$ of the dimensional variation range of the thickness t3 of the first leg portion body portion 71d, and the minimum value $t4_{min}$ of the dimensional variation range of the radial thickness t4 of the second surface disposition portion 81b is equal to or more than half of the maximum range value $t5_{max}$ of the dimensional variation range of the thickness t5 of the second leg portion body portion 81d. However, the present disclosure is not limited to this. In the present disclosure, the minimum value $t2_{min}$ may be equal to or more than a value other than half of the maximum value t3max, and the minimum value $t4_{min}$ may be equal to or more than a value other than half of the maximum value t5max. For example, the minimum value $t2_{min}$ may be ⅓ or more (or ⅔ or more) of the maximum value t3max, and the minimum value $t4_{min}$ may be ⅔ or more (or ⅓ or more) of the maximum value t5max.

DESCRIPTION OF REFERENCE NUMERALS

10 Stator core (armature core)
12 Slot
21 Second insulating member (joint portion insulating member)
30 Coil portion
70, 170, 270 First conductor (first segment conductor)
71, 171, 271, 371 First leg portion
71a, 171a First surface
71b First surface disposition portion (first surface side part)
71c Tip end portion (tip end portion of first leg portion)
71d, 171d First leg portion body portion
80, 180, 280 Second conductor (second segment conductor)
81, 181, 281, 381 Second leg portion
81a, 181a Second surface
81b Second surface disposition portion (second surface side part)
81c Tip end portion (tip end portion of second leg portion)
81d, 181d Second leg portion body portion
90 Joint portion
91 Conductive adhesive
100, 200, 300 Stator (armature)
171c First surface forming portion (first surface side part)
181c Second surface forming portion (second surface side part)
190 Contact portion
E2 Part in which first surface and second surface are not provided
t2 Thickness (thickness of first surface side part)
t3 Thickness (thickness of first leg portion body portion)
t4 Thickness (thickness of second surface side part)
t5 Thickness (thickness of second leg portion body portion)
t21 Thickness (thickness of joint portion)
t22 Thickness (thickness of part in which first surface and second surface are not provided)
W3 Width (slot width)

The invention claimed is:

1. An armature comprising:
an armature core provided with a plurality of slots extending in an axial direction;
a plurality of first segment conductors disposed on one side of the armature core in the axial direction and including a first leg portion that extends to the other side of the armature core in the axial direction;
a plurality of second segment conductors disposed on the other side of the armature core in the axial direction and including a second leg portion that extends to the one side of the armature core in the axial direction; and
a coil portion including a joint portion in which at least a part of a first surface that is provided on a tip end portion side of each first leg portion of the plurality of first segment conductors and that is provided so as to extend along the axial direction, and at least a part of a second surface that is provided on a tip end portion side of each second leg portion of the plurality of second segment conductors and that is provided so as to extend along the axial direction are joined in one of the slots or on an outer side of one of the slots in the axial direction, wherein
the first leg portion has a first leg portion body portion and a first surface side part that is provided with the first surface and that has a thickness in a radial direction smaller than a thickness of the first leg portion body portion in the radial direction,
the second leg portion has a second leg portion body portion and a second surface side part that is provided with the second surface and that has a thickness in the radial direction smaller than a thickness of the second leg portion body portion in the radial direction,
in the radial direction, a thickness of the joint portion is equal to or more than a thickness of a part other than the joint portion,
in the plurality of first segment conductors and the plurality of second segment conductors disposed side by side in one of the slots in the radial direction, a minimum value of a dimensional variation range of a total thickness of the joint portion in the radial direction is equal to or more than a maximum value of a dimensional variation range of a total thickness in the radial direction of a part in which the first surface and the second surface are not provided,
a minimum value of a dimensional variation range of a thickness of the first surface side part in the radial direction among the plurality of first segment conductors disposed in one of the slots is equal to or more than half of a maximum value of a dimensional variation range of a thickness of the first leg portion body portion among the plurality of first segment conductors disposed in one of the slots, and
a minimum value of a dimensional variation range of a thickness of the second surface side part in the radial direction among the plurality of second segment conductors disposed in one of the slots is equal to or more than half of a maximum value of a dimensional variation range of a thickness of the second leg portion body portion among the plurality of second segment conductors disposed in one of the slots.

2. The armature according to claim 1, further comprising a conductive adhesive that adheres the first surface and the second surface and that makes the first leg portion and the second leg portion conductive, wherein
in the plurality of first segment conductors and the plurality of second segment conductors disposed in one of the slots, a minimum value of a dimensional variation range of a total thickness in the radial direction of the joint portion including the conductive adhesive, is equal to or more than the maximum value of the dimensional variation range of the total thickness in the radial direction of the part in which the first surface and the second surface are not provided.

3. The armature according to claim 1, further comprising a joint portion insulating member that has a sheet shape and that insulates the joint portions adjacent to each other in the radial direction, among the joint portions, wherein
in the plurality of first segment conductors and the plurality of second segment conductors disposed in one of the slots, a minimum value of a dimensional variation range of a total thickness in the radial direction of the joint portion including a joint portion insulating member, is equal to or more than the maximum value of the dimensional variation range of the total thickness in the radial direction of the part in which the first surface and the second surface are not provided.

4. The armature according to claim 3, wherein
the joint portion insulating member is also disposed between the first leg portion body portion and the second leg portion body portion, and
in the plurality of first segment conductors and the plurality of second segment conductors disposed in one of the slots, a minimum value of a dimensional variation range of a total thickness in the radial direction of the joint portion including the joint portion insulating member is equal to or more than the maximum value of the dimensional variation range of the total thickness in the radial direction of the part in which the first surface and the second surface are not provided, including the joint portion insulating member.

5. The armature according to claim 1, wherein in the plurality of the first segment conductors and the plurality of the second segment conductors disposed in one of the slots, a maximum value of a dimensional variation range in a total thickness of the joint portion in the radial direction is equal to or less than a width of the slot in the radial direction.

6. The armature according to claim 1, wherein the joint portions of the plurality of first segment conductors and the plurality of second segment conductors disposed in one of the slots are disposed so as to overlap each other when viewed from the radial direction.

7. The armature according to claim 6, wherein
each of the first segment conductor and the second segment conductor has a U-shape including a pair of the first leg portions and a pair of the second leg portions, respectively, and
the joint portions of the plurality of first segment conductors having a U-shape and the plurality of second segment conductors having a U-shape disposed in one of the slots are disposed so as to overlap each other when viewed from the radial direction.

8. The armature according to claim 1, wherein
each of the first surface and the second surface is provided so as to extend parallel to the axial direction, and
the first surface and the second surface are joined to each other in the radial direction.

9. An armature comprising:
an armature core provided with a plurality of slots extending in an axial direction;
a plurality of first segment conductors disposed on one side of the armature core in the axial direction and including a first leg portion that extends to the other side of the armature core in the axial direction;
a plurality of second segment conductors disposed on the other side of the armature core in the axial direction and including a second leg portion that extends to the one side of the armature core in the axial direction; and
a coil portion including a joint portion in which at least a part of a first surface that is provided on a tip end portion side of each first leg portion of the plurality of first segment conductors and that is provided so as to extend along the axial direction, and at least a part of a second surface that is provided on a tip end portion side of each second leg portion of the plurality of second segment conductors and that is provided so as to extend along the axial direction are joined in one of the slots or on an outer side of one of the slots in the axial direction, wherein
the first leg portion has a first leg portion body portion that has a thickness in a radial direction that is larger than a thickness in the radial direction of a first surface side part provided with the first surface,
a minimum value of a dimensional variation range of a thickness of the first surface side part in the radial direction among the plurality of first segment conductors disposed in one of the slots is equal to or more than half of a maximum value of a dimensional variation range of a thickness of the first leg portion body portion among the plurality of first segment conductors disposed in one of the slots,
the second leg portion has a second leg portion body portion that has a thickness in the radial direction that is larger than a thickness in the radial direction of a second surface side part provided with the second surface, and
a minimum value of a dimensional variation range of a thickness of the second surface side part in the radial direction among the plurality of second segment conductors disposed in one of the slots is equal to or more than half of a maximum value of a dimensional variation range of a thickness of the second leg portion body portion among the plurality of second segment conductors disposed in one of the slots.

10. A manufacturing method of an armature that is a manufacturing method of an armature core provided with a plurality of slots extending in an axial direction, the manufacturing method comprising:
- a step of preparing a plurality of first segment conductors disposed on one side of the armature core in the axial direction and including a first leg portion that extends to the other side of the armature core in the axial direction;
- a step of preparing a plurality of second segment conductors disposed on the other side of the armature core in the axial direction and including a second leg portion that extends to the one side of the armature core in the axial direction;
- a step of moving the plurality of first segment conductors from one side of the armature core to a side of the slot;
- a step of moving the plurality of second segment conductors from the other side of the armature core in the axial direction to the side of the slot; and
- a step of forming a joint portion by joining at least a part of a first surface that is provided on a tip end portion side of each first leg portion of the plurality of first segment conductors and that is provided so as to extend along the axial direction, and at least a part of a second surface that is provided on a tip end portion side of each second leg portion of the plurality of second segment conductors and that is provided so as to extend along the axial direction, in one of the slots or on an outer side of one of the slots in the axial direction, wherein the step of preparing the first segment conductor is a step of preparing the first segment conductor in which the first leg portion has a first leg portion body portion and a first surface side part provided with the first surface and having a thickness in a radial direction smaller than a thickness in the radial direction of the first leg portion body portion, the step of preparing the second segment conductor is a step of preparing the second segment conductor in which the second leg portion has a second leg portion body portion and a second surface side part provided with the second surface and having a thickness in the radial direction smaller than a thickness in the radial direction of the second leg portion body portion, in the step of preparing the first segment conductor and the step of preparing the second segment conductor, the first segment conductor and the second segment conductor are prepared so that a thickness of the joint portion is equal to or larger than a thickness of a part other than the joint portion, in the radial direction, in the plurality of first segment conductors and the plurality of second segment conductors disposed side by side in one of the slots in the radial direction, a minimum value of a dimensional variation range of a total thickness of the joint portion in the radial direction is equal to or more than a maximum value of a dimensional variation range of a total thickness in the radial direction of a part in which the first surface and the second surface are not provided, a minimum value of a dimensional variation range of a thickness of the first surface side part in the radial direction among the plurality of first segment conductors disposed in one of the slots is equal to or more than half of a maximum value of a dimensional variation range of a thickness of the first leg portion body portion among the plurality of first segment conductors disposed in one of the slots, and a minimum value of a dimensional variation range of a thickness of the second surface side part in the radial direction among the plurality of second segment conductors disposed in one of the slots is equal to or more than half of a maximum value of a dimensional variation range of a thickness of the second leg portion body portion among the plurality of second segment conductors disposed in one of the slots.

* * * * *